(12) United States Patent
Schoeffler

(10) Patent No.: US 11,704,707 B2
(45) Date of Patent: Jul. 18, 2023

(54) IDENTITY AUTHENTICATION AND VERIFICATION

(71) Applicant: Steven B. Schoeffler, New York, NY (US)

(72) Inventor: Steven B. Schoeffler, New York, NY (US)

(*) Notice: Subject to any disclaimer, the term of this patent is extended or adjusted under 35 U.S.C. 154(b) by 0 days.

(21) Appl. No.: 16/267,084

(22) Filed: Feb. 4, 2019

(65) Prior Publication Data

US 2019/0172111 A1    Jun. 6, 2019

Related U.S. Application Data

(63) Continuation of application No. 14/775,677, filed as application No. PCT/US2014/000157 on Jul. 3, 2014, now Pat. No. 10,223,719, which is a continuation-in-part of application No. PCT/US2014/000065, filed on Mar. 24, 2014.

(60) Provisional application No. 61/957,615, filed on Jul. 7, 2013, provisional application No. 61/852,951, filed on Mar. 25, 2013.

(51) Int. Cl.
| | |
|---|---|
| H04L 29/06 | (2006.01) |
| G06Q 30/0601 | (2023.01) |
| H04L 9/32 | (2006.01) |
| H04L 9/40 | (2022.01) |

(52) U.S. Cl.
CPC ........... *G06Q 30/0609* (2013.01); *H04L 9/32* (2013.01); *H04L 63/12* (2013.01)

(58) Field of Classification Search
CPC .............................. G06Q 30/0609; H04L 63/12
See application file for complete search history.

(56) References Cited

U.S. PATENT DOCUMENTS

| | | | | |
|---|---|---|---|---|
| 8,285,571 B2* | 10/2012 | Demirdjian | ........... | G01S 13/825 |
| | | | | 705/6 |
| 2001/0056363 A1 | 12/2001 | Gantz et al. | | |
| 2004/0151347 A1* | 8/2004 | Wisniewski | ....... | G06K 9/00275 |
| | | | | 382/115 |
| 2005/0154911 A1* | 7/2005 | Schneider | ............. | H04W 12/08 |
| | | | | 726/26 |
| 2008/0004953 A1 | 1/2008 | Ma et al. | | |
| 2008/0045140 A1 | 2/2008 | Korhonen | | |
| 2008/0091342 A1* | 4/2008 | Assael | ............... | G01C 21/3438 |
| | | | | 701/533 |
| 2008/0195428 A1* | 8/2008 | O'Sullivan | ............ | G06Q 50/30 |
| | | | | 705/6 |

(Continued)

FOREIGN PATENT DOCUMENTS

GB    2441793 A    3/2008

OTHER PUBLICATIONS

Ma et al., "T-share: A large-scale dynamic taxi ridesharing service", 2013 IEEE 29th International Conference on Data Engineering (ICDE), Date of Conference: Apr. 8-12, (Year: 2013).*

(Continued)

*Primary Examiner* — Morshed Mehedi
(74) *Attorney, Agent, or Firm* — Wright IP & International Law; Erin G. Wright

(57) ABSTRACT

Methods, software, products and systems of an identity authentication and verification system which provide one or more users to verify by electronic and non-electronic means the identity of a person with whom a user is interacting.

19 Claims, 40 Drawing Sheets

(56) References Cited

U.S. PATENT DOCUMENTS

| | | | |
|---|---|---|---|
| 2008/0270019 A1* | 10/2008 | Anderson | G06Q 10/06 701/533 |
| 2009/0049044 A1 | 2/2009 | Mitchell | |
| 2009/0172009 A1 | 7/2009 | Schmith et al. | |
| 2009/0248587 A1* | 10/2009 | Van Buskirk | G06Q 10/063 112 705/80 |
| 2009/0326991 A1 | 12/2009 | Wei et al. | |
| 2010/0274569 A1 | 10/2010 | Reudink | |
| 2012/0078672 A1* | 3/2012 | Mohebbi | G06Q 10/08 701/527 |
| 2012/0137256 A1 | 5/2012 | Lalancette et al. | |
| 2012/0290652 A1 | 11/2012 | Boskovic | |
| 2013/0028522 A1* | 1/2013 | Perlmutter | G06K 9/00281 382/197 |
| 2013/0036458 A1 | 2/2013 | Liberman et al. | |
| 2013/0041941 A1 | 2/2013 | Tomasic et al. | |
| 2013/0060586 A1 | 3/2013 | Chen et al. | |
| 2013/0073974 A1 | 3/2013 | Bladel et al. | |
| 2013/0282602 A1 | 10/2013 | Wang | |
| 2014/0222298 A1* | 8/2014 | Gurin | B60R 25/305 701/49 |
| 2015/0018011 A1 | 1/2015 | Mendelson | |
| 2017/0045890 A1* | 2/2017 | Gurin | H04N 7/185 |

OTHER PUBLICATIONS

Herbawi et al. "Modeling the Multihop Rideматching Problem with Time Windows and Solving It Using Genetic Algorithms", 2012 IEEE 24th International Conference on Tools with Artificial Intelligence, Date of Conference: Nov. 7-9, 2012.*

International Search Report, PCT/US2014/000157, ISA/US (dated Nov. 25, 2014).

International Search Report, PCT/US2014/000065, ISA/US (dated Oct. 23, 2014).

* cited by examiner

IDENTITY AUTHENTICATION AND VERIFICATION

CROSS-REFERENCE TO RELATED APPLICATIONS

This application is a continuation of copending U.S. application Ser. No. 14/775,677 filed Sep. 12, 2015, which is a national stage entry of PCT/US2014/000157 filed Jul. 3, 2014, titled "Identity Authentication And Verification" and which is a nonprovisional application of and claims benefit of provisional U.S. patent application 61/957,615 entitled "Identity Authentication and Verification" filed Jul. 7, 2013, to each of which benefit of priority is claimed for this application.

PCT/US2014/000157 filed Jul. 3, 2014, titled "Identity Authentication And Verification" is also a continuation-in-part application of and claims benefit of PCT application PCT/US2014/000065 entitled "System And Method For Displaying Information" filed Mar. 24, 2014, which is a PCT and nonprovisional application claiming benefit of priority to provisional U.S. patent application 61/852,951 entitled "System And Method For Displaying Trip Information" filed Mar. 25, 2013, to each of which benefit of priority is claimed for this application.

This application claims benefit of priority to each of U.S. Pat. No. 14,775,677, PCT/US2014/000157, 61/957,615, PCT/US2014/000065 and 61/852,951, each of which are entirely incorporated by reference.

INCORPORATION BY REFERENCE

This application is a continuation of and incorporates by reference in its entirety copending U.S. application Ser. No. 14/775,677 filed Sep. 12, 2015, and incorporates by reference in its entirety each of PCT/US2014/000157, 61/957,615, PCT/US2014/000065 and 61/852,951.

This application is a continuation of and incorporates by reference U.S. application Ser. No. 14/775,677 filed Sep. 12, 2015, which is a US national stage entry of and incorporates by reference in its entirety PCT/US2014/000157 filed Jul. 3, 2014, titled "Identity Authentication And Verification", which incorporates by reference in its entirety provisional U.S. patent application 61/957,615 entitled "Identity Authentication and Verification" filed Jul. 7, 2013, each of which is incorporated by reference in its entirety in this current continuation application.

U.S. application Ser. No. 14/775,677 filed Sep. 12, 2015, incorporated by reference herein, incorporates by reference in its entirety PCT/US2014/000157, which incorporates by reference in its entirety PCT/US2014/000065 entitled "System And Method For Displaying Information" filed Mar. 24, 2014, which incorporates by reference in its entirety provisional U.S. patent application 61/852,951 entitled "System And Method For Displaying Trip Information" filed Mar. 25, 2013, each of which is incorporated by reference in its entirety in this current continuation application.

This currently filed continuation application of Ser. No. 14,775,677 incorporates by reference in its entirety each of Ser. No. 14,775,677, PCT/US2014/000157, 61/957,615, PCT/US2014/000065 and 61/852,951.

FIELD OF THE INVENTION

The present invention regards an identity authentication and verification system.

BACKGROUND OF THE INVENTION

Ridesharing can be a low-cost option for personal transportation. However, several concerns have prevented the adoption of ridesharing on a broad basis. For example, ridesharing suffers from fears of users and/or potential users regarding personal safety. These fears can include driver safety, physical attack, sexual assault, kidnapping, robbery and/or other forms of crime and antisocial behavior. Additionally, it can be very difficult or not possible to find an appropriate match between an individual needing a ride and an individual offering a ride. In addition to these primary concerns, myriad other complications result in the failure of ridesharing to grow as an alternative to traditional modes of transportation. In additional example, time constraints can prevent ridesharing success. Regarding social stigma, ridesharing can be viewed with the negative attitudes associated with hitchhiking and no records exist as to who is encountered in a rideshare or where they traveled. Further, travelers and routes are hard or not possible to match under typical user circumstances. For at least these reasons, ridesharing fails to be a viable option of transportation. There is a great and long-felt need for a solution which renders ridesharing a safe and effective transportation alternative.

The meeting of individuals can raise concerns regarding identity, safety and security issues. Such concerns are particularly acute situations related to a meeting between strangers. For example, when two individuals unknown to one another, or otherwise, meet in a public or private place, there can be concerns regarding personal safety. Similar concerns can apply when allowing an individual entry to a secure area. Additionally, confirming the identity of individuals involved in transactions in the field is fraught with vulnerabilities. It can be problematic to confirmation of the identities of parties interested in engaging in a transaction, negotiation or other interaction, whether the matter is commercial, social or a hybrid of both.

SUMMARY OF THE INVENTION

In its many and varied embodiments disclosed herein, an authentication system is provided which in-part can be a transaction-based identity authentication and verification system.

This authentication system solves the problems which occur when two or more individuals and/or groups meet and there are concerns regarding safety, security, identity, evidence of meeting and other concerns. Additionally, the technology disclosed herein provides the ability for those who meet to resume contact with another party in the future, such as to identify a lost item, can be concerns.

Misrepresentation of identity when people meet is an important problem which can have serious consequences. For example, false documents or credentials can be displayed for review. In some instances, passwords or identification codes can be exchanged. However, while such an approach can confirm that an authentication code was transmitted to and received by the transaction partner, it does not confirm that the individual presenting such an authentication code is the party for whom the code was intended or that the intended party, in the interim, has not relayed the code to an uninvolved third party. It thus does not provide a verifiable, incontrovertible identifier. The technology disclosed herein solves such problems.

The authentication and verification system disclosed herein provides a method of identity authentication for individuals which is reliable and can provide a record of a meeting. It can also provide details regarding the meeting, notes from the meeting and other information such as location, time, date and its purpose. The authentication and verification system provides a method of identity authentication, verification and can provide a reliable and memorialized record of the parties to a meeting.

In an embodiment the communications system achieves communication between a user and those in the user's vicinity of perceptible content, as well as communication of content to an unlimited number of people outside of the user's vicinity by electronic communication. This disclosure is not limited in the content which can be communicated. In an embodiment, the content can be general in nature, or regarding a subject or an information from a user. In another embodiment, the communications system can be used to achieve a transportation system. In yet another embodiment, the communications system can be used to achieve a rideshare system.

In an embodiment, a communications system can have: a computer having a memory and a processing unit adapted to run a computer readable program code; a device adapted to receive an input of a communication data, the device running a computer readable program code transmitting the communication data to the computer for processing; the computer adapted to receive and process the communication data; the device adapted to run a program executable code to produce a content based upon the communication data; and the device having an output to communicate the content perceptible to one or more of a communication recipient. The communications system can have a computer which can be adapted to run a program executable code of a rule based logic to determine whether a stored data satisfies a communication criterion identifying one or more of a matching target. The communications system can have a computer which can be adapted to run a program executable code sending an electronic communication to the matching target. The communication data can be one or more of a need data, a message data and a user information. The communication criterion can be one or more of a status criterion, a geographical criterion and a time criterion. In an embodiment, the device can be a wireless device.

In an embodiment, a transportation communications system can have a computer having a memory and a processing unit adapted to run a computer readable program code; a rider device adapted to receive an input of a rider data, the rider device running a computer readable program code transmitting the rider data to the computer for processing; the computer having a geographical criterion; the computer adapted to run a program executable code of a rule based logic to determine whether a transportation provider has a geographic data which satisfies the geographical criterion identifying a matching transportation provider; the rider device adapted to run a program executable code to produce a content based upon the communication and/or rider data; and the rider device having an output to communicate the content perceptible to one or more of a communication recipient. A transportation provider device can be adapted to transmit a transportation provider data to the computer for processing. The computer can be adapted to run a program executable code to send an electronic communication to a matching transportation provider. The electronic communication can have one or more of a text information and a destination information. The rider device can be adapted to run a program executable code which can communicate to the rider that a transportation provider has sent an electronic communication. Optionally, the transportation communications system can have a public communications device to communicate the content perceptible to one or more of a communication recipient.

In an embodiment, a communications system can have: a computer having a memory and a processing unit adapted to run a computer readable program code; a transportation provider device adapted to receive an input of a transportation provider data, the transportation provider device running a computer readable program code transmitting the transportation provider data to the computer for processing; the computer having a geographical criterion; the computer adapted to run a program executable code of a rule based logic to determine whether a rider geographic data satisfies the geographical criterion identifying a matching rider; the transportation provider device adapted to run a program executable code to produce a content based upon the communication data; and the transportation provider device having an output to communicate the content perceptible to one or more of a communication recipient.

Optionally, the transportation communications system can have a public display system adapted to display a transportation provider information. In an embodiment, the content can be an offer of a ride.

In an embodiment, a method can be executed on a computer for verification, which can have the steps of: providing a computer having a memory and a processing unit adapted to execute program executable code, the computer adapted to run a program executable code of a verification system; providing a first person device associated by the verification system with a first person; the verification system communicating a digital image of a second person to the first device, the first device running program executable code displaying the digital image of the second person to the first person; and the first person device adapted to accept an input verifying by providing a data to the verification system that the image of the second person is a visual match to the second person.

In an embodiment, the method executed on a computer for verification can further have the steps of: providing a second person device associated by the verification system with a second person; the verification system communicating a digital image of the first person to the second device, the second device running program executable code displaying the digital image of the first person to the second person; and the second person device adapted to accept an input verifying by providing a data to the verification system that the image of the first person is a visual match to the first person.

In an embodiment, the method executed on a computer for verification can further have the steps of: the verification system processing the data that the image of the second person is a visual match to the second person; and creating a verification record that the image of the second person is a visual match verified by the first person of the second person.

In an embodiment, the method executed on a computer for verification can further have the steps of: the verification system processing the input confirming by providing a data to the transaction system that the image of the first person is a visual match to the first person; and creating a verification record that the image of the first person is a visual match verified by the second person of the first person.

In an embodiment, the method executed on a computer for verification can further have the step of the verification system running a program executable code identifying the second person as having a verified status based upon a visual match verified by the first person of the second person In an embodiment, the method executed on a computer for verification can further have the step of the verification system running a program executable code identifying the first person as having a verified status based upon a visual match verified by the second person of the first person.

In an embodiment, the method executed on a computer for verification can further have the step of the verification system granting access to an computer program executable functionality of the verification system based upon the image of second person having a verification record.

In an embodiment, the method executed on a computer for verification can further have the step of the verification system granting access to an computer program executable functionality of the verification system based upon the image of second person having a verification record and the image of first person having a verification record.

In an embodiment, the method executed on a computer for verification can further have the steps of: the verification system running a program executable code verifying the first person as a vehicle rider or vehicle driver; and the verification system running a program executable code verifying the second person as a vehicle rider or vehicle driver.

In an embodiment, the method executed on a computer for verification can further have the steps of: the verification system running a program executable code verifying the first person as an adult or child; and the verification system running a program executable code verifying the second person as an adult or child.

In an embodiment, the method executed on a computer for verification can further have the step of the verification system running a program executable code verifying the second person as a medical patient.

In an embodiment, the method executed on a computer for verification can further have the steps of: the verification system running a program executable code identifying the first person's gender and the verification system running a program executable code identifying the second person's gender.

In an embodiment, the method executed on a computer for verification can further have the steps of: providing at least one of the first person device and the second person device which is an SMS device or a voice mobile device; providing at least one of the first person device and the second person device is a smartphone; and the SMS device or the voice mobile device providing a verification communication or data to the verification system.

In an embodiment, the method executed on a computer for verification can further have the steps of: providing the first person image and the second person image to at least one of the first person device and the second person device, and displaying the first person image and the second person image simultaneously on the at least one of the first person device and the second person device.

In an embodiment, the method executed on a computer for verification can further have the steps of: verification of user2 by user1 and vice versa where user1 has an SMS or voice mobile device and user2 has a smartphone; images of both users are displayed on user2's device; User2 verifies user1's photo; user1 verifies user2's photo by sending confirmation to the server by SMS or voice, with the presence of user1's photo providing evidence to user1 that the user2 photo displayed is valid and delivered from the system server.

In an embodiment, the method executed on a computer for verification can further have the steps of the two photos are combined into one computer image before sending to user2's device to discourage spoofing.

In an embodiment, the method executed on a computer for verification can further have the steps of verification by a user1 and a user2, both having SMS/voice devices, where the two users print out a photograph of each other provided by the system prior to meeting; at the time of meeting, the two users confirm to the server, by SMS or voice menu, that the person they met matches their respective printed photos. In an embodiment, verification is photo verification.

In another embodiment the identity authorization and verification system is used in part or in whole in a transaction as a transaction system or for a transaction. Instructing the server which two parties are part of the current transaction by choosing from a list of parties currently initiating a transaction in the vicinity.

In an embodiment, a method can be executed on a computer for transaction which can have the steps of: providing a computer having a memory, a processing unit adapted to execute program executable code and the computer adapted to run a program executable code of a transaction system; providing a first person device associated by the transaction system with a first person; providing a second person device associated by the transaction system with a second person; the first device communicating a data to the computer indicating that the first person seeks to initiate a transaction with a second person; the second device communicating a data to the computer indicating that the second person seeks to initiate a transaction with a second person; the computer records a record of the first person having a state of seeking to initiate the transaction; the computer records a record of the second person having a state of seeking to initiate the transaction; the computer provides to the first person a list of one or more persons seeking to initiate a transaction within a proximity of the first person; the list containing an identifying data of the second person; the first person enters an input into the first device selecting an identifying data of the second person; and the computer recording a record of the selection of the second person by the first person.

In an embodiment, a method can be executed on a computer for transaction, which can further have the step of the computer communicating to the second device a first person identifying data.

In an embodiment, a method can be executed on a computer for transaction which can further have the steps of: the second device prompting the second person to confirm the first person identifying data; the second person entering a confirmation data confirming the first person identifying data; and the computer recording a record of the confirmation of the first person identifying data by the second person.

In an embodiment, a method can be executed on a computer for transaction which can further have the steps of: the computer provides to the second person a list of one or more persons seeking to initiate a transaction within a proximity of second person; the list containing an identifying data of the first person; the second person enters an input into the first device selecting an identifying data of the first person; and the computer recording a record of the selection of the first person by the second person.

In an embodiment, a method can be executed on a computer for transaction which can further have the steps of: the first person device communicating a first person device location to the verification system; the second person device communicating a first person device location to the verification system; and the verification system executing program executable logic to determine that the first person device and the second person device satisfy a proximity criteria.

In an embodiment, a method can be executed on a computer for transaction which can further have the step of the verification system recording at least one of a time and location of a verification or a transaction.

In an embodiment, a method can be executed on a computer for transaction which can further have the step of providing a first user identifying data that is a name.

In an embodiment, a method can be executed on a computer for transaction which can further have the step of providing a first user identifying data that is an identification code. In an embodiment, a method can be executed on a computer for transaction which can further have the step of providing a first user identifying data that is an image. (person, car) In an embodiment, a method can be executed on a computer for transaction which can further have the step of providing a first user identifying data that is a license plate. In an embodiment, a method can be executed on a computer for transaction which can further have the step of providing a first user identifying data that is a destination. In an embodiment, the transaction can be governed by a time period or must occur within a time period. In an embodiment, the list can be updated automatically by the system or in response to user input. In an embodiment, the first person enters an input into the first device selecting an identifying data of the second person; to indicate that this person is the previously selected second person.

In an embodiment, a method can be executed on a computer for transaction which can further have the step of where the two parties choose from the list according to destination, user name, photo of vehicle, license plate, and/or photo of the driver.

In an embodiment, a method can be executed on a computer for transaction which can further have the steps of: where only one party need choose in order to initiate the transaction; the other party receives a message asking them to confirm, providing a photograph or other identifying information as above, or a code provided to the first user and conveyed by the first user to the second user.

In an embodiment, a method can be executed on a computer for transaction which can further have the steps of: where one or both users, who can have a SMS/voice device, informs the server of location by providing an address, cross streets, or other geocodeable location by SMS/voice, thus making the location available for comparison; codes, or license plate, user name, destination are exchanged as in 2b to confirm the match.

In an embodiment, the server can be instructed as to which two parties are part of the current transaction by entering or scanning a license plate, or other unique identifier (provided code, etc.).

In an embodiment, a method can be executed on a computer for transaction which can have the steps of: providing a computer having a memory, a processing unit adapted to execute program executable code and the computer adapted to run a program executable code of a transaction system; providing a first person device associated by the transaction system with a first person; providing a unique identifier associated by the transaction system with a second person; the first person device communicating to the computer a data associated by the transaction system with the unique identifier; and the computer records a record of the first person communicating the unique identifier.

In an embodiment, a method can be executed on a computer for transaction which can further have the steps of: the second person device prompting the second person to confirm an identifying data of the first person; the second person entering a confirmation data confirming the identifying data of the first person; and the computer recording a record of the confirmation of the first person identifying data by the second person.

In an embodiment, a method can be executed on a computer for transaction which can further have the step of providing the data of the unique identifier which is a license plate. In an embodiment, a method can be executed on a computer for transaction which can further have the step of providing the data of the unique identifier which is a text input. In an embodiment, a method can be executed on a computer for transaction which can further have the step of providing the data of the unique identifier which is an image input. In an embodiment, a method can be executed on a computer for transaction which can further have the step of providing the data of at least one of the unique identifier which is a digital input.

In an embodiment, a method can be executed on a computer for transaction which can further have the step of providing the data of at least one of the unique identifier which is a telecommunication input In an embodiment, a method can be executed on a computer for transaction which can further have the step of providing the data of at least one of the unique identifier which is different from the data of another identifier.

In an embodiment, a method can be executed on a computer for transaction which can further have the step of providing the data of at least one of the unique identifier which is the same as the data of another identifier.

In an embodiment, a method can be executed on a computer for transaction which can have the steps of: the server provides a code to one or both users; the codes can be different; one user provides the code to the other user, who then uses the app, SMS, or voice to provide the code back to the server, thus confirming communication between the two users.

In an embodiment, a method can be executed on a computer for transaction which can have the steps of: one user creates an alphanumeric code, such as a password. Both users provide the code to the server; and the server compares the two codes to confirm that these users intend to initiate a transaction.

In an embodiment, a method can be executed on a computer for transaction which can have the steps of: one user scans or takes a photograph of the other user's fingerprint, photograph, DNA, or other biometric measurement, usable as a unique identifier by the server; by confirming the unique identifier of one user transmitted by the second user, by comparison against a stored data, the two users can be associated as intending to initiate an identification or a transaction.

In an embodiment, a method can be executed on a computer for transaction which can further have the step of: Where the user2 license plate is not registered in the server database, the server stores the license plate as a unique identifier but further information is not available to the user1.

In an embodiment, a method can be executed on a computer for transaction which can have the steps of: where user2 is not registered in the system; user1 can enter a license plate, phone number, email address, or other identifier to the server as a temporary identifier; if the identifier is a phone number, a message can be sent by voice recording or preferably SMS, with a link to the profile of user1 for the benefit of user2; if the identifier is an email address, a similar link can be sent to user2 by email; if the identifier is a license plate or other identifier, user2 can contact the server and enter the identifier, already entered by user1; the server, comparing the identifiers, will find a match and provide user2 with the preestablished user profile for user1, which can contain photo, feedback, smoking preferences, and other information.

BRIEF DESCRIPTION OF THE DRAWINGS

The present invention in its several aspects and embodiments solves the problems discussed above and significantly advances the technology of ridesharing. The present invention can become more fully understood from the detailed description and the accompanying drawings, wherein.

Throughout this specification and figures like reference numbers identify like elements.

DETAILED DESCRIPTION OF THE INVENTION

Figure 1:
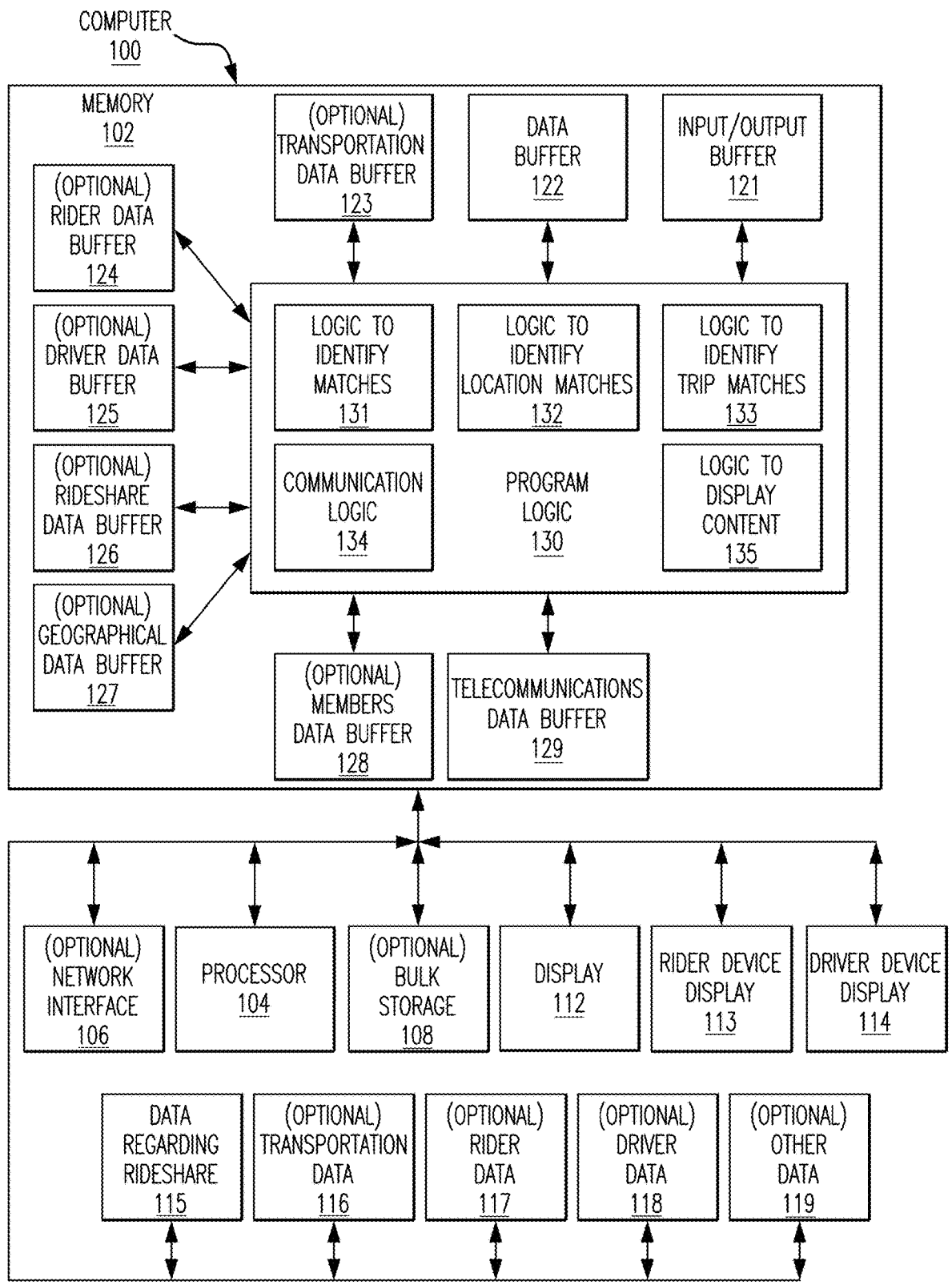
FIG. 1 is a functional block diagram of a computer system which performs execution of computer processes.

The authentication and verification system disclosed herein is a new method of identity authentication and verification. It eliminates the above-discussed problems and of identity authentication and verification and provides a safe and secure method of engaging in meetings between individuals and/or groups.

The authentication and verification system solves the problem of identifying unfamiliar individuals by providing an identification method, based on entering license plate number, generated code, or other identifier, and images to facilitate identification, for verification and recordkeeping, not by merely showing a photo, but by having the user electronically verify a supplied photo against the face of the person with whom one is meeting, the record of the verification being preserved, where the identification sequence and the photo verification can be used together or separately.

Because a photograph is a reliable biometric identification (within constraints of human error), the problem of false identification is solved by providing authentication and verification measures subsequent to the initiation of contact. Current use of photos to identify strangers might not provide a record of the photo or the presentation of the photo, and it might not be tied to other identifiers. This is a method of identifying strangers, who have connected in the physical world, with or without a previous connection, by Internet or other means of communication, with a reliable photo verification that will provide a sound record to support other means of identification which might not be reliable.

The authentication and verification system solves the problem of reliable identity authentication and verification by providing a multi-step, multi-party, and, at times, multi-factor authentication and verification system.

The authentication and verification system can employ identification codes (also herein as "ID codes"). Photos, images and locations can also be used by the authentication and verification system.

In an embodiment, a server-based authentication program which can optionally be installed on a server and which can have access to a database comprising user profiles, each profile comprising a user image, can be in communication with data-capable handheld devices carried by a first user and a second user, respectively, transmitting to the first user's device, the second user's image and transmitting to the second user's device, the first user's image. The match can be initiated by, for example, entering a license plate number or other identifier, exchanging an arbitrary code supplied by the server, or selecting from a list of possible matches. At the time of meeting, each user visually confirms a match between the other user's appearance and the program-provided user image it received, and transmits a verification to the authentication program using its handheld device. The mutual verification of images is recorded by the server to confirm that the two users have met, and it can also be used to confirm that they have agreed upon a transaction.

In an embodiment, the identity authentication and verification system (also as "authentication system", "verification system" and "AVS") can use an SMS request to initiate a meeting, or otherwise use SMS communications during a meeting.

In another embodiment, a server-based authentication program can be installed on a server with access to a database comprising user profiles, each profile comprising a user image, can be in communication with a first user possessing an SMS-capable mobile phone and a second user possessing a data-capable handheld device, and photo verification of both users is accomplished with the display of both photos on the second user's device. The first user transmits an SMS request to the authentication program to initiate transaction, such request can include a predetermined code, an identifier such as a license plate, or verification of a prearranged match; the authentication program transmits a first verification code to first user via SMS; upon receipt of first verification code, first user provides first code to second user who transmits it to the authentication program using its handheld device; the authentication program compares the code received from the second user to the first verification code; where the program finds the codes are identical, the authentication program transmits the user image for both users to the second user's device; the second user confirms that the received image of the first user is a match to the individual present, and displays the received image of the second user along with the second verification code to the first user; where first user confirms the image received by the second user is the second user's user image, it transmits the second verification code to the authentication program via SMS; the authentication program compares the code received from the first user to the second verification code; where the program finds the codes match, the authentication program transmits an indication of confirmation to the first user. A lower-security version of this embodiment would merely require an SMS message verifying the photo without transmission of a security code. Or both images can be shown together, with the first user's image on the second user's device serving as authentication. Then the first user need only send a verification message to the server, without inclusion of a code. The server then sends confirmations to both devices.

In yet another embodiment, a user with the data-enabled handheld device can initiate the transaction, by transmitting an initiation request by transmission of data from mobile device, using a code, license plate, list selection, or other identifier for the user with the SMS-enabled device. The user with the SMS-enabled device would receive a message requesting verification of the initiation request, and then the photo verification sequence would continue in accordance with one or more of the embodiments set forth herein.

In an embodiment, a first user can transmit the first user's current location by address, nearby intersection, latitude and longitude, or other location identifier. This transmission of location information can also serve to indicate whether parties are traveling together, rate of speed and other transportation related data items. Where the server can identify the first user's location with GPS or other means, without direct input by the user, a simple indication, such as tapping a "Start" button is sufficient to initiation the transaction. The second user also initiates an identification transaction indicating location, either with GPS etc. or by entering it as above. By comparing locations, the server identifies that the two parties are in proximity to each other and therefore are the two parties that are initiating the transaction at this place and time. If there are multiple matching parties known to the server, initiating the transaction at similar time and proximity, the service can provide a data-enabled device with facial photographs of each of the matching parties in question, in order to identify the correct party by their face. This system has the merit of ease of use, compared to typing an identifier such as a license plate or a code, known to the server or provided by the server, obtained from the other party.

In another embodiment, if both users have SMS-enabled devices, the system can still match the users, with the users verifying the match, in an embodiment, by exchanging codes generated by the server. Various code schemes can be used and this application is not limited regarding the codes schemes which can be used. In one embodiment, a first user can be provided two codes: one to provide to a second user, and one to verify the code given to first user by the second user. The second user receives a similar pair of codes from the server for the same purpose. Alternatively, both users can send the same arbitrary passcode to the server from their respective devices to indicate their match. Alternatively, the driver can post a code in the window of the vehicle, and the rider can then enter that code into the rider's device, or a user can provide a card to another user with a code or key word, or display a code or keyword on the device, on the screen or on the back of the device. Alternatively, a rider can post the license plate of a driver's car, thus creating a connection between the two users.

The identity authentication and verification system can use a variety of other methods to indicate that the two users are physically together. For example, they can exchange codes or indicators by Bluetooth, QR code, location by proximity to cellphone towers, location by proximity to known Wifi locations, or other means.

In an embodiment, the following method of identity authentication and verification can be used:

Step 1: Connect: By proximity, with user's device providing current location to the said computer, which may be a server, using GPS or using an entered location. By exchange of generated code provided by said computer. By providing a posted or fixed code to the other person. By both parties providing to said computer an identical arbitrary code. By one user providing a fingerprint to said computer using a fingerprint reader on the device of the other user. By one party entering into the party's device the license plate of the other party, using a license plate reader or entering the information manually. Such data, such as fingerprints and license plates, can also have verification uses. Can be automated with Bluetooth or other short-range communication system. Start button where the user's app automatically provides a location identifier to the server.

Step 2: Verify photo, other person's fingerprint/retina/DNA, and/or license plate.

Step 3: Record: fingerprint/retina/DNA, license plate, photo verification record, GPS trail, photo of license plate, photo of car, photo of other person, or other data.

In an embodiment, the following method of identity authentication and verification can be used:

Step 1: An unregistered user can verify a registered user's image/profile in the following manner: a registered user enters the unregistered user's information such as license plate, phone number, code, address or GPS for location matching, or other identifier.

Step 2: The unregistered user then enters corresponding information, that can be matched with the information provided by the registered user, such as license plate, phone number, or location, to the system server, to access and view the registered user's image and profile.

Step 3: The association is recorded by the server to indicate a connection.

In an embodiment, the registered user can send the unregistered user's phone number, email, Twitter handle, or other unique identifier to the server by SMS or by using the app, website, or other service. The unregistered user then receives a text message, email, or other communication with a link to the user's profile and/or other features of the verification system. The unregistered user can now participate in many of the system's features, including viewing the profile, feedback, photograph, etc. of the registered user, with the unregistered user now identified by the phone number or other unique identifier.

Optionally, fingerprints or retinal scans can be collected as proof of identity. In this case a user can take a photograph of the other user's fingerprint or fingerprints (best taken with the fingers against an object to assist the camera in focusing properly). If a fingerprint reader or retinal scanner is available, these devices can be used to collect biometric information. DNA sample can also be collected. These biometric identifiers can be used to indicate identity within the system, to connect to other information within or outside of the system, or can be used as backup identification if there is a need later for strong identification. Records of fingerprints can be stored offline to improve data security if they're only used for backup identification, since they don't need to be accessed dynamically by the server.

The identity authentication and verification system can also use a combination of data for identification as well as a number of data sources and forms of identification: such as a Facebook profile, a custom user profile such as smoking and music preferences, a background check, including criminal, driving, credit records, etc., email/phone/cc/mailing address verification, feedback and ratings. These identifiers can be provided directly by the user, or by using other information provided by the user or third parties.

In an embodiment, the carpooling or ridesharing of individuals and/or groups can be verified by coexisting movement. Two or more parties sharing a vehicle, can continuously or periodically and independently transmit their location (acquired by GPS or other means) to a server, can have their paths compared to verify that they have shared a journey.

The identity authentication and verification system can use a public display or other external monitor as the verification means with SMS.

A user of the identity authentication and verification system, in an app embodiment, who is a driver can approach by pulling a vehicle over to a potential rider. Either the driver or rider can start the verification process. For example the rider can start the verification process. If the driver is also using the identity authentication and verification system then the driver and rider can show a list of nearby users initiating matches by means of the identity authentication and verification system executing computer executable program logic to confirm the proximity of the GPS coordinates received from each of the driver's phone and the rider's phone, and one party can select the other party from the list. Optionally, the identity authentication and verification system can prompt the rider to check the license plate of the vehicle, using the rider's device to show to the driver a message such as "HONK™ ride verification. License plate photo OK?", to inform driver what action to expect of the rider. In other embodiments, the identity authentication and verification system can use an ID with code and photo mailed to a user which avoids use of a false identification document. Use of a verification code and a mailing address which is not a PO Box can provide a level of security and authentication.

In an embodiment, a server-based authentication program can be installed on a server with access to a database comprising user profiles, each profile comprising a user image, is in communication with a first user possessing a data-capable handheld device and a second user possessing an SMS-capable mobile phone, transmitting to the first user's device, the second user's user image and a first verification code and transmitting an SMS to the second user's phone containing a second verification code; the first user visually confirms a match between the second user's appearance and the program-provided user image, and transmits the second verification code provided to the second user to the authentication program using its handheld device and the second user visually confirms that the first user's device has received and displayed the image originally provided by the second user and transmits the first verification code to the authentication program via SMS; the authentication program verifies confirmation from the first user, and compares the verification code received from the second user to the first verification code; where the program finds the codes match, the authentication program transmits an indication of confirmation to both users.

In its many and varied embodiments, the identity authentication and verification system can use and interface with data-capable handheld devices utilized in and with this identity authentication and verification system which can include but are not limited to smartphones, such as iPhone or Android-based mobile phone, a tablet, such as an iPad, iPod touch or Android-based tablet device, or any similar portable data-capable device as can be capable of transmitting, receiving and displaying the data described.

In an embodiment, the identity authentication and verification system can generate user profile used in this system which are created in response to a request and can include additional data, such as identifying details (e.g, where a user is a driver, the profile can include the make, model and license plate number of the user's automobile), reviews and/or ratings by other users, or other information.

In its many and varied embodiments, the identity authentication and verification system can have a system of identity authentication and verification having any, some or all of the features disclosed and/or specified herein.

In its many and varied embodiments, the identity authentication and verification system can have a method of identity authentication and verification having any, some or all of the features disclosed and/or specified herein.

The systems, methods, means, software products and applications disclosed herein solve the problems which exist with providing communication between individuals within line-of-sight of a user's device display and also and/or simultaneously and/or concurrently communicating with those unable to see the user's device display.

The systems, methods, means, software products and applications disclosed herein also solve the problems which exist with providing communication between individuals who are not in sight of one another. In embodiments, the identity authentication and verification system can use GPS, location, proximity, cell tower, or other data and/or communications technology and systems to facilitate simultaneously and/or concurrently communicating with those unable to see the user's device display.

For example, the disclosure herein provides solutions which result in safe, real-time, effective and well-documented rideshare transactions which can be readily accessed by individuals and/or masses of transportation users and achieve affordable and environmentally friendly transportation.

The systems, methods, means, software products and applications disclosed herein solve problems which exist with ridesharing. The disclosure herein provides solutions which result in safe, real-time, effective and well-documented ridesharing which can be readily accessed by individuals and/or masses of transportation users and achieves affordable and environmentally friendly transportation.

In an embodiment, the identity authentication and verification system can be used in dating and other social circumstances.

This disclosure in its many and various embodiments solves the problem of simultaneous content communication with online networks and content communication within a vicinity. Such content can be visual, audio, tactile, vibrations, or other content perceptible to a person. The methods disclosed are not limited regarding the kind, type and nature of the communication.

In an embodiment, the application can display destination and/or type of transportation desired to be used, for example, for the purpose of soliciting rides, passengers, or taxisharing. Mobile apps which coordinate shared transportation do so through the internet using maps and other displays of information to the user.

A display can connect people with compatible destinations and/or modes of transportation in the real world. Two indicators, mode of transportation desired and destination, can be displayed simultaneously. Alternatively, each indicator can be displayed independently. In addition, branding information, such as a logo, can be displayed, or branding information alone can be displayed to indicate a need for a ridesharing match. Other information, such as fee offered or requested, can also be displayed.

Herein the term "app" is to be broadly construed to in addition to its ordinary and customary meaning to also encompass and mean any software application and/or hard coded application and/or software means which can run any part of or all of the computer software and methods disclosed herein. Herein "app", "application" and "software application" are used synonymously. It is intended that this disclosure and the term "app" include individual devices, multiple devices, cloud-based systems and distributed system and any devices which interface with any such systems. Software as a service and alternative processing and/or computing platforms are also encompassed and hereby disclosed.

Furthermore, the app ("app" is a broad term intended to include within its scope at least any software application, software, computer program, part or subroutine of a computer program, as well as any interfaces, GUIs, network requirements and other aspect of a computer application; "app" is used synonymously with application, computer application and software application; "app" also has its ordinary and customary meaning), that generates the display can simultaneously broadcast a user's desire to travel and corresponding indicators to other users with the medium of the Internet or other networked system.

FIG. 1 is a functional block diagram of a computer system which performs execution of computer processes. The computer systems include a computer 100, a memory 102, a processor 104, an optional network interface 106, an optional bulk storage 108, an input/output interface 110, a display 112, a rider device display 113, and a driver device display 114. The databases can comprise: a database of data regarding ridesharing 115; and a transportation data 116 database; and/or an optional rider data 117 database; and/or an optional driver data 118 database; and/or an optional other data 119 database; and/or a database 200 (FIG. 2) which can optionally have a broad variety of data regarding the rideshare system, transportation, rideshare participants. The computer system can also optionally comprise an input/output buffer 121, a data buffer 122, a transportation data buffer 123, and an optional rider data buffer 124, an optional driver data buffer 125, and optional rideshare data buffer 126, as well as an optional geographical data buffer 127, an optional members' data buffer 128, and a telecommunications data buffer 129. This disclosure is not limited regarding the types and quantities of data which can be held in memory and processed. The computer can execute a program logic 130. The program logic 130 which can be executed by the computer's processing unit(s) can comprise a logic to identify matches 131, and/or a logic to identify location matches 132, and/or a logic to identify trip matches 133, and/or a communication logic 134, and/or a logic to display content 135. This disclosure is not limited regarding the nature and types of logic and programming which can be processed and/or executed by the system.

Figure 2A:
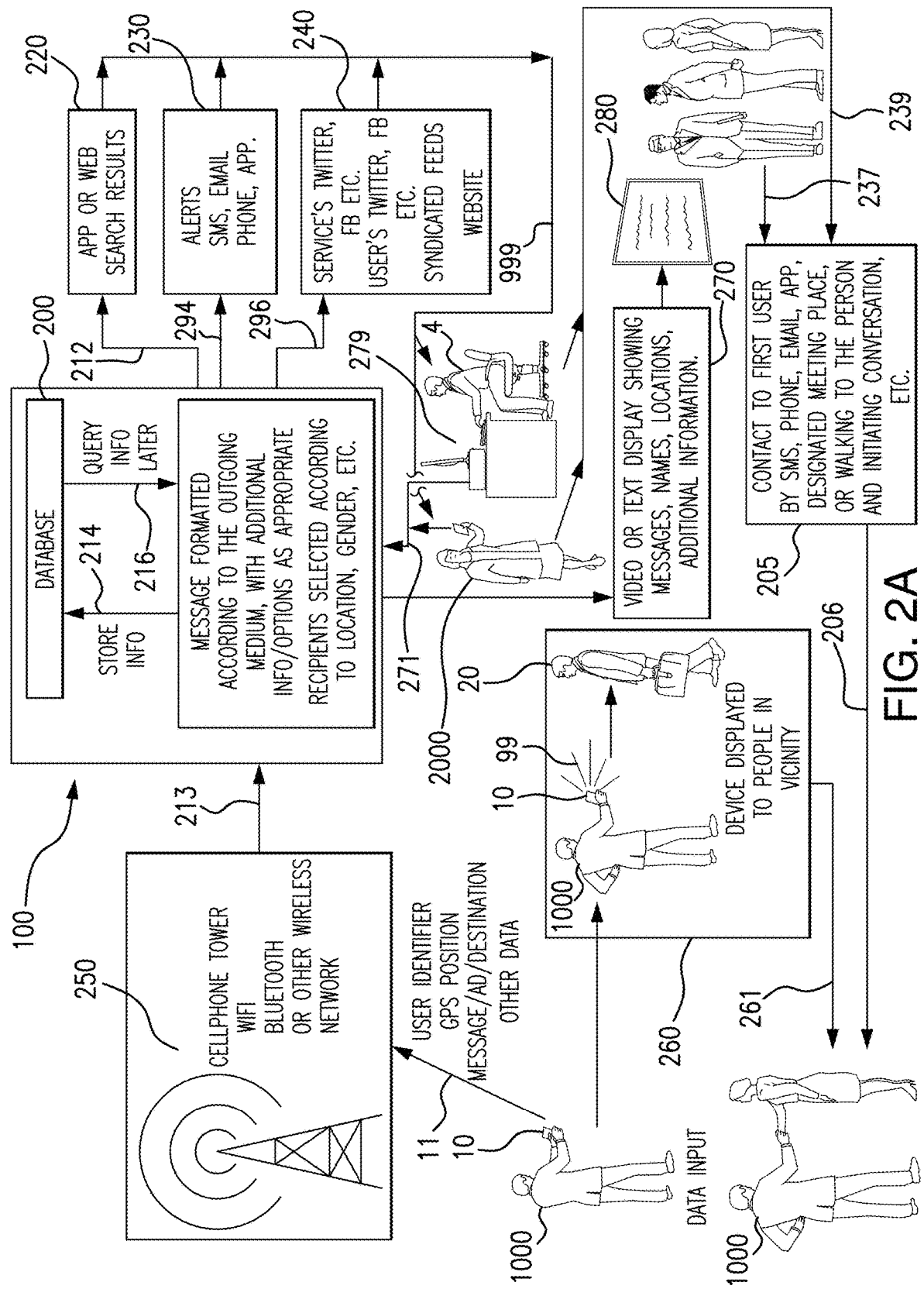
FIG. 2A is a schematic diagram of an embodiment of a communications system.

FIG. 2A is a schematic diagram of an embodiment of a communications system.

The example of 2A depicts a first user 1000 who has a need and/or message to communicate to a second person 2000. First user 1000 can use wireless device 10 to communicate user information data 11 to communications device 250. In non-limiting example the user information data 11 which can in non-limiting example have a user identifier data, a GPS position data, a message data, an advertisement data, a destination data, a temporal data, such as a departure time, pick up time, meeting time, or other time. There is essentially no limitation to the data which can be provided by first user 1000. In an embodiment, the identifier data can in non-limiting example be a unique serial number, user name, email address, phone number, or any attribute or characteristic which identifies any individual, multiple individuals, or group of individuals.

Figure 3:
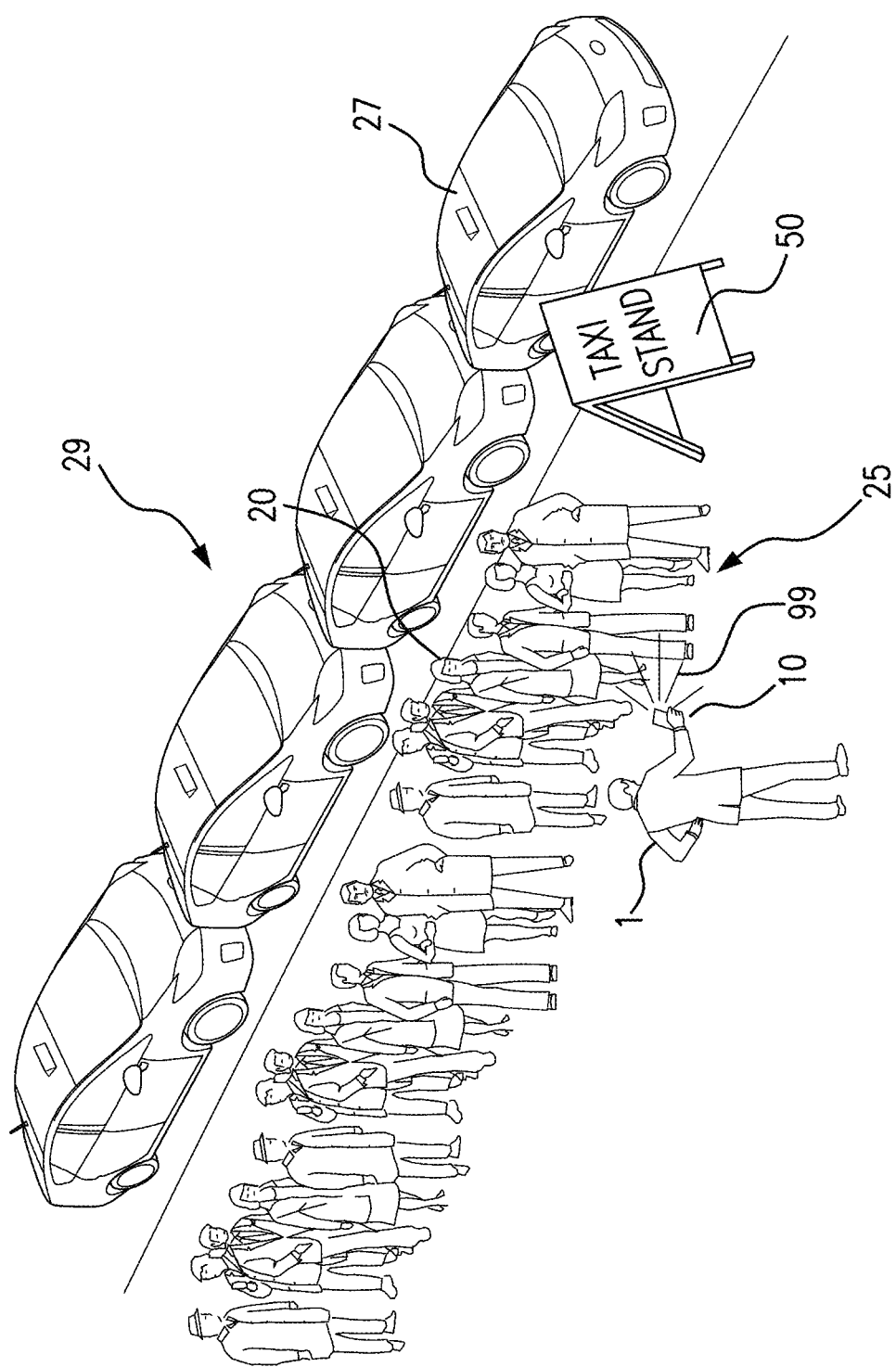
FIG. 3 is a schematic diagram of an individual using an embodiment of a communications system.

In an embodiment, the communications system can simultaneously process the user information data 11 to be transmitted to the computer 100, and wireless device 10 can be used to display a message to a sign-viewing person 20 or a plurality of a sign-viewing person 20 in sight and/or audio range of the wireless device 10. In non-limiting embodiments, the wireless device 10 can be used as a sign 99 to display a message to a sign-viewing person 20 and/or sign-viewing group of people 25 (FIG. 3). In an embodiment, a display 280 can be used to communicate content to one or more people. In an embodiment, a sign 99 can be displayed simultaneously to the transmission of electronic communications 999 to a second person 2000, or to one or more recipient devices of people not in visual sight and/or audio range of the wireless device 10.

The communications device 250 can be any device receiving data from wireless device 10, such as a repeater unit, receiver, cell phone tower, Wifi, Bluetooth, or other nextwork whether wireless or wired. Data stream 213 comprising in non-limiting example the user information data 11 can be transmitted to the computer 100.

Computer 100 can process the user information data 11, as well as other data, by optionally storing the data in its database 200 (FIGS. 2A and 2B), or other memory 102 or databases as disclosed herein or otherwise used. In an embodiment, the service can format a message according to an outgoing medium and/or system and/or network. A message sent by computer 100 can be transmitted to any recipient or group of recipients. In non-limiting example, one or more recipients can be selected according to time, destination, location, origin, gender, vicinity or other criteria. In an embodiment, the processor 104 of computer 100 can communicate information as a store info 214 process in its database 200 and can provide data via a query info later 216 process. All processing can be dynamic, real-time, batch, or any other processing technique which supports the communications system disclosed herein.

In an embodiment, data can be provided by data stream 212 to an app or web search results 220. In an embodiment, data can be provided by data stream 294 to an alerts functionality 230. Such alerts can be in non-limiting example SMS, phone, email, application or by other means. In an embodiment, data can be provided by data stream 296 to a data and/or communications service 240 such as in non-limiting example Twitter, Facebook ("FB"), public or private communications system and/or network, website or other communications means.

In another embodiment the computer 100 can transmit data to a display 270. The display 270 can be a public and/or private display. In non-limiting example, the display 270 can be a video display, audio display, audio-visual display, digital display, monitor display, TV display, projected display, or any other display which communicates the data to a recipient.

Optionally, a user 4 can use a wired device to provide data to the computer 100 via computer 279 by data stream 271.

In an embodiment, 261 (FIG. 2A) indicates an initiation of contact to the first user 1000 by one or more people who have seen the first user's information on the first user's handheld or wearable wireless device or projector.

Figure 2B:
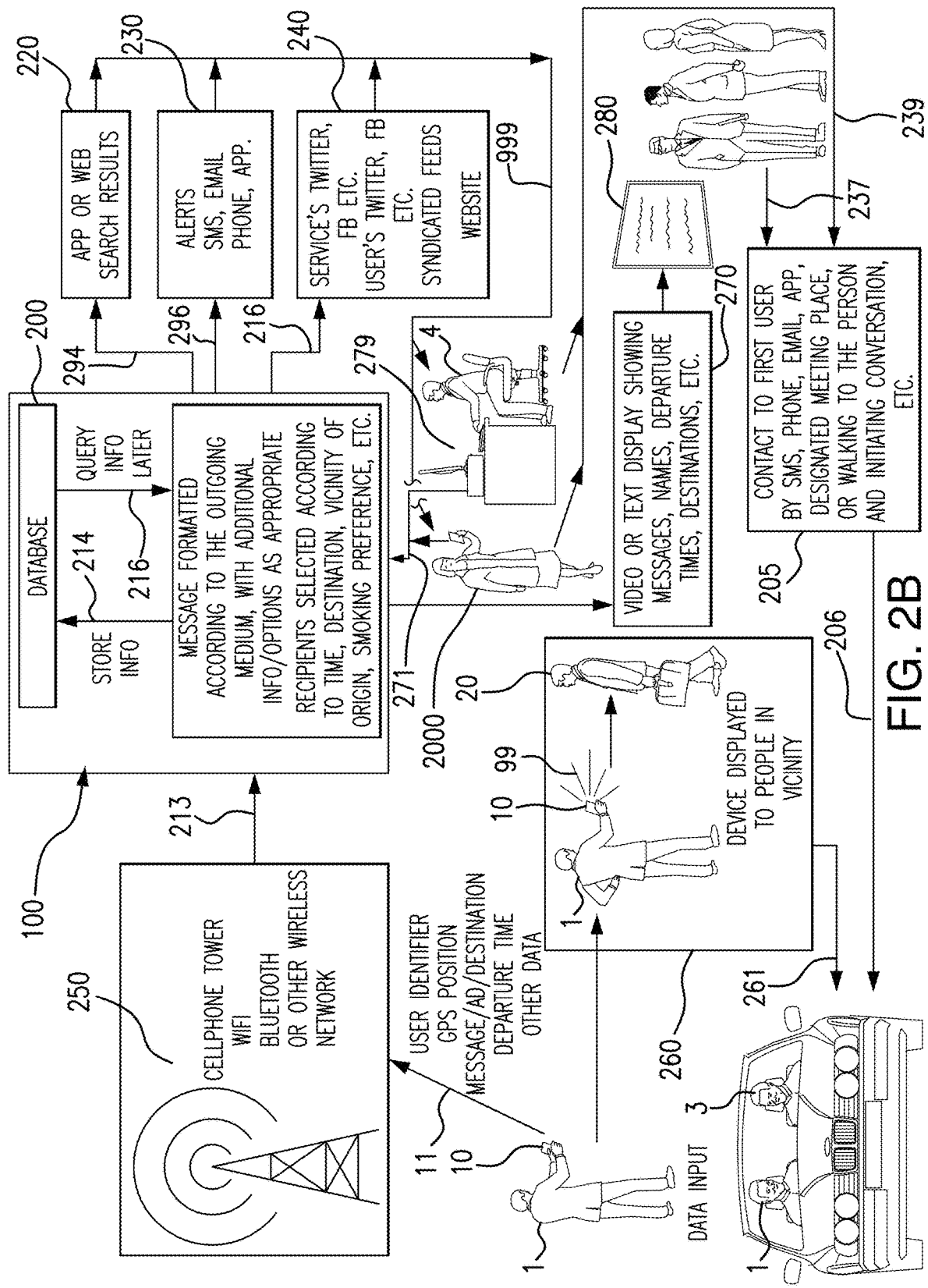
FIG. 2B is a schematic diagram of another embodiment of a communications system.

FIG. 2B is a schematic diagram of another embodiment of a communications system.

The example of 2B depicts a rider 1 who is seeking a ride. Rider 1 can use wireless device 10 to send user information data 11 to communications device 250. In non-limiting example the user information data 11 can have a user identifier data, a GPS position data, a message data, an advertisement data, a destination data, a temporal data, such as a departure time, pick up time, meeting time, or other time. User identifier data refers to a unique serial number, user name, email address, phone number, or any attribute or characteristic which identifies any individual, multiple individuals, or group of individuals. The communications device 250 can be any device receiving data from wireless device 10, such as a repeater unit, receiver, cell phone tower, Wifi, Bluetooth, or other network whether wireless or wired. Data stream 213 comprising in non-limiting example the user information data 11 can be transmitted to the computer 100. Computer 100 can process the user information data 11, as well as other data, by storing the data optionally in its database 200, or other memory 102, or databases as disclosed herein or otherwise used. In an embodiment, the service can format a message according to an outgoing medium and/or system and/or network. A message sent by computer 100 can be transmitted to any recipient or group of recipients. In non-limiting example, on or more recipients can be selected according to time, destination, location, origin, gender, vicinity or other criteria. In an embodiment, the processor 104 of computer 100 can communicate information as a store info 214 process in its database 200 and can provide data via a query info later 216 process. All processing can be dynamic, real-time, batch, or any other processing technique which supports the communications system disclosed herein.

In an embodiment, data can be provided by data stream 212 to an app or web search results 220. In an embodiment, data can be provided by data stream 294 to an alerts functionality 230. Such alerts can be in non-limiting example SMS, phone, email, application or by other means. In an embodiment, data can be provided by data stream 296 to a data and/or communications service such as in non-limiting example Twitter, Facebook ("FB"), public or private communications system and/or network, website or other communications means.

In an embodiment, the communications system can simultaneously process the user information data 11 to be transmitted to the computer 100 and wireless device 10 can be used to display a message to people in sight and/or audio range of the wireless device 10. In non-limiting embodiments, the wireless device 10 can be used as a sign 99 to display a message to a sign-viewing person 20.

In an embodiment, the communications system can simultaneously process the user information data 11 to be transmitted to the computer 100 and wireless device 10 can be used to display a message to people in sight and/or audio range of the wireless device 10. In an embodiment, computer 100 can be a server. In non-limiting embodiments, the wireless device 10 can be used as a sign 99 to display a message 99 to a second person 2000. In an embodiment, a sign 99 can be displayed simultaneously to the transmission of electronic communications 999 to one or more recipient devices of one or more people, a plurality of a sign-viewing person 20, not in visual sight and/or audio range of the wireless device 10. In an embodiment, a display 280 can be used to communicate content to one or more people.

In another embodiment the computer 100 can transmit data to a display 270. The display 270 can be a public and/or private display. In non-limiting example, the display 270 can be a video display, audio display, audio-visual display, digital display, monitor display, TV display, projected display, or any other display which communicates the data to a recipient.

Optionally, a user 4 can use a wired device to provide data to the computer 100 via computer 279 by data stream 271. In an embodiment, 261 (FIG. 2B) indicates an initiation of contact by a rider 1 by or riders who have seen the first user's information on the first user's handheld or wearable wireless device or projector.

In an embodiment, the computer transmits rider data to a driver 3 having a car, or other vehicle or means of transportation or mode of transportation. Communications are also sent from driver(s) and/or recipient(s) to the computer 100 and to rider 1. Driver(s) performing connection initiation 237 or connection initiation 239 can provide communications 205 can be provided to rider 1 by data stream 206. The driver communications 205 can include in non-limiting example contact with rider 1, SMS messages, email messages, telephonic communications, electronic communications, audio communications, or other information and/or data. In non-limiting example an offer of transportation data which can be communicated to the rider 1 can include in non-limiting example meeting place, walking information, GPS data, travel data, conversations, messages, or other data.

In addition to its ordinary and customary meaning, the term "a device" is intended to have within its scope of meaning any electronic device and/or computer. This term is to be broadly construed. In non-limiting example, a device can have within its scope of meaning one, more or all of the following: smartphone such as iPhone, Android-based phone, or Windows phone, other cellphone without the full functionality of a smartphone but comprising at least SMS capability or more complex messaging capability, other wireless computing device such as iPad, iPod Touch, Android-based tablet, Kindle, or Nook, laptop computer, desktop computer, Google Glass, smart watch or other wearable wireless computing device, personal digital assistant (also known as a palmtop computer), or other wireless computing devices not yet created.

In addition to its ordinary and customary meaning, the term "an output" is intended to have within its scope of meaning any perceptible information and/or communication from a device of any kind or type to one or more individuals. This term is to be broadly construed. In non-limiting example, an output can have within its scope of meaning one, more or all of the following: a word or words, including inter alia a rideshare destination, a rideshare request or offer, a romantic availability information, an opinion, a decision, an action, a service, a product, a status, or a text message, a symbol indicating an action such as a car to indicate transportation or a pineapple to indicate that particular fruit, a color, a logo, a sound, including a distinctive sound, or spoken text, a display screen included as an intrinsic part of a smartphone or other device, a connected display screen operated by the device, a video or multimedia projector connected with the device by wire or wireless connection, a laser pointer, especially of a projector type capable of drawing a signifier on a surface removed from the device, and a sound output speaker.

In addition to its ordinary and customary meaning, the term "content" is intended to have within its scope of meaning any information and/or communication and/or message. This term is to be broadly construed. In non-limiting example, content can have within its scope of meaning one, more or all of the following: shared transportation type, destination city, direction, or location, departure time, fee, origin, name, color, shape, job type, price, service, product, negotiating position, sexual orientation, status.

In addition to its ordinary and customary meaning, the term "perceptible" is intended to have within its scope of meaning anything which can be perceived and/or any communication of any type and/or any information of any type. The term "perceptible" is intended to have within its scope of meaning anything which can be perceived by any one or more human senses. This term is to be broadly construed.

In non-limiting example, a content perceptible to an individual can have within its scope of meaning one, more or all of the following: a sign displayed on a handheld or wearable wireless device, a computer-generated or recorded announcement of a text, a projected image.

In addition to its ordinary and customary meaning, the term "rider" is intended to have within its scope of meaning one or more individuals seeking transportation, accepting transportation, being transported, capable of being transported or potentially who can be transported. This term is to be broadly construed. In non-limiting example, a rider can have within its scope of meaning one, more or all of the following: an actual or prospective passenger in a private car, in a taxi, on a bus, on a train, in a plane, on a boat, or any other mode or means of transportation. A prospective passenger can be an individual or accompanied by others or things. Herein "rider" and/or passenger includes within its scope an item, good, thing, package, mail, or deliverable to be delivered by the driver, without another individual accompanying and/or responsible for the package during transport.

In addition to its ordinary and customary meaning, the term "transportation provider" is intended to have within its scope of meaning one or more individuals or transportation means which can provide transportation, desire to provide transportation, are engaged in providing transportation, or have an ability to provide transportation. In non-limiting example, transportation provider can have within its scope of meaning transportation provider can have within its scope of meaning one, more or all of the following: a ridesharing vehicle driver, an automobile driver, a truck driver, a bus driver, a motorcycle driver, a taxi driver, a rickshaw operator, a pedicab operator, a horse-and-buggy driver, a boat operator, an airplane operator, a bus operator, a train operator, or an operator of any transportation of any kind, type, mode or means of transport.

In addition to its ordinary and customary meaning, the term "driver" is intended to have within its scope of meaning one or more individuals or transportation means which can provide transportation, desire to provide transportation, are engaged in providing transportation, or have an ability to provide transportation. In non-limiting example, driver can have within its scope of meaning driver can have within its scope of meaning one, more or all of the following: a ridesharing vehicle driver, an automobile driver, a truck driver, a bus driver, a motorcycle driver, a taxi driver, a rickshaw operator, a pedicab operator, a horse-and-buggy driver, a boat operator, an airplane operator, a bus operator, a train operator, or an operator of any transportation of any kind, type, mode or means of transport.

In addition to its ordinary and customary meaning, the term "public communications device" is intended to have within its scope of meaning any device which communicates to one or more individuals. In non-limiting example, public communications device can have within its scope of meaning one, more or all of the following: public address announcement loudspeaker(s), public electronic notice board, public electronic message board, public trip display, television with scrolling messages, multimedia projector, information kiosk, automated teller machine.

In addition to its ordinary and customary meaning, the term "a need data" is intended to have within its scope of meaning an information of a need, want, desire, request, or wish for a person, a good, or a service. In non-limiting example, a need data can have within its scope of meaning one, more or all of the following: a request for a ride, an offer of a ride, an information of an employment position, employee, a person, or a good or a service needed or desired.

In addition to its ordinary and customary meaning, the term "message data" is intended to have within its scope of meaning any communicated information. In non-limiting example, message data can have within its scope of meaning one, more or all of the following: a need data, a travel destination, a status, a mood, a name, a role, a type, a color or other symbolic communication, a logo, icon, exemplar, avatar, or brand name, a price, a quality, a cardinal number, a time, a date.

In addition to its ordinary and customary meaning, the term "user information" is intended to have within its scope of meaning any information that a user desires to communicate, provide and/or disseminate.

In addition to its ordinary and customary meaning, the term "communication criterion" is intended to have within its scope of meaning a characteristic or attribute by which the computer will determine a matching target for communication, individual, recipient and/or electronic recipient. In non-limiting example, communication criterion can have within its scope of meaning one, more or all of the following: availability, interest, location, age, sex, marital status, smoking preference, employment status, opinion, travel plans, willingness to pay, pet ownership, subscriber or membership status, active user status, food preference, musical preference, beverage preference, current role.

In addition to its ordinary and customary meaning, the term "status criterion" is intended to have within its scope of meaning a characteristic or attribute by which the computer will determine whether a user has an attribute or belongs to a particular class, such as a class of locally available transportation providers, or a class of meeting members eligible to make a motion. In non-limiting example, status criterion can have within its scope of meaning one, more or all of the following: availability, interest, location, age, sex, marital status, smoking preference, employment status, opinion, travel plans, willingness to pay, pet ownership, subscriber or membership status, active user status, food preference, musical preference, beverage preference, current role.

In addition to its ordinary and customary meaning, the term "communication data" is intended to have within its scope of meaning any information and/or data which is communicated and/or related to a communication from any user and/or the system In an embodiment the communication system can have a visual display either on a device or through other visual means, as well as interfacing a user with internet networking. In an embodiment, a user networked sign can be generated, which is a visual sign regarding a rideshare data for a user simultaneously interfacing with the rideshare application over the internet.

In an embodiment, the communication system combines collection of rideshare data using a wireless device and transmission of that rideshare data to a remote server.

In an embodiment, rideshare data can be displayed on the device itself, such that others can see the device screen when it displays a rideshare data, the device screen is a small billboard sign for display to others besides the user.

In embodiments, other display devices can be used in addition to or instead of the device screen.

A user of the system can use a wireless device to transmit data to a remote server, with that data being available to other users. In a non-limiting example, a user can complete a user profile for matching and access by other users, and send communications to other users, said communications being later available for reference by both the sender and recipient.

In another non-limiting example, for offering or obtaining rides, a user can complete a profile with general information and also transmits information about the specific transportation match currently desired, for use by other users in the system.

If wireless service is not available, a user can enter a message is entered into a form, and then a message can be displayed, usually in large type, on the screen to be shown to and seen by others.

In an embodiment, a user can use a data input form or sequence to send information to a remote server for use in information networks such as a rideshare system and also to display the information on the wireless device used to send it thus allowing a rideshare message to be shown on that device screen to others like a small billboard and/or sign.

Optionally, the information can be displayed on a public screen(s) or other display device, and used by the remote server in information networks. Such public screen can be in addition to or instead of the display on the device used for data entry.

In an embodiment, the device is a cellphone which is used to provide the data to a public display.

In an embodiment, the rideshare system can exchange data with a wireless device with a data input interface, such as a form on an app, wireless transmission of the data to a remote server, availability of that information through conventional means to other network users, including through an app or through email, SMS or telephonic messaging, and display of the information in some form on the wireless device, optionally in combination with display on a remote screen or other display device. Optionally, a display can be produced by the wireless device and/or on a remote screen or other display device.

The rideshare system achieves expanded availability of communications channels for communication of a specific need or message to another person who might not have a wireless device or Internet-enabled computer but who is in the vicinity of the visual display device.

Both riders and drivers can use the technology disclosed herein to match people to satisfy HOV requirements. For example, in the San Francisco and DC areas, HOV-3 restrictions require at least three vehicle occupants, i.e. a driver and two passengers, to travel in the HOV-3 lanes. In another non-limiting example Rideshare technology allows a driver to readily find one, two or more passengers. From the passengers' perspective, rideshare technology allows one, two or more passengers in need of transportation to readily find a driver.

In an embodiment, HOV data can be used to optimize ridesharing routes, to match drivers and riders and to increase the cost effectiveness of ridesharing and shared transportation.

In an embodiment, data sent to the rideshare system can be analyzed to determine whether a passenger and driver are progressing together in the same direction at the same time. Such data analytics can confirm whether the driver and passenger are demonstrating a carpool behavior. Such information can be used to determine the occurrence, efficiency and effectiveness of a rideshare and/or carpool, as well as being of use to private or governmental authority, such as a parking authority.

In an embodiment, GPS data and/or identity data can be used with identity verification systems to improve personal safety by implementing surveillance and/or recordkeeping for the transportation transaction.

FIG. 3 is a schematic diagram of a rider 1 who is seeking a ride using an embodiment of a communications system to communicate a content by using a sign 99 to display a message to a sign-viewing person 20 and/or sign-viewing group of people 25 (FIG. 3). This disclosure is not limited to the type or nature of the sign and also not limited to the recipients of the visual, audio and/or audio-visual message.

The embodiment of FIG. 3 depicts a rider 1 who is seeking a ride displaying a sign 99 to display a message to a sign-viewing person 20 and/or sign-viewing group of people 25 at a taxi stand 50. In an embodiment, the communications system can simultaneously transmit an electronic communication to recipients, which can include a variety of transportation providers including drivers and taxi drivers. In an embodiment, the driver of taxi 27 and/or taxis 29 can receive a communication through the communications system. In an embodiment, one or more drivers, taxi drivers or other transportation provider(s) can view and/or hear the message of rider 1 communicated by wireless device 10, such as the sign 99.

In an embodiment, this disclosure provides a system for displaying travel indicators, including destination and related information, to people in the proximity of the user's mobile device, for the purpose of coordinating shared transportation.

In an embodiment, the communications system can have a method of displaying transportation information to people in the vicinity of a user's mobile device, having all of the features specified.

In an embodiment, a rider in need of transportation (as set forth above, "rider" is intended to include a person or an non-person, in non-limiting example an item, a thing or a package) can use a wireless device to alert nearby people of the need for a ride. Such a request for transportation can be a request of a ride to a specific location, in a general direction, or anywhere or any direction. People can see the communication via a sign displayed with the user's device, via an enabled screen on the wireless device if available. Optionally, the rideshare system can electronically transmit a rider request and/or other data by email, SMS, telephonic, or app communication. The system can transmit such rider request and/or other data to a membership, actively subscribed members of a rideshare offering, the public or a targeted group. Herein, a ride in intended to include a ride for one or more people, or the act of taking an item, good, think or package to a destination.

A driver can use the rideshare system to offer transportation. Such an offer of transportation can be an offer of a ride to a specific location, in a general direction, or anywhere. The destination can be specified by text or by a destination point on a map. The display of the offer of transportation can be visually displayed to others, passersby or people in the user's vicinity. In non-limiting examples, a visual display of an offer can be made by display on a handheld device or by other means on a train, or train platform, at an airport, at a music or sports event, at a meeting, conference, or convention, in a hotel lobby, in a bar, on a street corner, or anywhere people congregate or pass and can want a ride.

In an embodiment, a screen can be available to display information from the device on the train platform, in the hotel lobby, or elsewhere, either by directly supporting the rideshare system or by making the display available to the public or to a specific user and/or users.

Optionally, a subscription service model can be used and those subscribed to the service can receive notification of this offer or request for transportation on their devices, where the offer matches their previously reported coordinated transportation needs, or can access the information by querying the service via an app, web or SMS or similar message-based interface. The display precipitates electronic and/or oral communication between the interested parties. Interested parties can negotiate an agreement with or without payment for shared transportation. This negotiation can be by electronic means, in-person or by telephonic discussion. Alternatively, a travel reservation can be issued using the service, based upon the offered details and fee, with or without payment made using the service, without further negotiation. In an embodiment, the rideshare system can use a listing with an origin and a destination. The listing can be produced by either a transportation provider (e.g. driver) or transportation user (e.g. user).

In a non-limiting example of a rider embodiment, the rider can book a reservation based on the driver's listed origin, destination, time of departure, and fee; but the rider can make a counteroffer of riding destination, fee and time of departure. There is no limit to the information offered or counteroffered. Either or both of the driver and/or rider can accept or reject the others offer. There is no limitation to the negotiation process and/or data exchanged between negotiating participants.

The rideshare system provides real-time interaction between riders and transportation providers. The use of display screens, especially handheld devices, have immediacy of communication. This enables immediate awareness by people in the vicinity of the availability of transportation requested or offered by the user. An additional benefit is communication of the service to potential new users, who can be interested in the display of the wireless device. Including these display modalities together with the established modalities of web-enabled networking allows users to leverage both with one convenient step.

In an embodiment, a network can provide data for a display on a sign indicating destination immediately and communicating travel needs from one party to another within eye sight. Audio communication can also be used. Lights and other audiovisual communication can optionally used. Used in conjunction with a network, where for example a user can find another user somewhere else in an airport looking for a ride to a city center, this method communicates the existence of the app along with the transportation needs to users in an area with one or more people, a few people, or a large number of people who might be transportation matches, and also communicates to a wider group of people who are already using the service; or who can be using any other service, such as in non-limiting example Craigslist, Twitter, or any other service, network or information exchange means accessible to the rider and/or driver and/or rideshare system. Rides offered and desired can also be displayed on an electronic display in any area where people pass or congregate.

Figure 4:
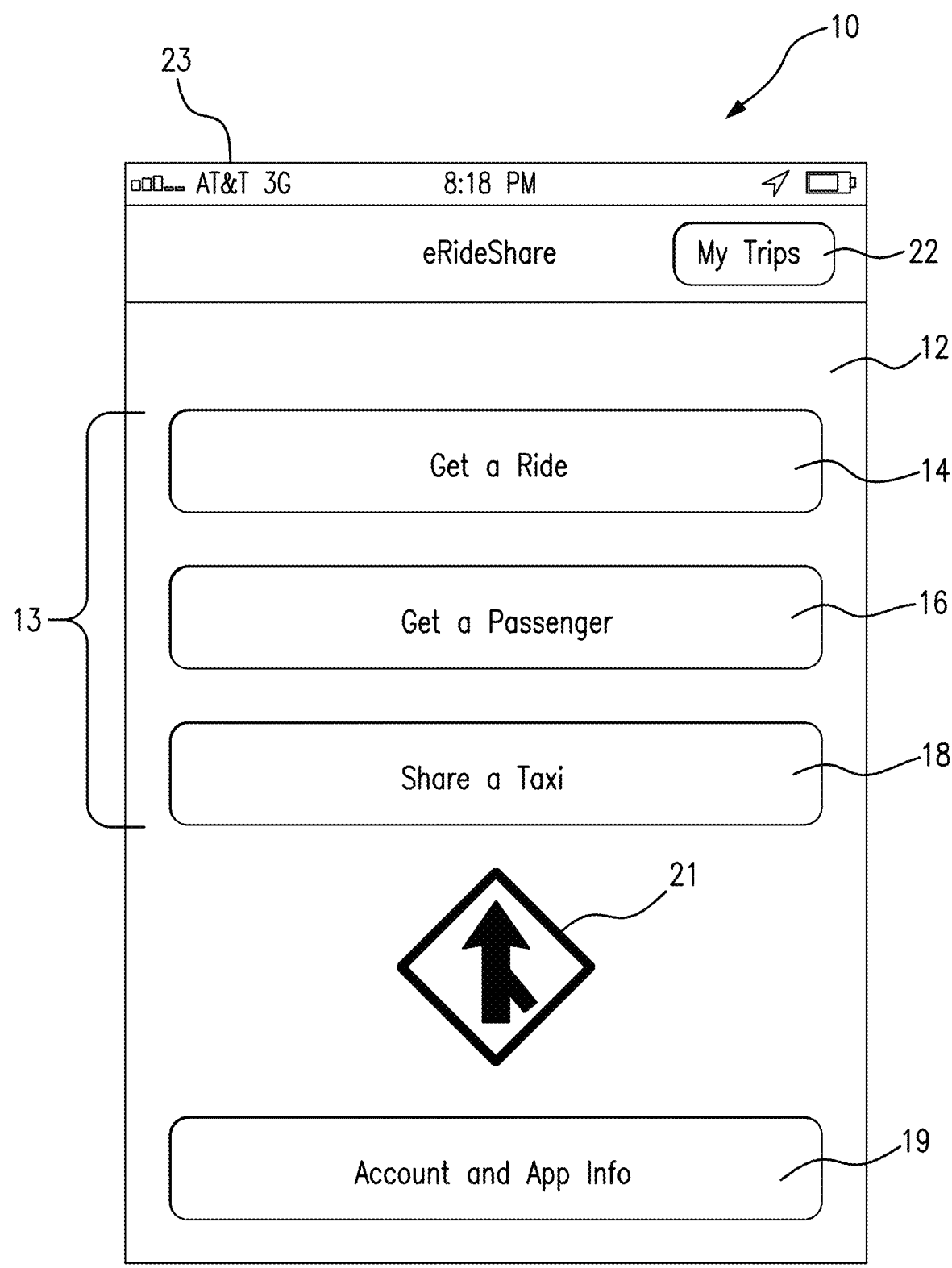
FIG. 4 is a depiction of a screenshot of a home screen.

FIG. 4 is a depiction of a screenshot of a home screen.

FIG. 4 depicts a wireless device 10 having display 12, a wireless status indicator 23, and ride option buttons 13, such as a Get A Ride Button 14, a Get A Passenger Button 16, a Share A Taxi Button 18. A My Trips Button 22 and an account and App Info ("Information") button 19 are also depicted. Optionally, a Logo 21 can be displayed.

Figure 5:
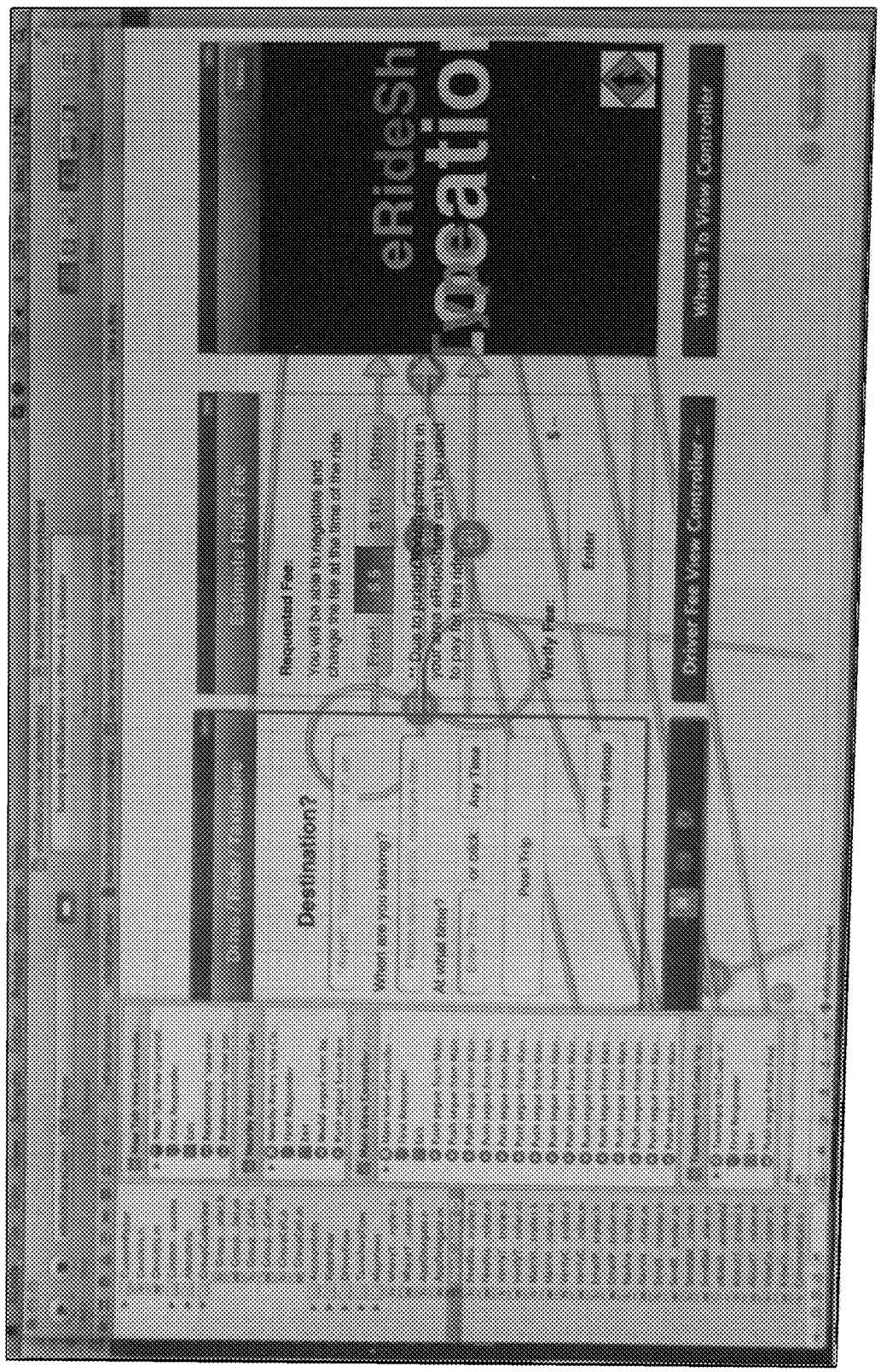
FIG. 5 is a screenshot of entering information to create a sign and send data to computer.

FIG. 5 is a screenshot of entering information to create a sign and send data to computer. FIG. 5 is a screenshot of a software development interface (e.g. Xcode, a product from Apple Inc. for use in developing apps for iOS). The interface depicts the sequence of adding travel information, with the addition of a fee in an optional second step, followed by the display of the sign (data can be concurrently sent to a computer, such as a server).

Figure 6:
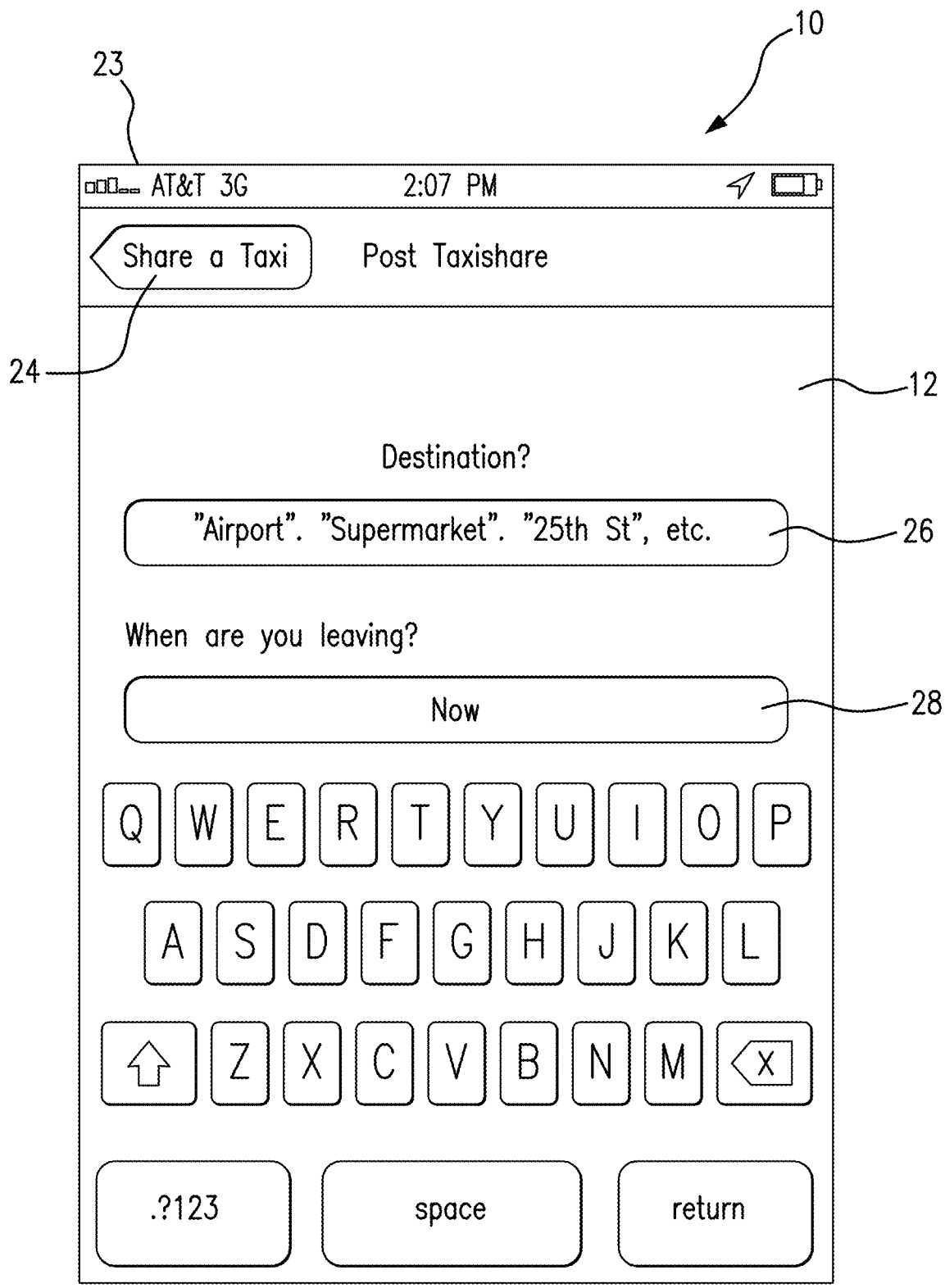
FIG. 6 is a depiction of a screenshot of a Trip Input Screen (Taxishare).

FIG. 6 is a depiction of a screenshot of a Trip Input Screen (Taxishare). FIG. 6 depicts a wireless device 10 having display 12, a wireless status indicator 23 and a back button to "share a taxi" 24. The display 12 also has a destination text input field 26 and a departure date/time input field 28.

In an embodiment, the transportation system can be used to hire a taxi after finding a travel partner.

In an embodiment, the transportation system can be used to summon a taxi and also and/or simultaneously display a destination in a vicinity and/or via the rideshare service to find another passenger while waiting for the taxi.

Figure 7:
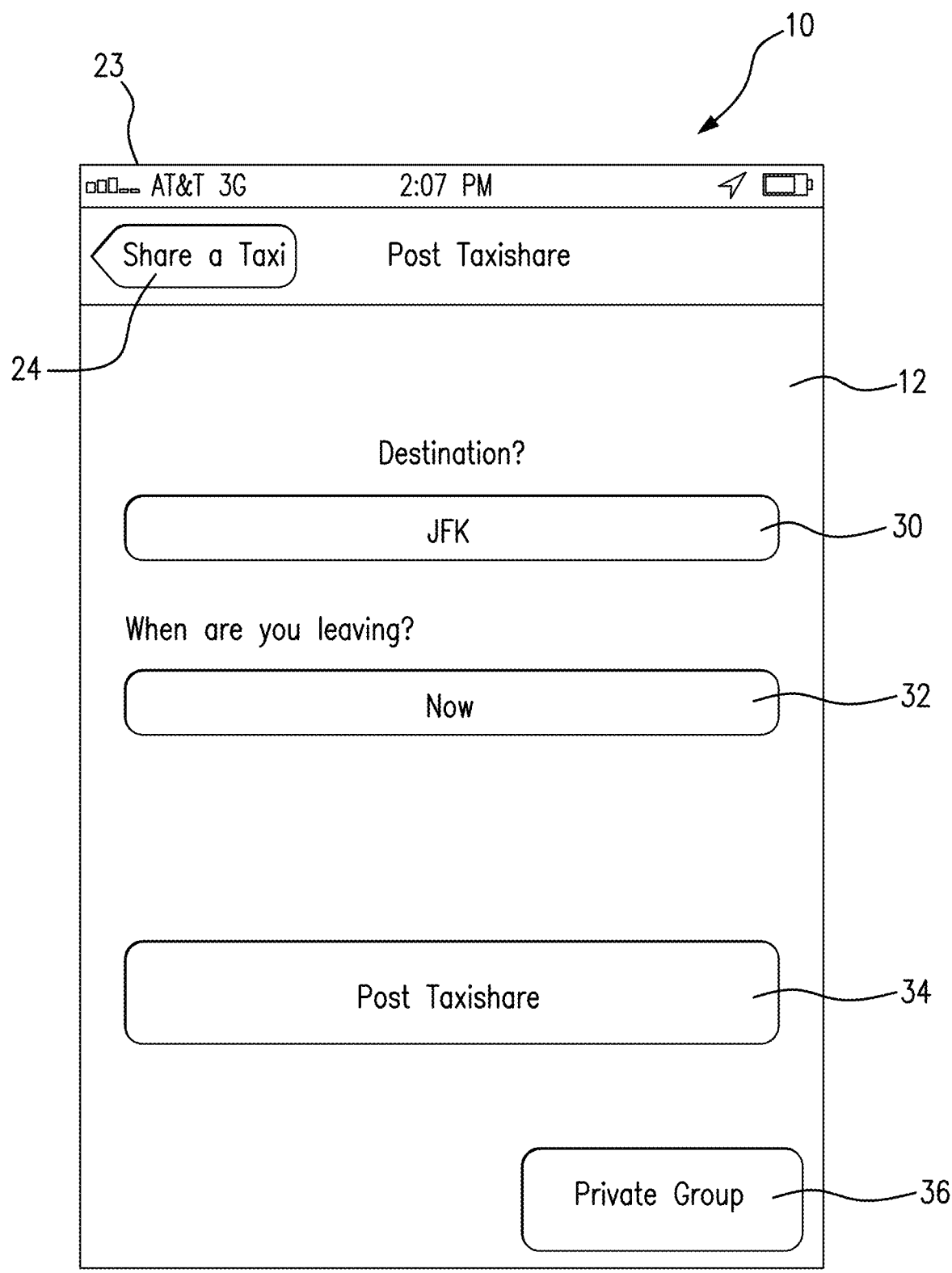
FIG. 7 is a depiction of a screenshot of a Trip Input Screen (Taxishare) with Destination Field Completed.

FIG. 7 is a depiction of a screenshot of a Trip Input Screen (Taxishare) with Destination Field Completed.

FIG. 7 depicts a wireless device 10 having the display 12, the wireless status indicator 23, and a back button to "share a taxi" 24. The display 12 also has the destination text input field with entered data 30 and departure date/time input field 32 with entered data. The display 12 further depicts a post taxishare button 34 and a private group button 36.

Figure 8:
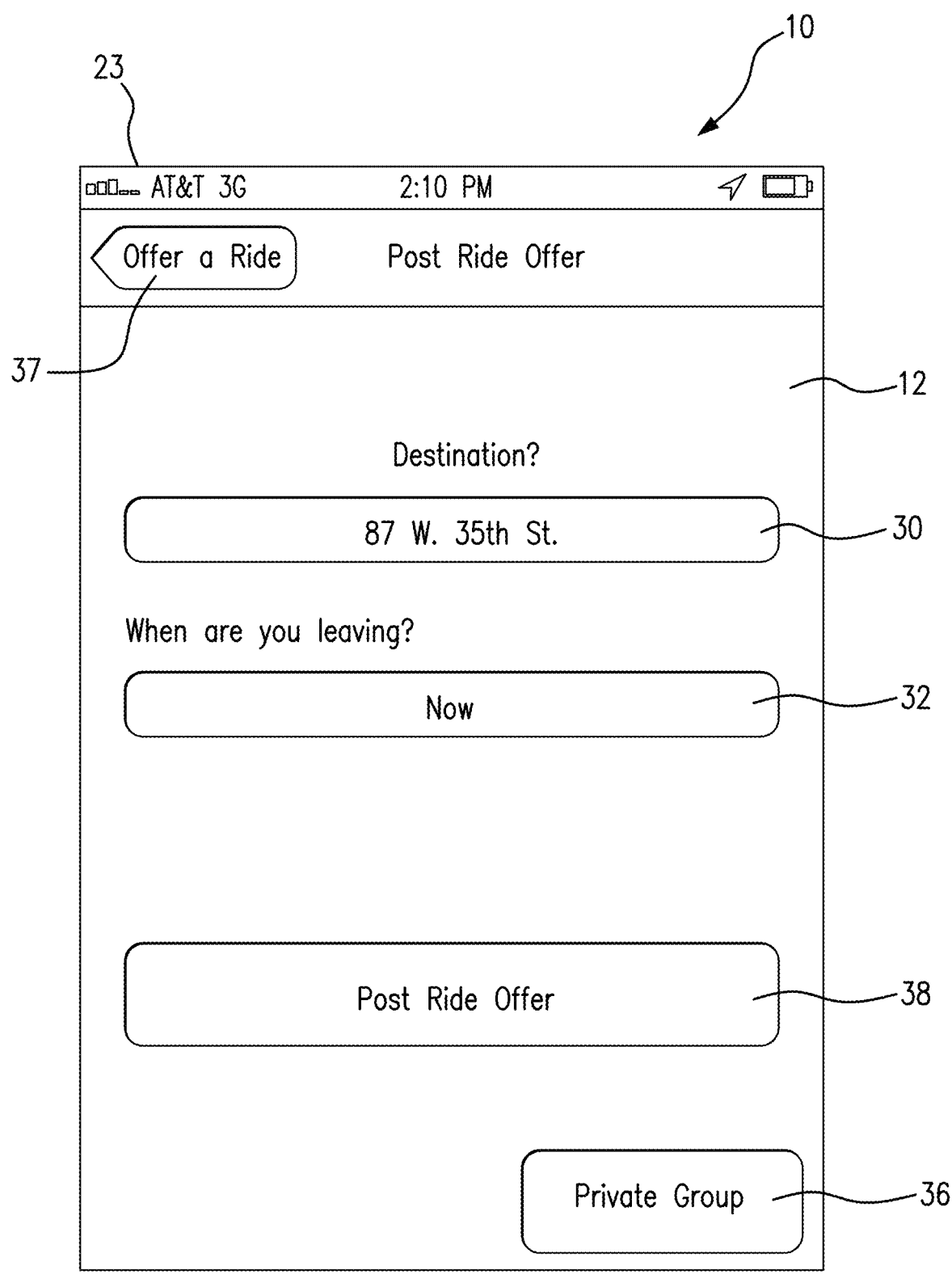
FIG. 8 is a depiction of a screenshot of a Trip Input Screen (Ride Offer) with Destination Field Completed.

FIG. 8 is a depiction of a screenshot of a Trip Input Screen (Ride Offer) with Destination Field Completed. FIG. 8 depicts a wireless device 10 having display 12, a wireless status indicator 23, and a back button to "offer a ride" 37. The display 12 also has the destination text input field with entered data 30 and departure date/time input field with entered data 32. The display 12 further depicts a post ride offer button 38 and a private group button 36.

Figure 9:
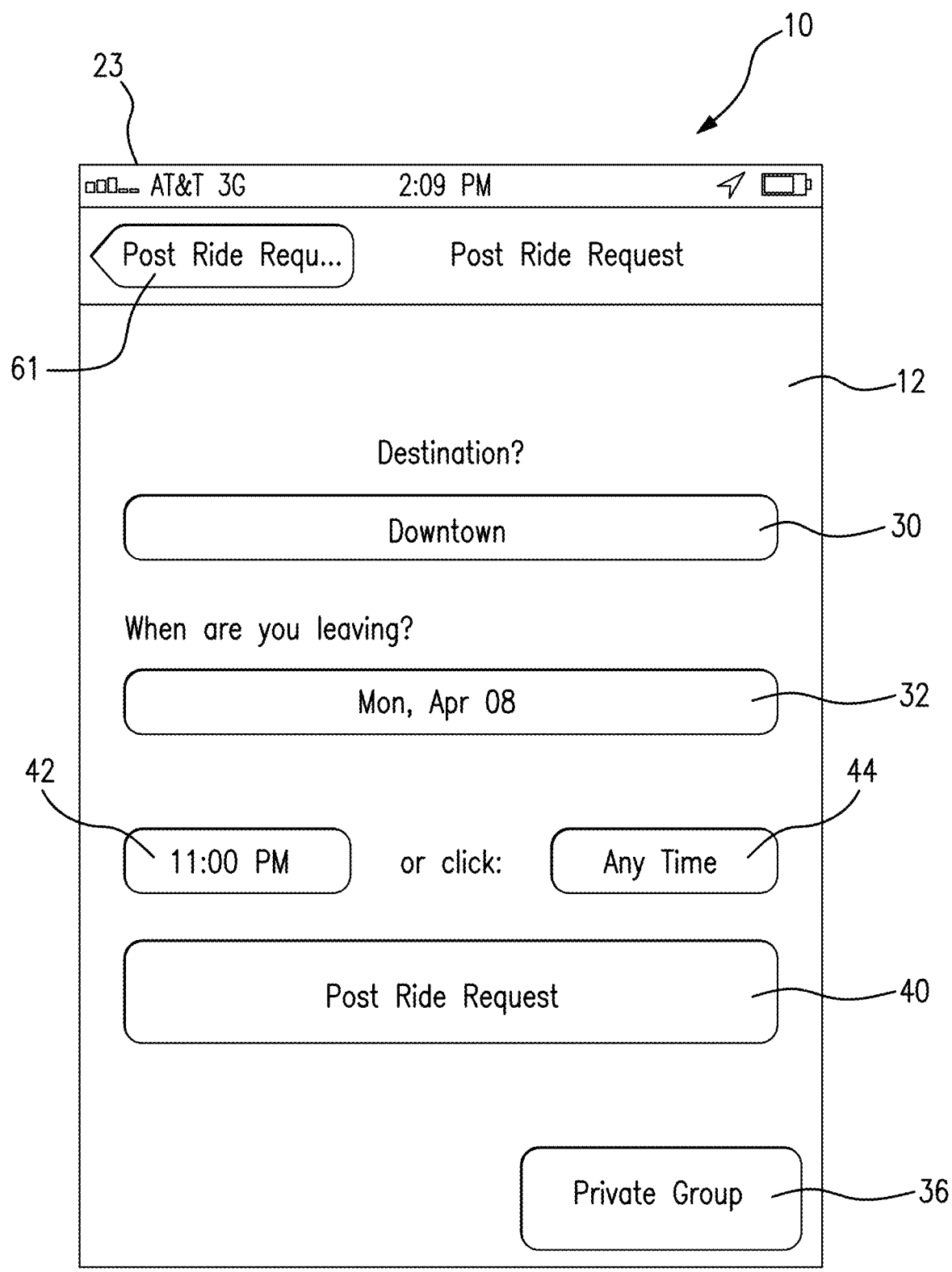
FIG. 9 is a depiction of a screenshot of a Trip Input Screen (Ride Request) with Departure Time Changed.

FIG. 9 is a depiction of a screenshot of a Trip Input Screen (Ride Request) with Departure Time Changed. FIG. 9 depicts a wireless device 10 having display 12, a wireless status indicator 23, and a back button to "post Ride Request" 61. The display 12 also has the destination text input field with entered data 30 and departure date/time input field with entered data 32. The display 12 further depicts time input field 42, an any time button 44, a post ride request button 40 and a private group button 36.

Figure 10:
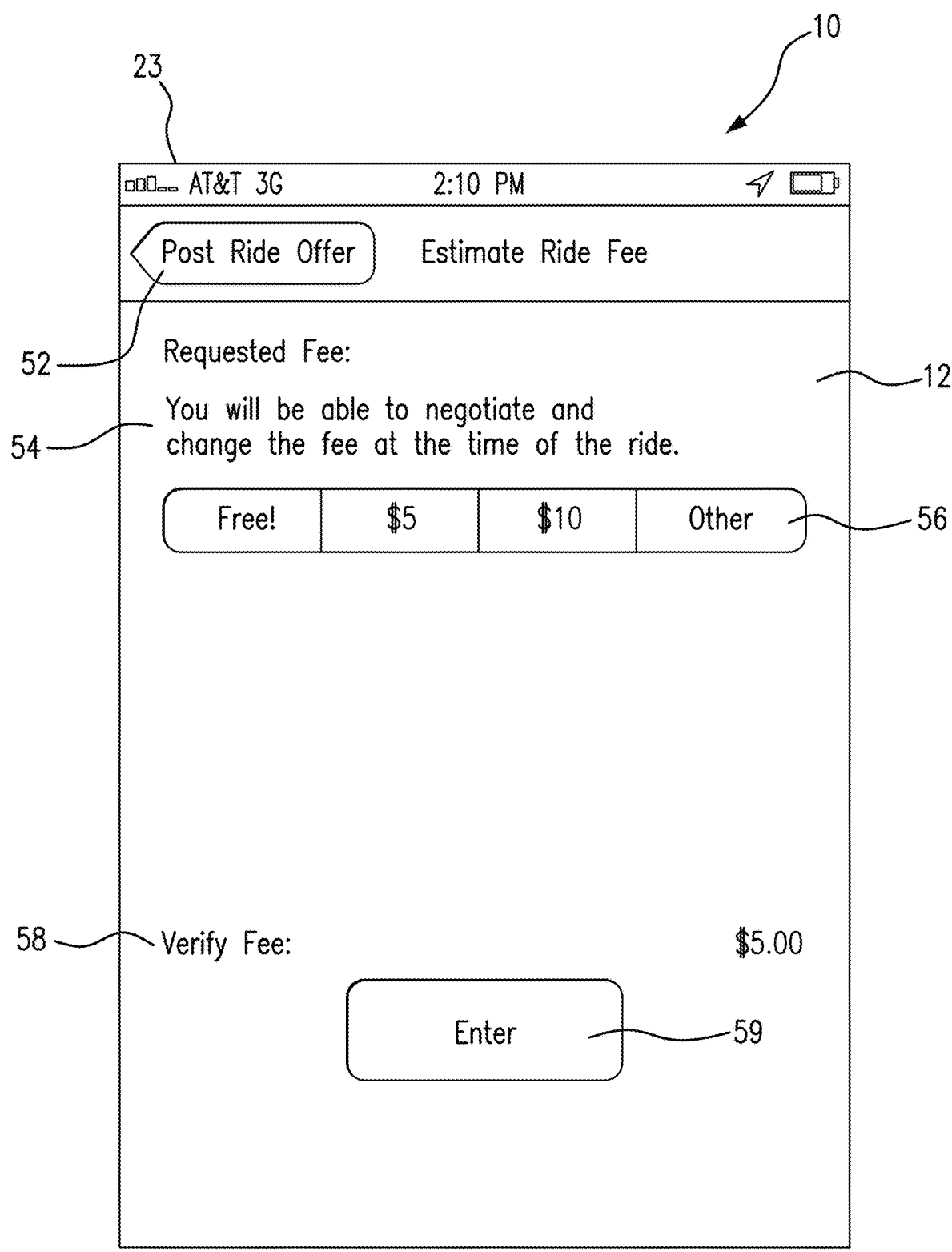
FIG. 10 is a depiction of a screenshot of a fee input screen.

FIG. 10 is a depiction of a screenshot of a fee input screen. FIG. 10 depicts a wireless device 10 having display 12, a wireless status indicator 23, and a back button to "post ride offer" 52. The display 12 also has a ride fee descriptive text 54 and ride fee radio buttons 56. A fee amount verification notice 58 and an enter button 59 for acceptance can be displayed.

Figure 11:
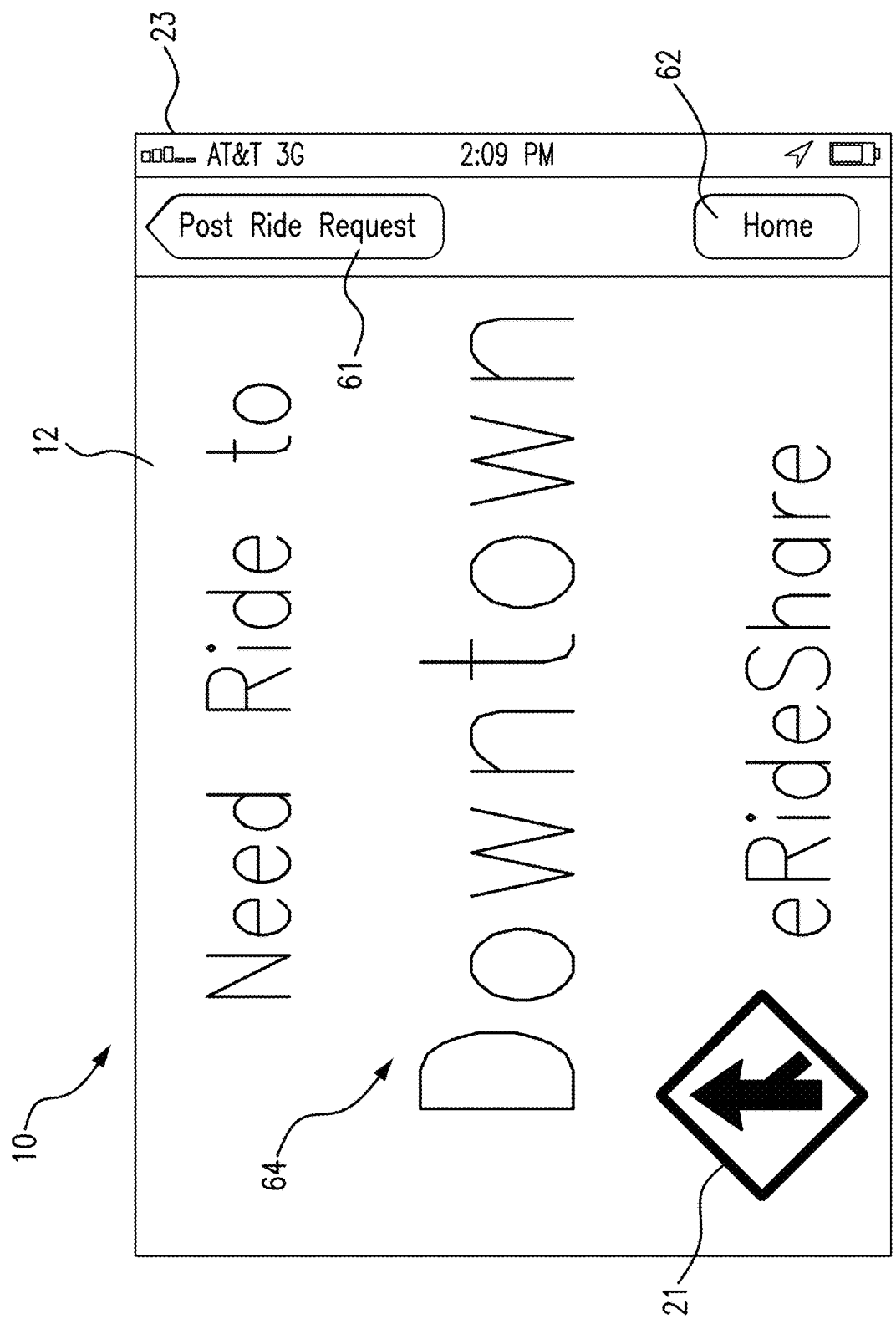
FIG. 11 is a depiction of a screenshot of a "Need A Ride" sign.

FIG. 11 is a depiction of a screenshot of a "Need A Ride" sign. FIG. 11 depicts a wireless device 10 having display 12, a wireless status indicator 23, a back button to "post Ride Request" 61 and a home button 62. The Display 12 can function as a rideshare sign 64. In FIG. 11 rideshare sign 64 recites "Need Ride to Downtown". A logo and brand 21 are also displayed.

Figure 12:
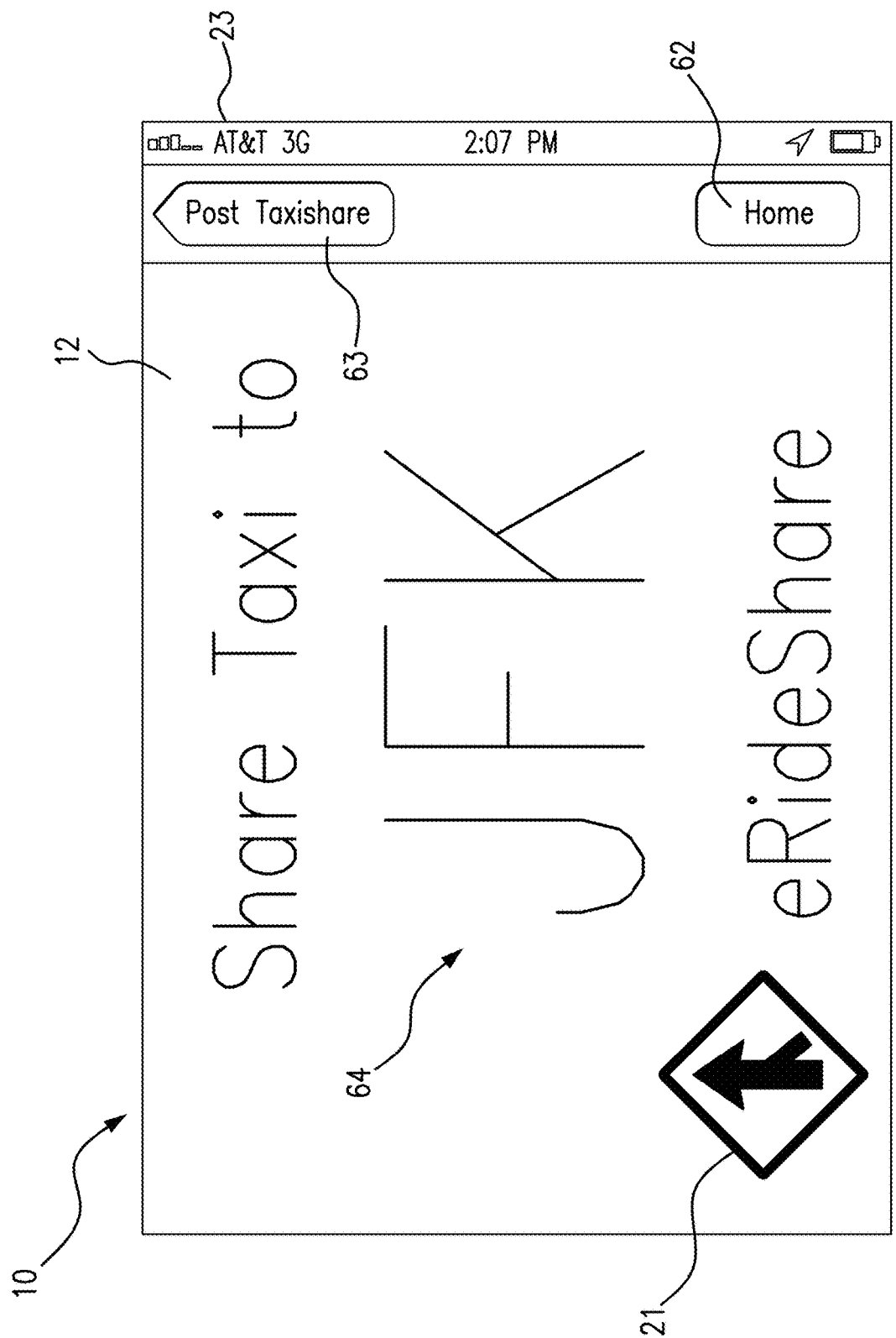
FIG. 12 is a depiction of a screenshot of a "Share Taxi" sign.

FIG. 12 is a depiction of a screenshot of a "Share Taxi" sign. FIG. 12 depicts a wireless device 10 having display 12, a wireless status indicator 23, a back button to "post Ride Request" 61 and a home button 62. The Display 12 can function as a rideshare sign 64. In FIG. 11 rideshare sign 64 recites "Share Taxi to JFK". A logo and brand 21 are also displayed.

Figure 13:
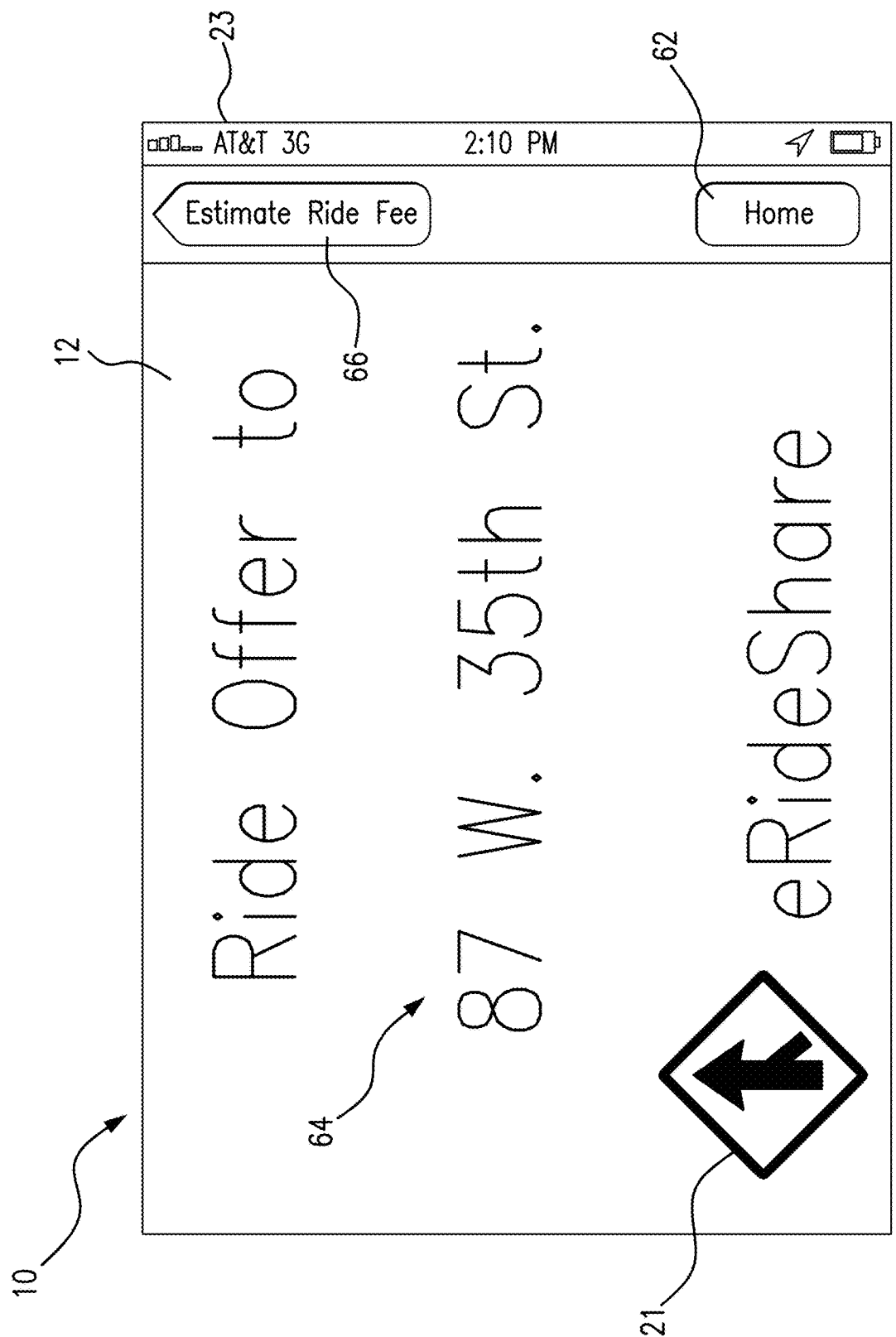
FIG. 13 is a depiction of a screenshot of a "Ride Offer" sign reciting an address.

FIG. 13 is a depiction of a screenshot of a "Ride Offer" sign reciting an address. FIG. 13 depicts a wireless device 10 having display 12, a wireless status indicator 23, a back button to "Estimated Ride Fee" 66 and a home button 62. The Display 12 can function as a rideshare sign 64. In FIG. 11 rideshare sign 64 recites "Ride Offer to 87 W. 35th ST." A logo and brand 21 are also displayed.

Figure 14:
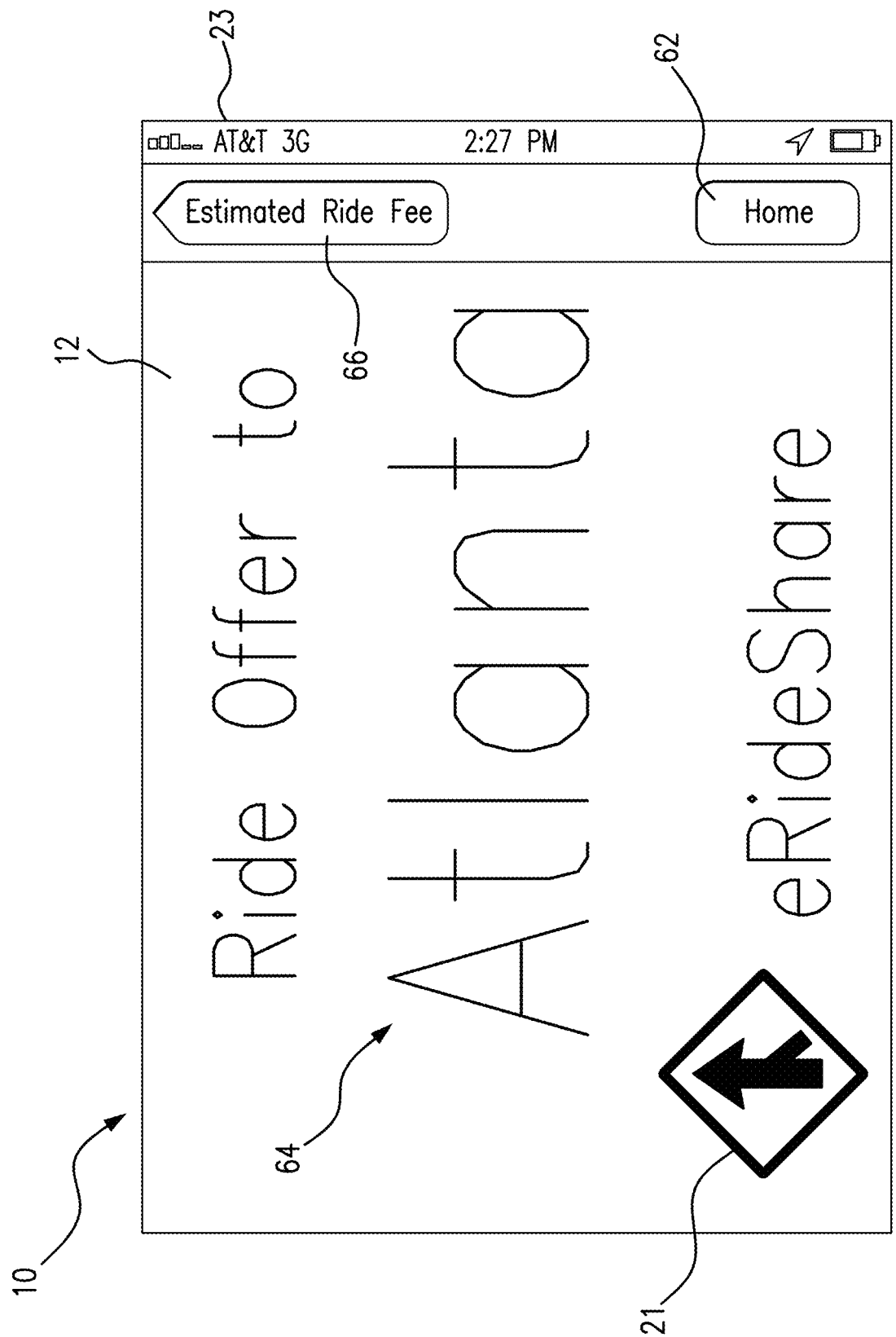
FIG. 14 is a depiction of a screenshot of a "Ride Offer" sign reciting a city name.

FIG. 14 is a depiction of a screenshot of a "Ride Offer" sign reciting a city name. FIG. 14 depicts a wireless device 10 having display 12, a wireless status indicator 23, a back button to "Estimated Ride Fee" 66 and a home button 62. The Display 12 can function as a rideshare sign 64. In FIG. 11 rideshare sign 64 recites "Ride Offer To Atlanta"

In an embodiment, electronic maps (herein as "maps") are provided electronically to the computing devices of users, such as mobile devices, indicating locations of features, including the location of the user and the location of other users known to a network server. Information can be attached to an individual user, such as among other things photographs, smoking preferences, and origin and destination. If the location of the user, and other user preferences, are data available through a server or other means, specific other users can be returned matching the user's location, travel requirements, and preferences.

Figure 15:
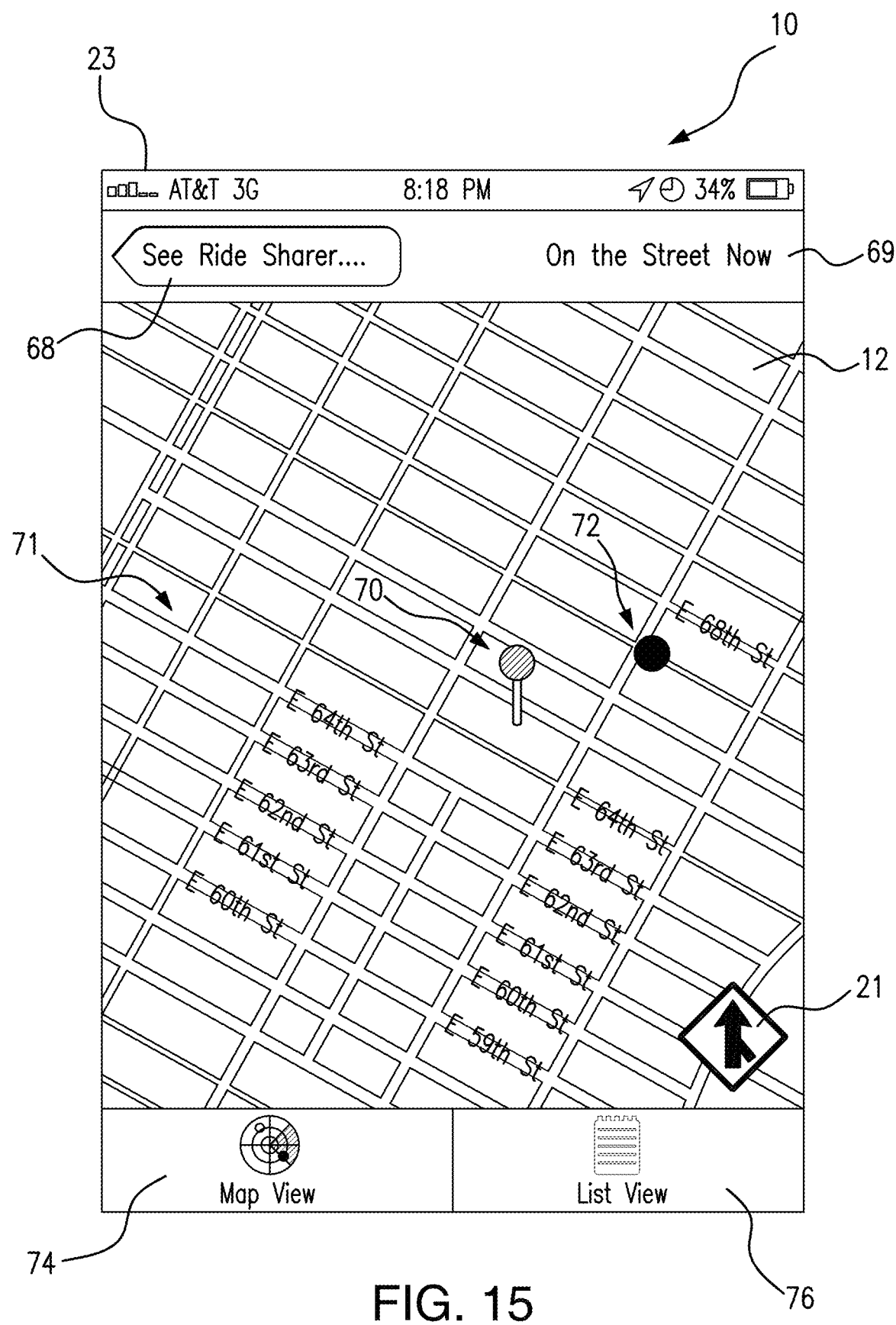
FIG. 15 is a depiction of a screenshot of a map listing view.

FIG. 15 is a depiction of a screenshot of a map listing view. FIG. 15 depicts a wireless device 10 having display 12, a wireless status indicator 23 and a back button to "see Ride Requests" 68. FIG. 15 also depicts an "On Street Now" screen label 69, as well as a map view of a rider 71 of a rider pin showing rider location 70, and a current GPS data and/or position and/or location of this device 72. There is no limitation as to the number and/or nature and/or type of riders which can be monitored, tracked and/or displayed. The FIG. 15 display also has a map view tab 74 and a list view tab 76. A logo and brand 21 are also displayed.

Figure 16:
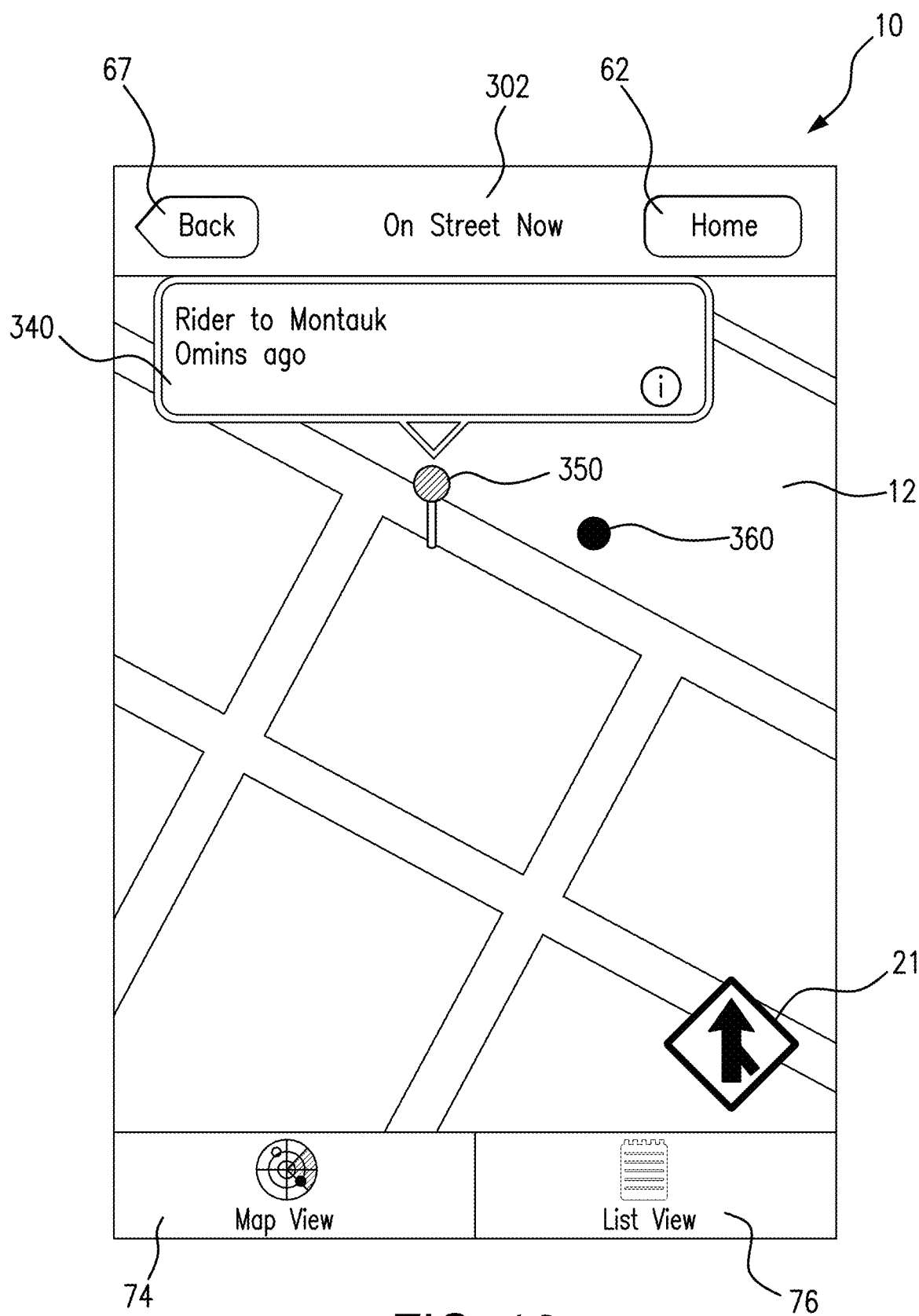
FIG. 16 is a depiction of a screenshot of a map view of a Ride Request with call-out.

FIG. 16 is a depiction of a screenshot of a map view of a Ride Request with call-out of a Ride Request. FIG. 16 depicts a wireless device 10 having display 12, a wireless status indicator 23, back button 67, an "On Street Now" screen label 302 and a home button 62. FIG. 16, shows a map view of a rider 71 and a rider information callout 340 which in an embodiment can be activated for viewing for non-limiting example by tapping a pin showing rider location 350. A current GPS position of device 360 is shown for the wireless device 10. The FIG. 16 display also has a map view tab 74 and a list view tab 76. A logo and brand 21 are also displayed.

Figure 17:
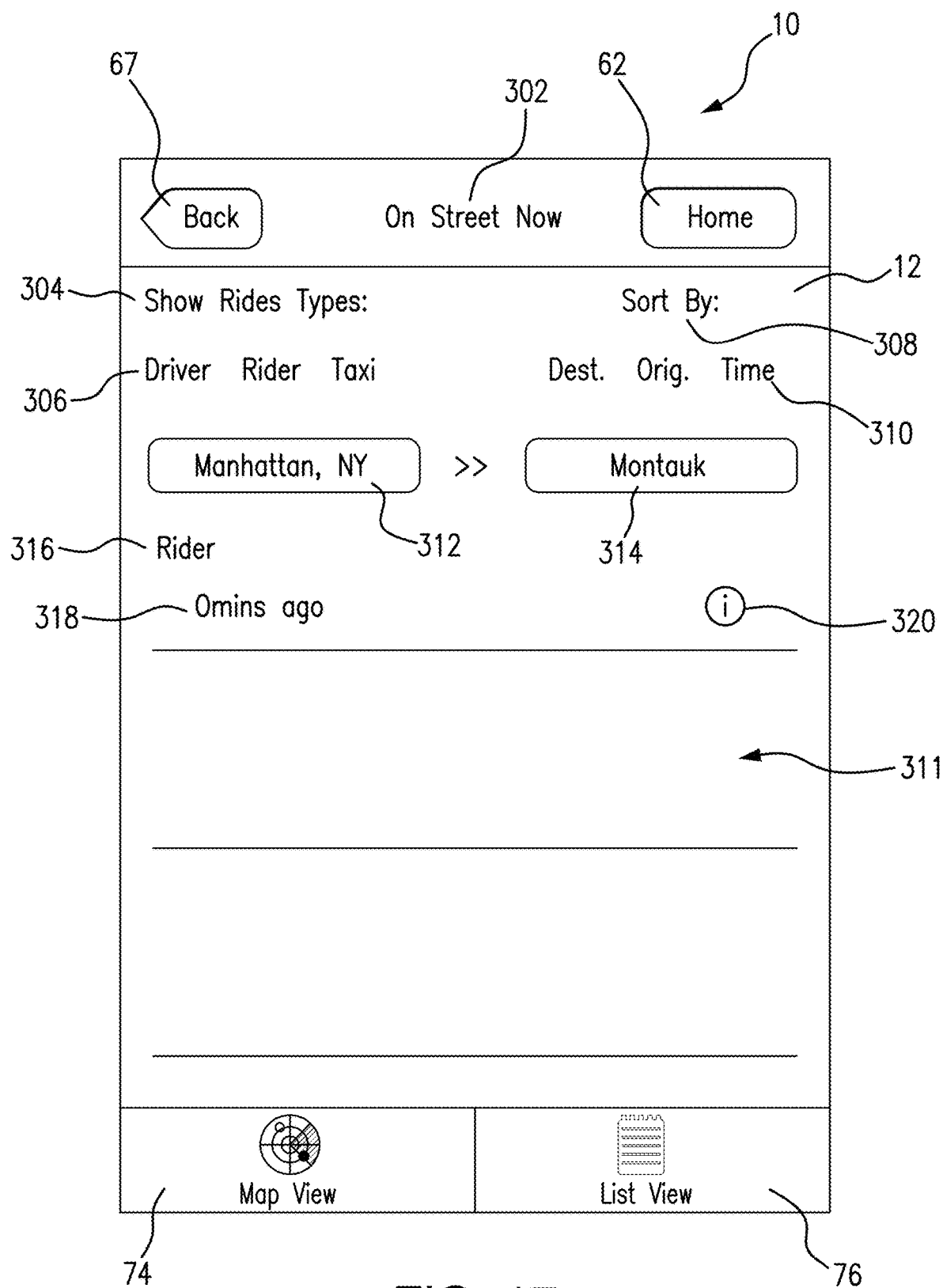
FIG. 17 is a depiction of a screenshot of a list view of the Ride Request and call-out of FIG. 16.

FIG. 17 is a depiction of a screenshot of a list view 311 of the Ride Request call-out of FIG. 16. FIG. 17 depicts a wireless device 10 having display 12, a wireless status indicator 23, back button 67, on "On Street Now" screen label 302 and a home button 62. The list view 311 of FIG. 17 depicts a "Show Ride Types" screen label 304, as well as driver/rider/taxi display selectors 306. A "Sort By" screen label 308 and a dest (destination)/orig (origination)/time selector radio selector 310 are also shown. An origin of listing 312 and a destination of listing 314 are also shown. "Ride type" 316 and a when posted "Relative Time" screen label 318 are also shown. An info button 320 is provided, as well as the map view tab 74 and list view tab 76.

Figure 18:
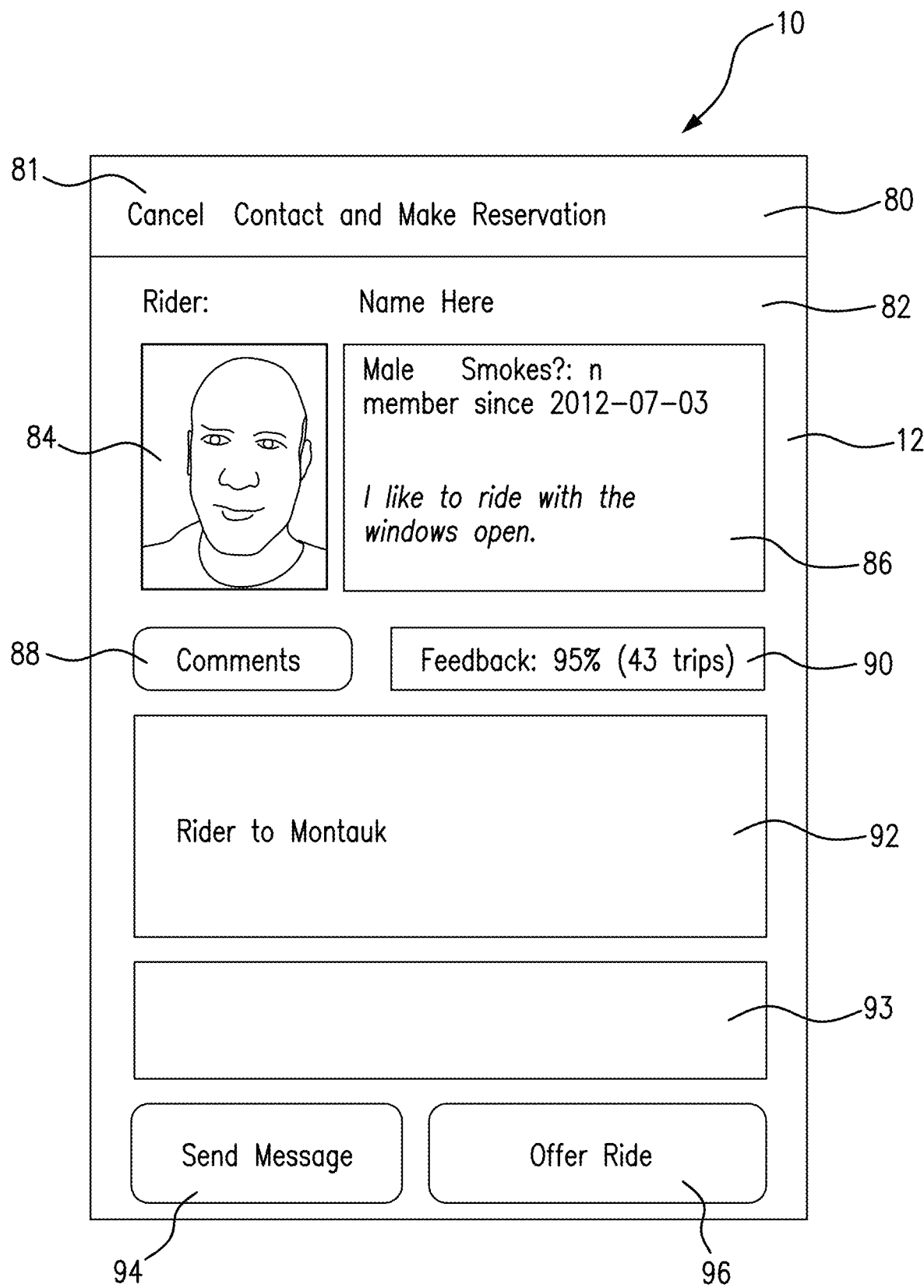
FIG. 18 is a depiction of a screenshot of a multifunction screen.

FIG. 18 is a depiction of a screenshot of a multifunction screen 80. In an embodiment, the multifunction screen 80 can have functions for non-limiting example of information exchange, communications and trip reservation. The multifunction screen can also simultaneously provide displays for information, communications and trip reservation, or provide to displays of such information.

The embodiment of FIG. 18 depicts a wireless device 10 having display 12, a wireless status indicator 23 and multifunction screen 80. Multifunction screen 80 in the embodiment of FIG. 18 can display cancel button 81, a contact and "Make Reservation" screen label, a rider name 82, a rider photo 84 and a rider profile box 86. The multifunction screen 80 can also have a comments button 88 and a feedback rating box 90. A travel information box 92 can also be provided. Buttons, such as send message button 94 and an offer ride to rider button 96 can be used. In an embodiment, a text entry field 93 for sending a message can be used.

Figure 19:
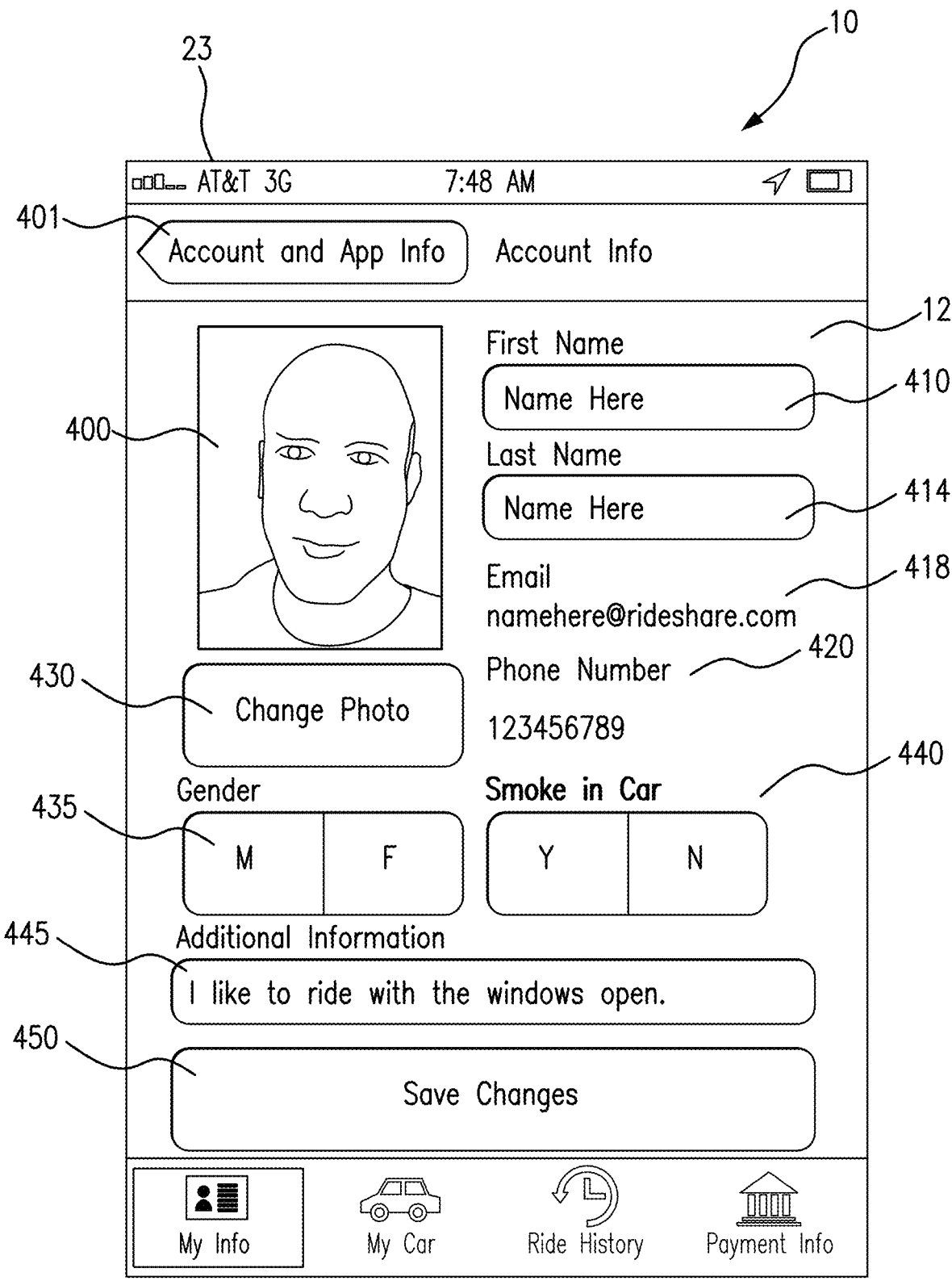
FIG. 19 is a depiction of a screenshot of an account Information interface screen.

FIG. 19 is a depiction of a screenshot of an account Information interface screen. In an example embodiment, FIG. 19 illustrates an example of an "Account Info" Entry/

Display Screen. FIG. 19 is an embodiment of an account information entry screen showing photo and other information.

FIG. 19 depicts a wireless device 10 having display 12, a wireless status indicator 23 and user account information. The FIG. 19 example of an "Account Info" (use synonymously with "Account Information") screen has a first name entry field 410, a last name entry field 414, as well as a user image 400 and a change photo button 430. The "Account Info" screen can also provide an email display field 418 which can show a user's email address and a phone number display field 420 for displaying a phone number. There is no limitation as to what information can be provided for on the "Account Info" screen. For example, a gender selector 435 can be used, as well as a smoking selector 440. An additional information entry field 445 can be used to provide additional information. A save changes button 450 can be used to save changes entered by the FIG. 19 example user interface. An account and app info 401 navigation button can be provided.

Figure 20:
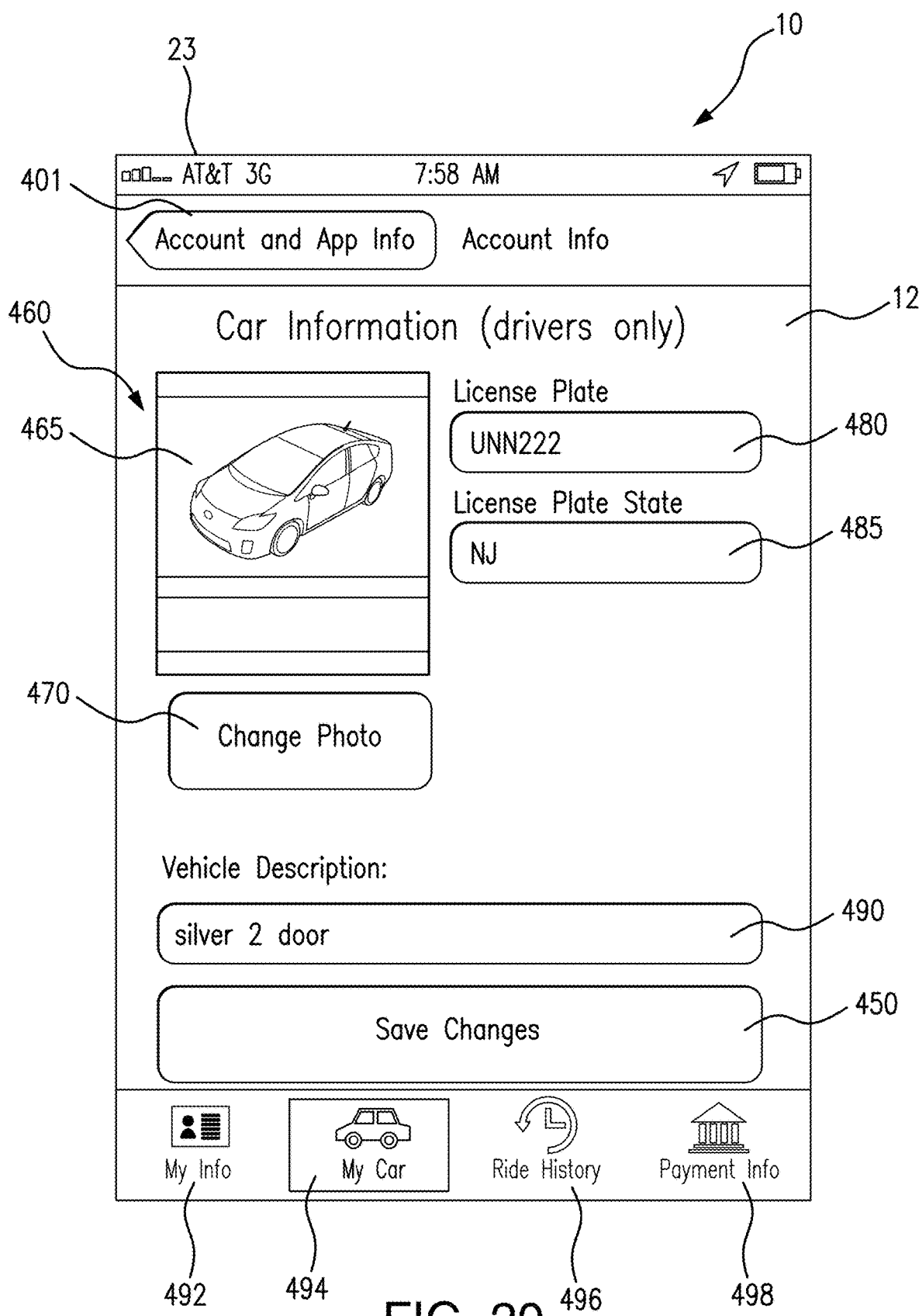
FIG. 20 is a depiction of a screenshot of a car information interface screen.

FIG. 20 is a depiction of a screenshot of a car information interface screen. In an example embodiment, FIG. 20 illustrates an example of a "Car Information" Entry/Display Screen. FIG. 20 is an embodiment of a driver's car information entry screen for: photo, license plate.

FIG. 20 depicts a wireless device 10 having display 12, a wireless status indicator 23 and providing car information. In the example of FIG. 20, the user interface has a vehicle image 460 which can be of any type of image. In FIG. 20 a driver car image 465 is depicted. If desired the vehicle image can be changed by means of a change vehicle photo button 470. Addition vehicle related information which can be provided can include license, registration and vehicle-specific information regarding any information about the vehicle. In addition to model and color, a user could provide a license plate by using a license plate number entry field 480 and the state in which the care is registered by using a license plate state entry field 485. A vehicle description entry field 490 can be used to enter additional information. A save changes button 450 can be used to save changes entered by the FIG. 20 example user interface. An account and app info 401 navigation button can be provided. Additionally, navigation tabs can be provided without limitation. In FIG. 20, the following example tabs are provided: a "My Info" Tab 492, a "My Car" Tab 494, a "Ride History" Tab 496, and a "Payment Info" Tab 498.

Figure 21:
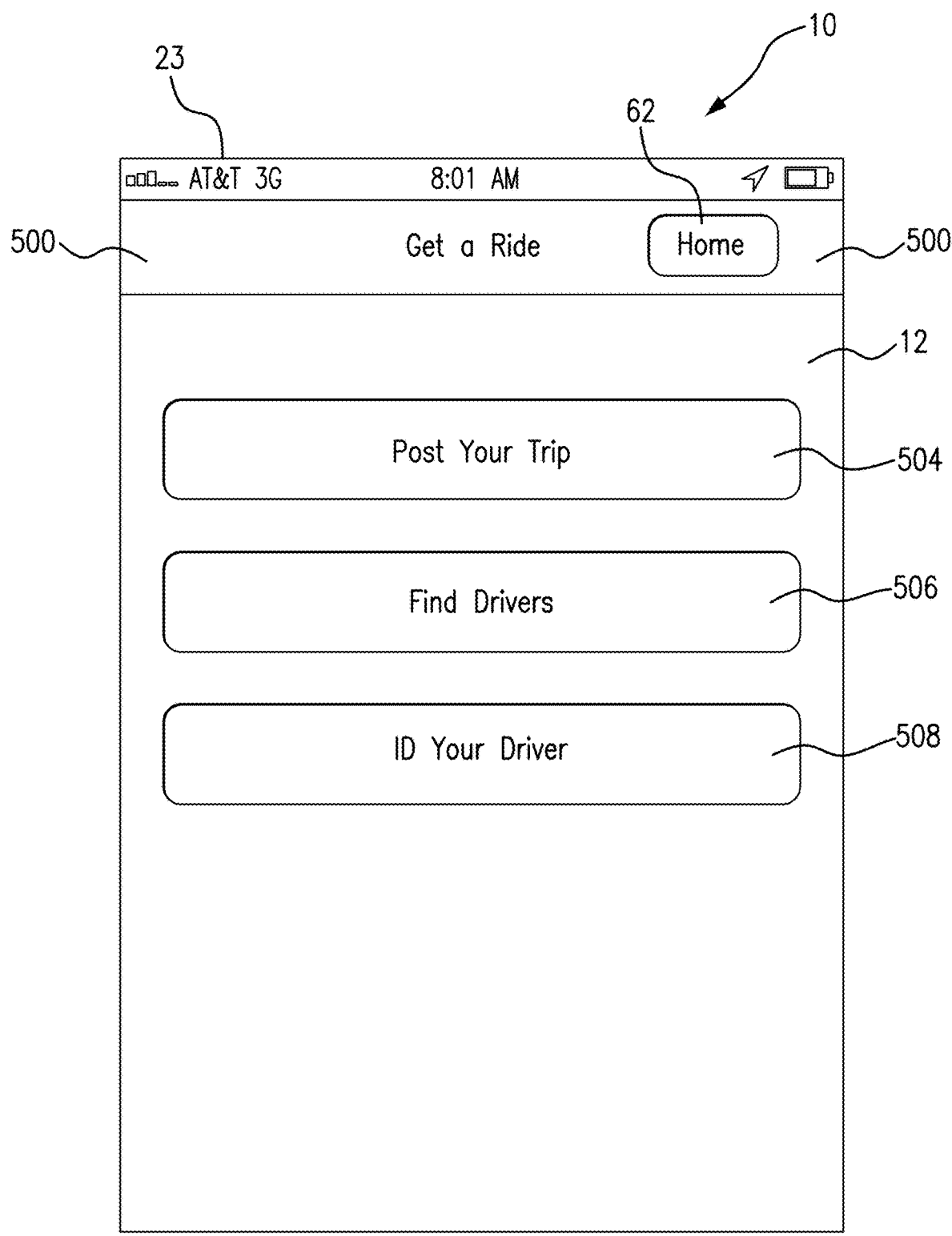
FIG. 21 is a depiction of a screenshot of a get a ride navigation screen.

FIG. 21 is a depiction of a screenshot of a get a ride navigation screen. In an example embodiment, FIG. 21 illustrates an example of a "Get a Ride" Navigation Screen. FIG. 21 is an embodiment of a menu showing "ID Your Driver" as an option.

FIG. 21 depicts a wireless device 10 having display 12, a wireless status indicator 23 and providing car information. In the example of FIG. 21 showing a "Get a Ride" screen label 500, the user can select from a number of example actions such as finding a driver, identifying a driver or identifying a rider. Such selections can be achieved by use of buttons such as a "Find Drivers" Button 504, a "ID Your Driver" Button 506, and a "ID Your Rider" Button 508. In the FIG. 21 example a user is also provided with a home button 62.

Figure 22:
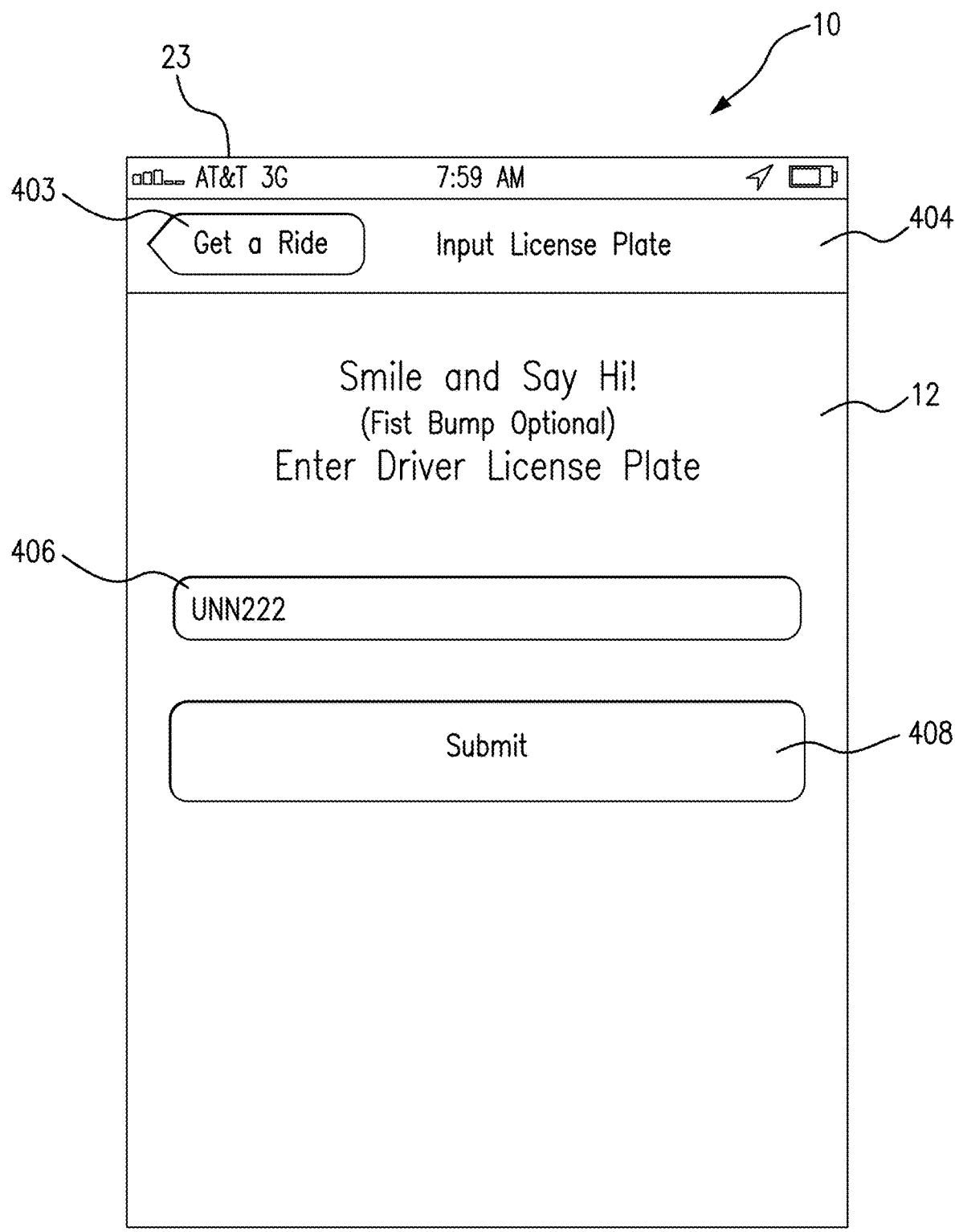
FIG. 22 is a depiction of a screenshot of an embodiment of a trip initiation screen.

FIG. 22 is a depiction of a screenshot of an embodiment of a trip initiation screen. In an example embodiment, FIG. 22 illustrates an example of an "Input License Plate" Trip Initiation Screen. FIG. 22 is an embodiment of an initiation screen showing entry of license plate by a Rider.

In the Example of FIG. 22, information for initiating a trip can include license plate information which can be entered into a screen having an "Input License Plate" screen label 404 and a rider license plate entry field 406. A license plate entered by a rider can be submitted by a submit button 408. In an embodiment, a get a ride button 403 can be provided for navigation to a page for requesting a ride from a driver.

Figure 23:
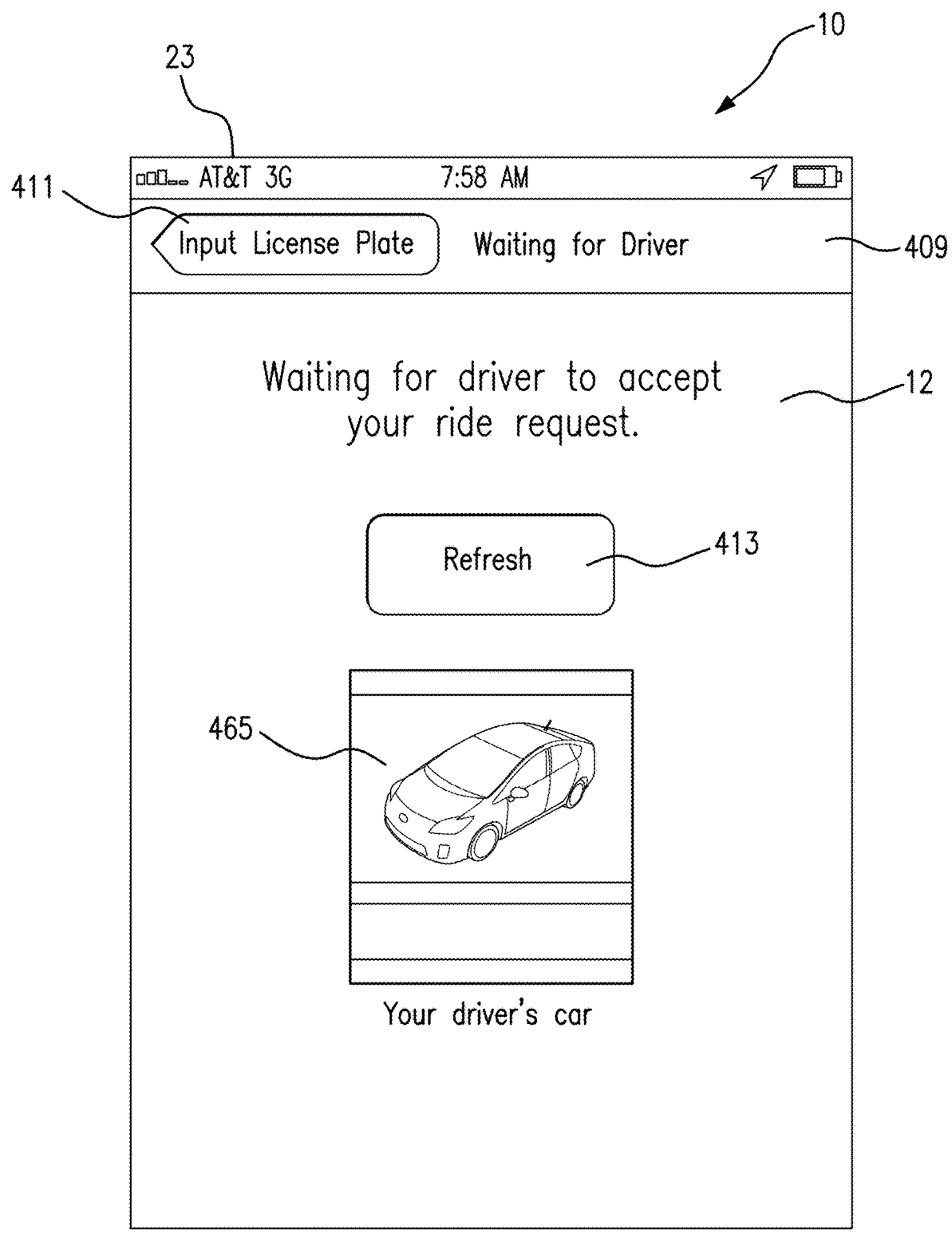
FIG. 23 is a depiction of a screenshot of a "Waiting for Driver" navigation screen.

FIG. 23 is a depiction of a screenshot of a "Waiting for Driver" 409 navigation screen. FIG. 23 is an embodiment of a response screen after entry of license plate showing the vehicle and "Refresh" button.

In an example embodiment, FIG. 23 illustrates an example of a "Waiting for Driver" navigation screen which has a first name display field 412 and a driver car image 465. A refresh button 413 and an input license plate button 411 are also provided.

Figure 24:
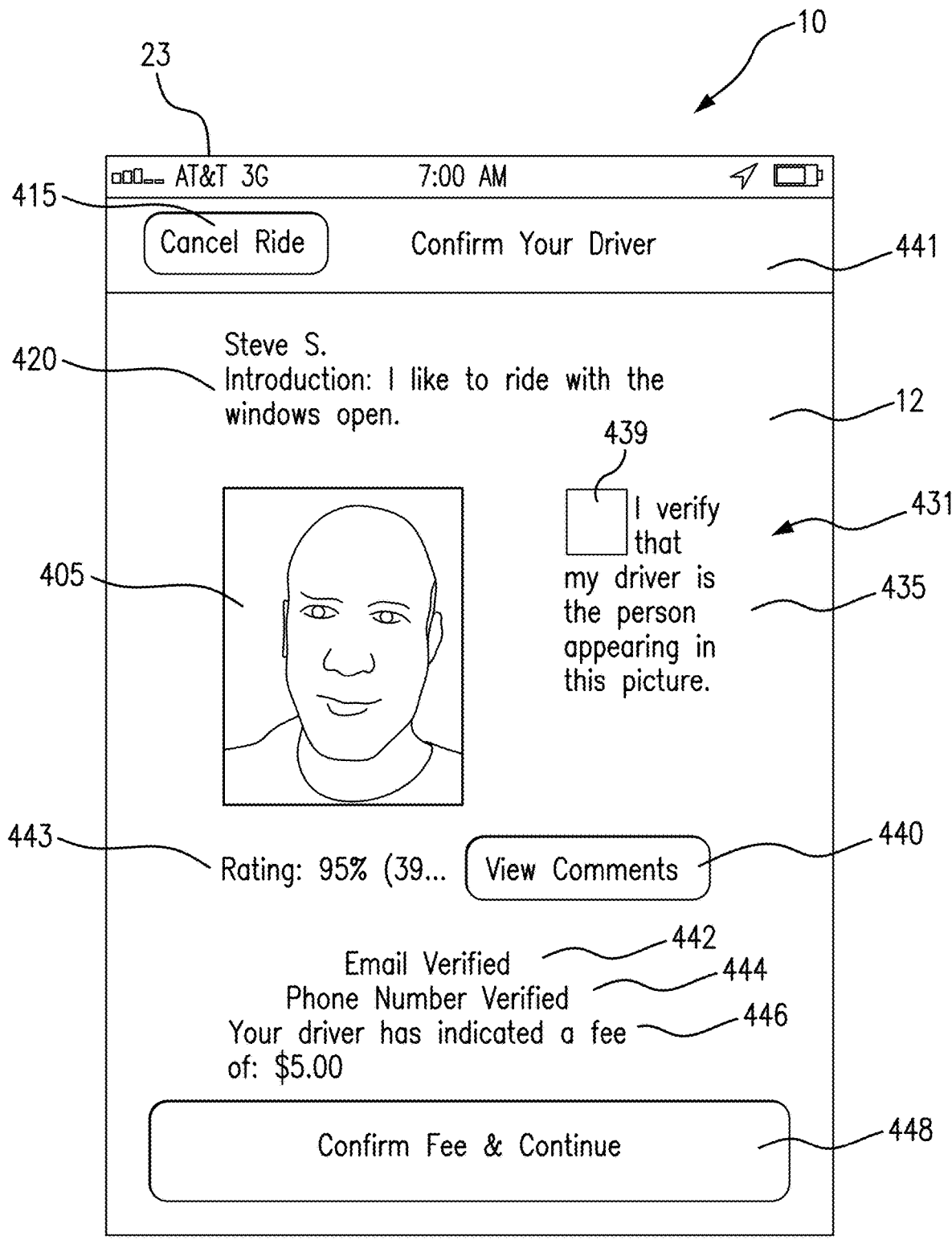
FIG. 24 is a depiction of a screenshot of a first driver photo verification and fee confirmation screen.

FIG. 24 is a depiction of a screenshot of a first driver photo verification and fee confirmation screen. In an example embodiment, FIG. 24 illustrates an example of a "Confirm Your Driver" Photo Verification and Fee Confirmation Screen (confirmation button INACTIVE/GREY). FIG. 24 is an embodiment of a screen of Driver authentication of photograph and submission of fee requirement, following a Rider refresh; the screen showing fee, Driver's photo, and an indication that Rider's authentication of Driver's photograph, as displayed, is required.

FIG. 24 depicts a wireless device 10 having display 12, a wireless status indicator 23 and a "Confirm Your Driver" screen label 441. In the example of FIG. 24 a user can confirm information about a driver. Any information can be provided and verified to confirm a driver. FIG. 24 shows a user interface which provides a phone number display field 420, a driver image 405, a driver rating 443 and an ID your driver function 431. The ID your driver function 431 can have a driver verification request text 435, as well as a check box for verifying the driver 439. Comments regarding a driver can be accessed for example by a view comments button 449. Additional verifications can be confirmed such as indicated by an email verification 442, a phone number verification 444 and a fee verification 446. If the user chooses a confirm fee and continue button 448 can be activated. If the user chooses, a ride can be canceled by using a cancel ride button 415.

Figure 25:
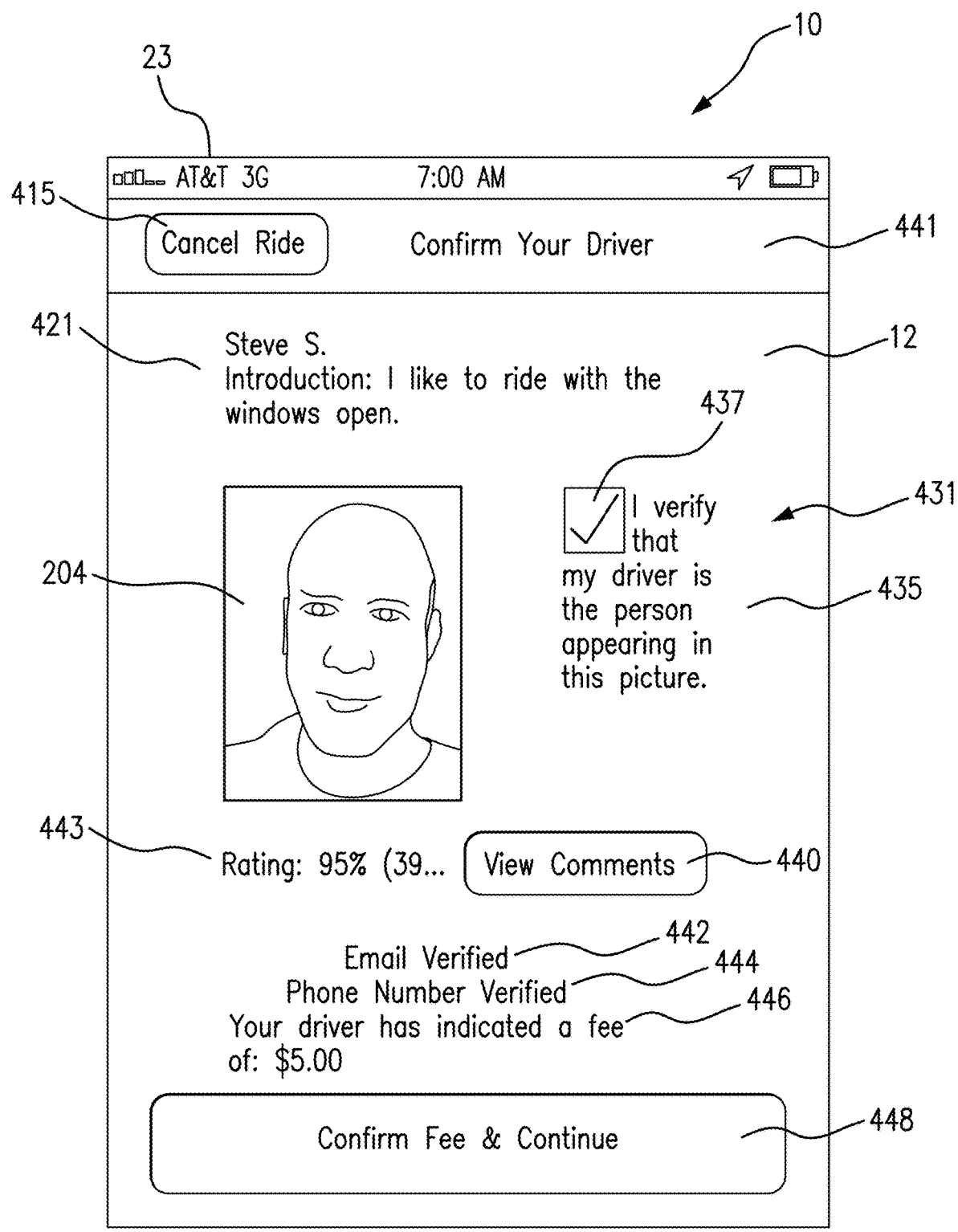
FIG. 25 is a depiction of a screenshot of a second driver photo verification and Fee Confirmation Screen.

FIG. 25 is a depiction of a screenshot of a second driver photo verification and Fee Confirmation Screen. In an example embodiment, FIG. 25 illustrates an example of a "Confirm Your Driver" Photo Verification and Fee Confirmation Screen, with photo verification box checked and confirm fee button active. In the example of FIG. 25, a checked box verifying driver 437 is depicted as having been checked by the user. FIG. 25 is an alternative embodiment of a FIG. 6, in which the box is checked indicating verification of Driver's photograph by a Rider, and with the "Confirm Fee & Continue" button active where it was previously grayed as inactive.

Figure 26:
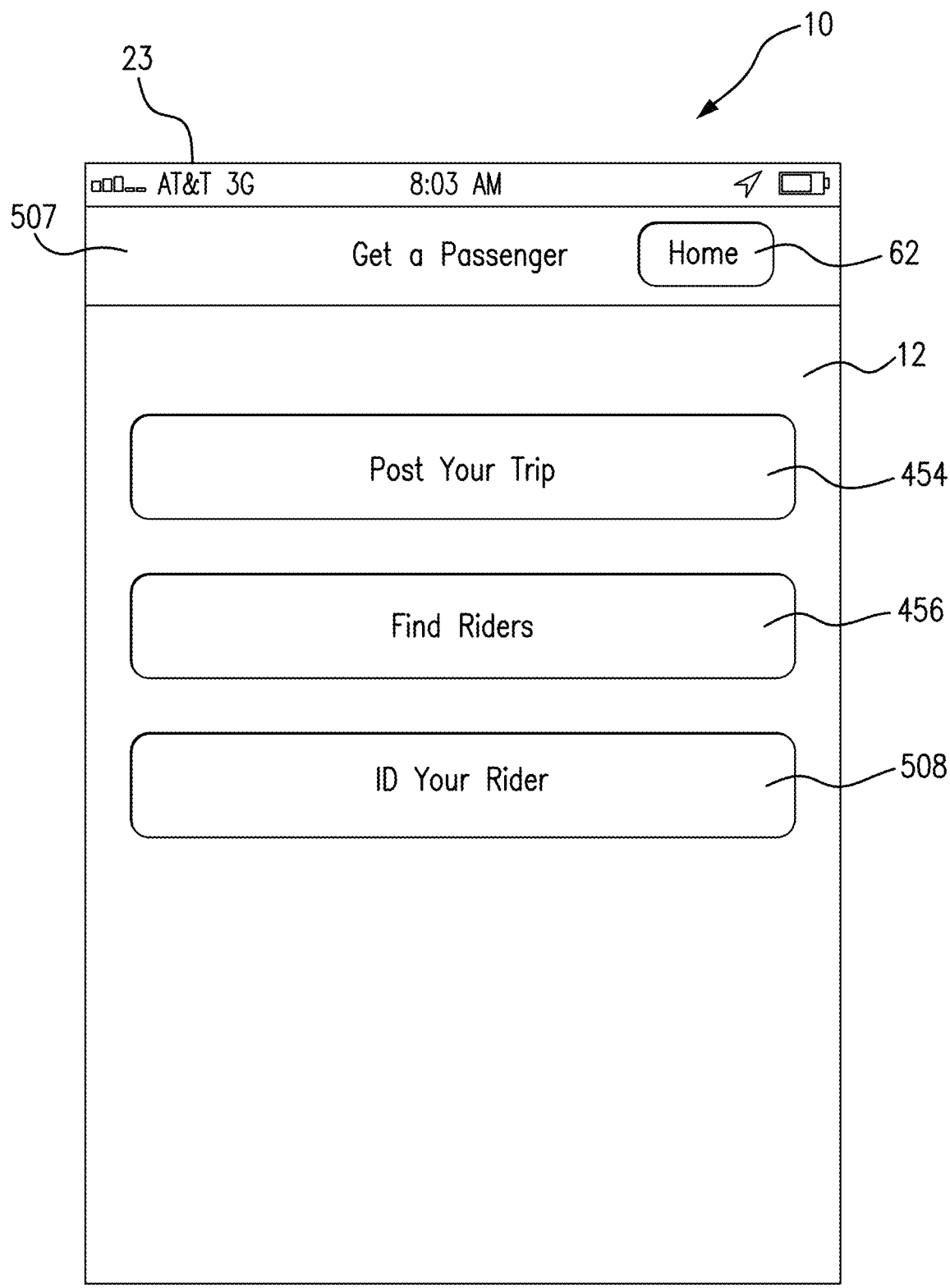
FIG. 26 is a depiction of a screenshot of a "Get a Passenger" navigation screen.

FIG. 26 is a depiction of a screenshot of a "Get a Passenger" navigation screen. In an example embodiment, FIG. 26 illustrates an example of a "Get a Passenger" Navigation Screen. FIG. 26 is an embodiment of a menu showing "ID Your Rider" button.

FIG. 26 depicts a wireless device 10 having display 12, a wireless status indicator 23 and a "Get A Passenger" screen label 507. The user interface can provide buttons such as but not limited to a driver "Post Your Trip" button 454, a "Find Riders" button 456, and a "ID Your Rider" button 508.

Figure 27:
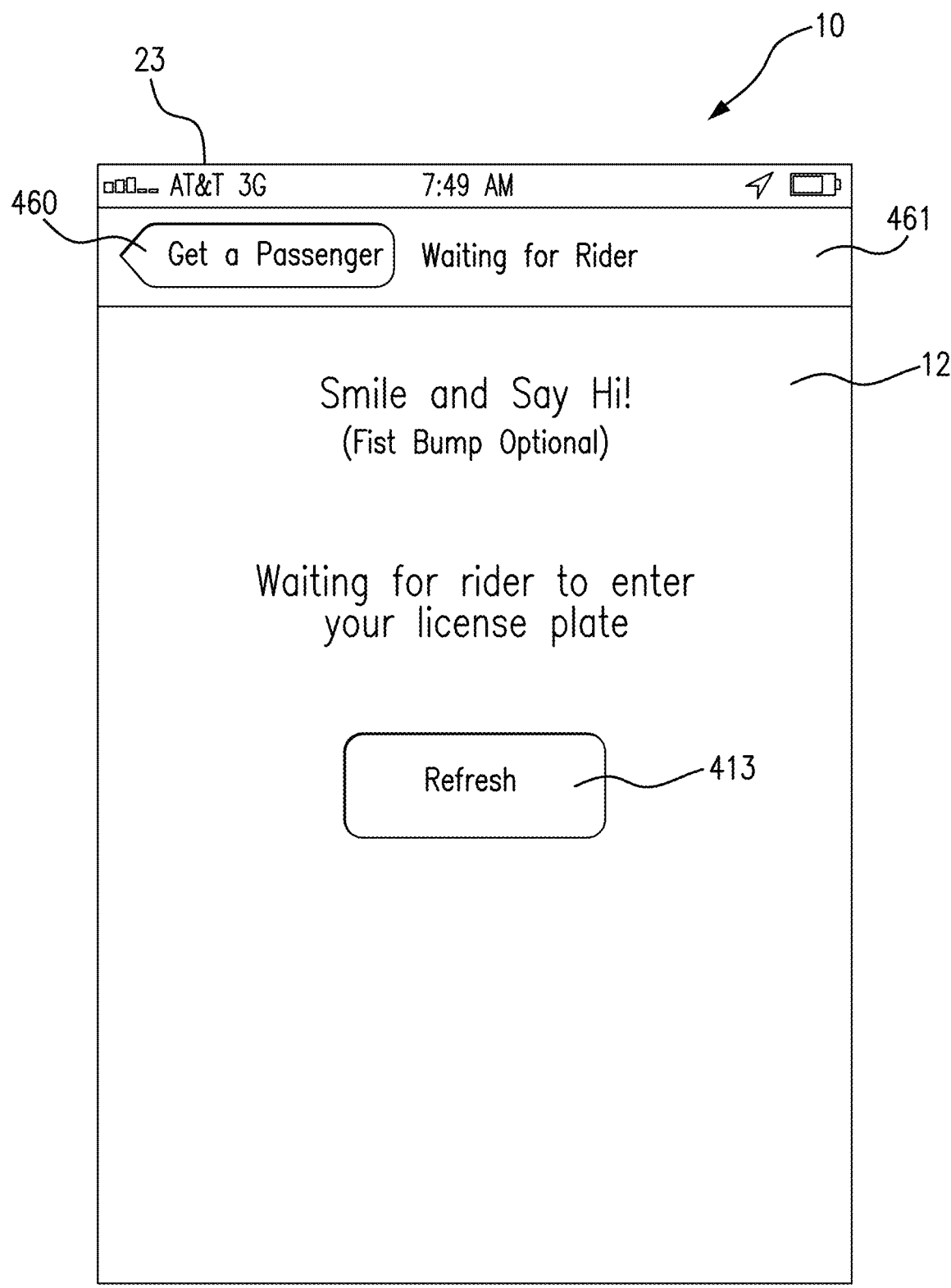
FIG. 27 is a depiction of a screenshot of a "Waiting for Rider" navigation screen.

FIG. 27 illustrates an example of a "Waiting for Rider" Navigation Screen. In an example embodiment, FIG. 27 is a depiction of a screenshot of a "Waiting for Rider" navigation screen. FIG. 27 is an embodiment of a driver's first screen to verify Rider, displaying "Waiting for rider to enter your license plate." The FIG. 27 example displays a "Waiting for Rider" screen label 461 and a refresh button 413. FIG. 27 also displays a "Get A Passenger" Button 460 for navigation to functionality to seek a passenger.

Figure 28:
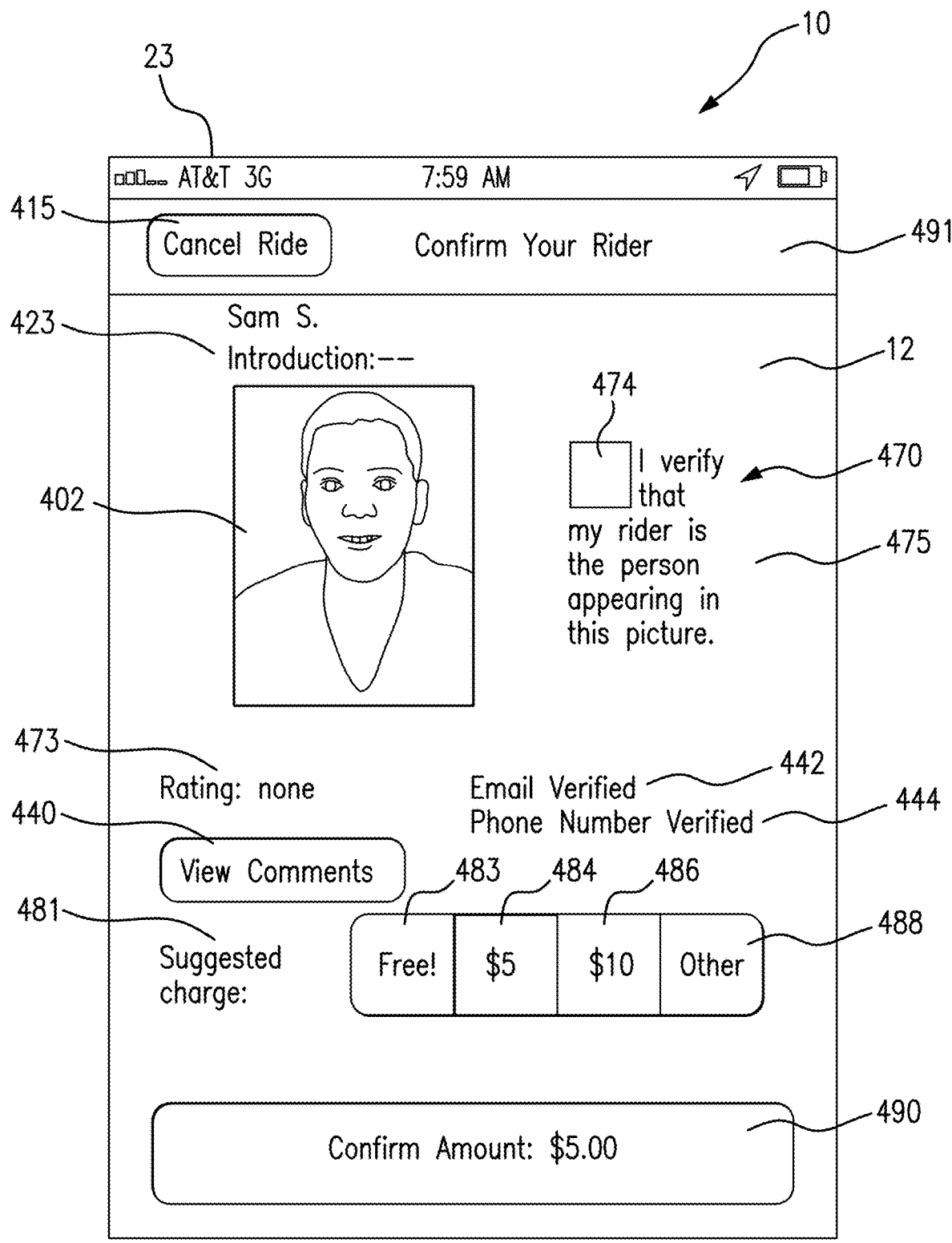
FIG. 28 is a depiction of a screenshot of a first confirm your rider photo verification and fee Confirmation Screen.

FIG. 28 is a depiction of a screenshot of a first confirm your rider photo verification and fee Confirmation Screen. In an example embodiment, FIG. 28 illustrates an example of a "Confirm Your Rider" Photo Verification and Fee Input/Confirmation Screen (confirmation button INACTIVE/GREY). The FIG. 28 screen has a "Confirm Your Rider" screen label 491. FIG. 28 is Driver's Rider photo authentication screen, showing checkbox to verify photo, also including fee indication.

A driver can confirm a rider using any information. For example, FIG. 28 provides a rider introduction text 423, a rider image 402, a rider rating 473, as well as an email verification 442 and a phone number verification 444. The ID your rider function 471 can have a driver verification request text 475, as well as a check box for verifying the rider 474. Comments regarding a rider can be accessed for example by a view comments button 440. A suggested charge functionality can be have a "Suggested Charge Selector" screen label 481 which can identify suggested charge choices such as; a 1st charge selector 483, for example suggesting "free"; a 2nd charge selector 484 for example suggesting "$5"; a 3rd charge selector 486 for example suggesting "$10"; and a 4th charge selector 488 for example suggesting "other". In the example of FIG. 28, a confirm amount button 493 is provided. If the user chooses a confirm amount button 490 can be activated. If the user chooses, a ride can be canceled by using a cancel ride button 415.

Figure 29:
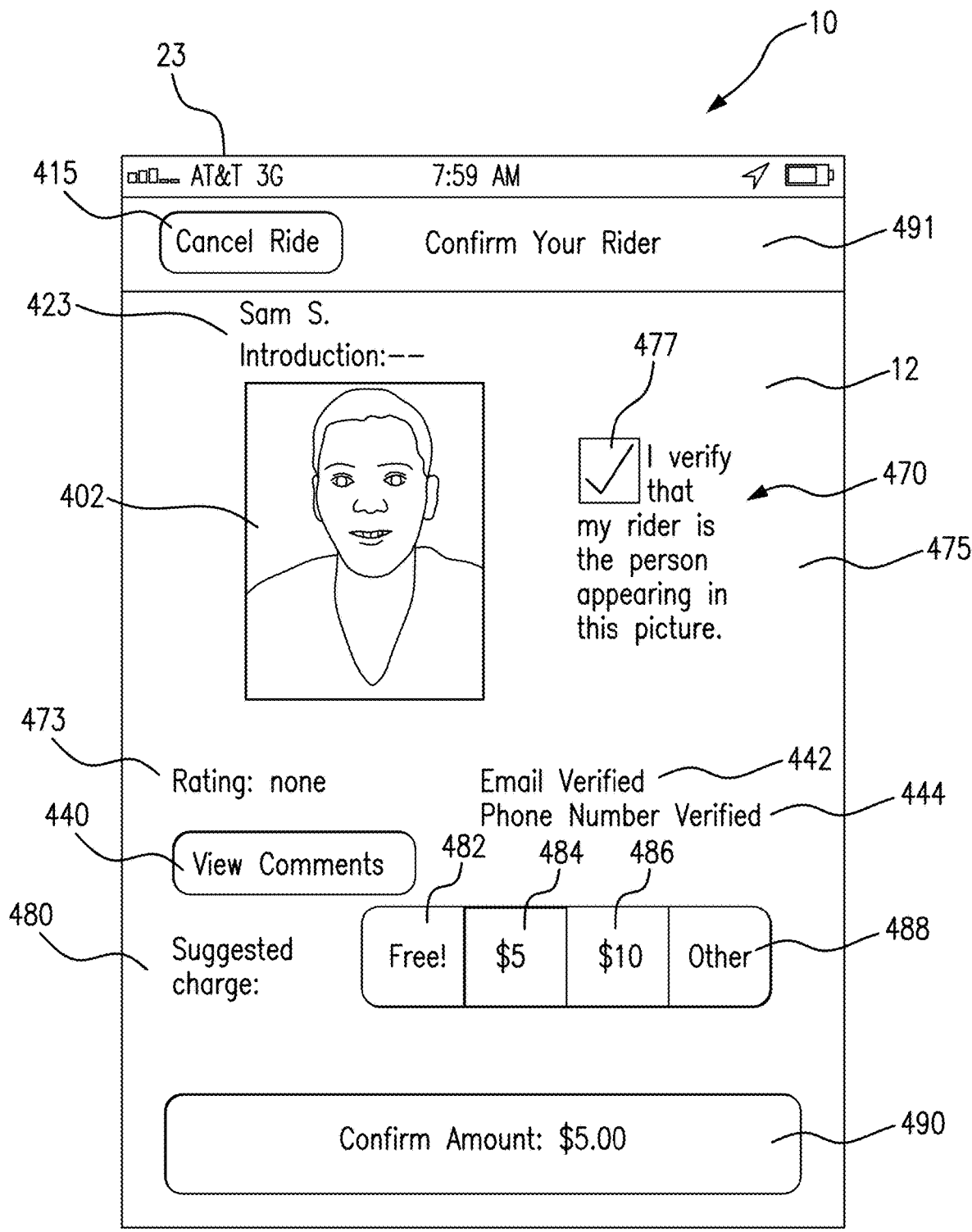
FIG. 29 is a depiction of a screenshot of a second confirm tour rider photo verification and fee confirmation screen.

FIG. 29 is a depiction of a screenshot of a second confirm tour rider photo verification and fee confirmation screen. FIG. 29 is an embodiment of driver's Rider photo authentication screen, showing checkbox checked and confirmation button enabled.

In an example embodiment, FIG. 29 illustrates an example of a "Confirm Your Rider" Photo Verification and Fee Input/Confirmation Screen, with photo verification box checked and confirm amount button active. FIG. 29 depicts the example of FIG. 28 in which the check box for verifying the rider 474 has been checked by a user.

Figure 30:
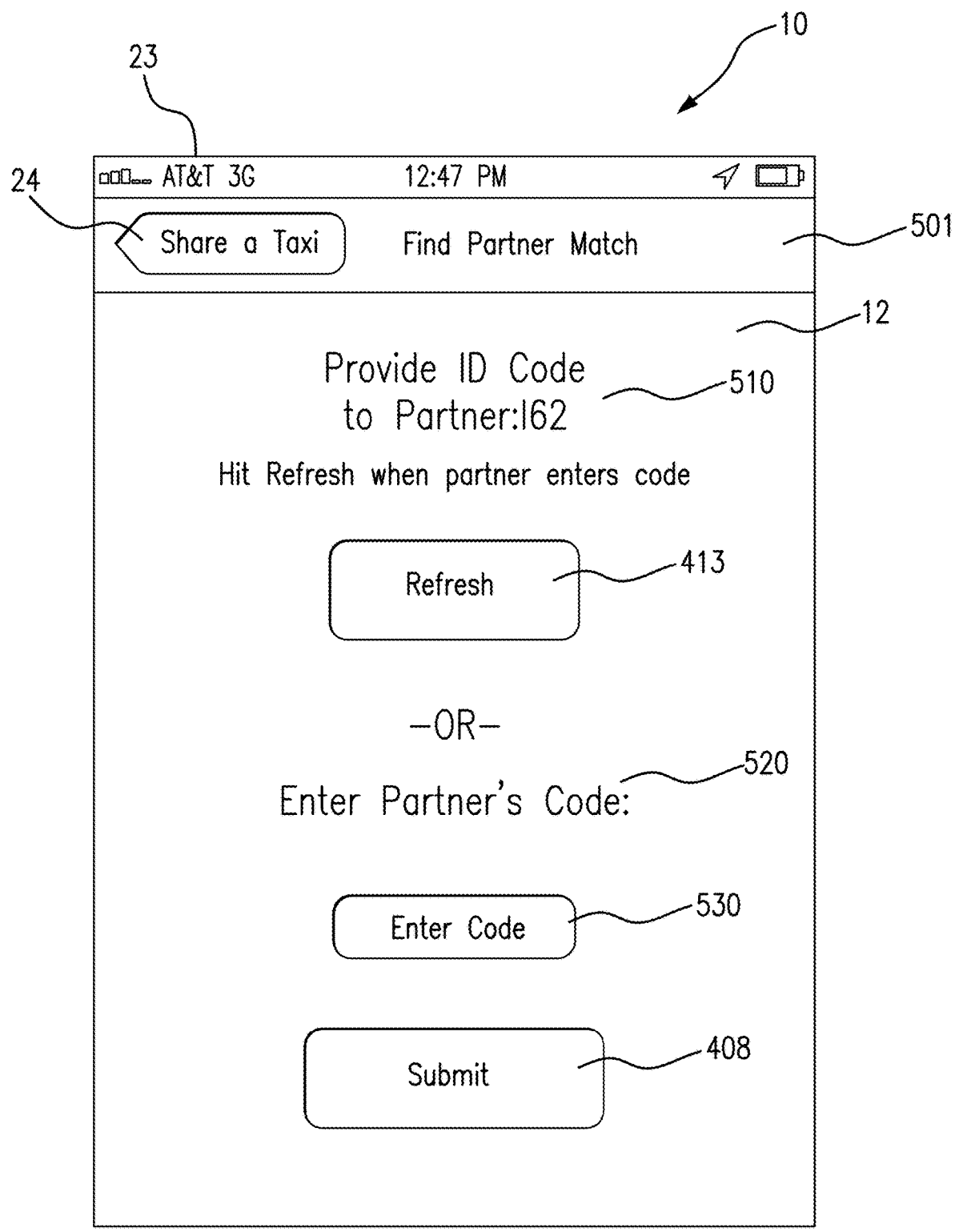
FIG. 30 is a depiction of a screenshot of a code exchange screen.

FIG. 30 is a depiction of a screenshot of a code exchange screen. In an example embodiment, FIG. 30 illustrates an example of a "Find Partner Match" Trip Initiation by Code Exchange Screen. FIG. 30 is an embodiment of an authentication sequence initiated with random code instead of license plate.

The example of FIG. 30 provides a "Find Partner Match" screen label 501. In support of the finding of a partner the interface provides a provide id code to partner 510 and an enter code button 530 for entering a partners code as indicated by an "Enter Partner's Code" screen label 520. The partners code can be submitted by the submit button 408. A refresh button 412 is also depicted. A partner herein can be a rider, driver, or anyone involved with another person in an activity, endeavor or pursuit, or a person seeking to be involved in an acitivity, endeavor or pursuit.

Figure 31:
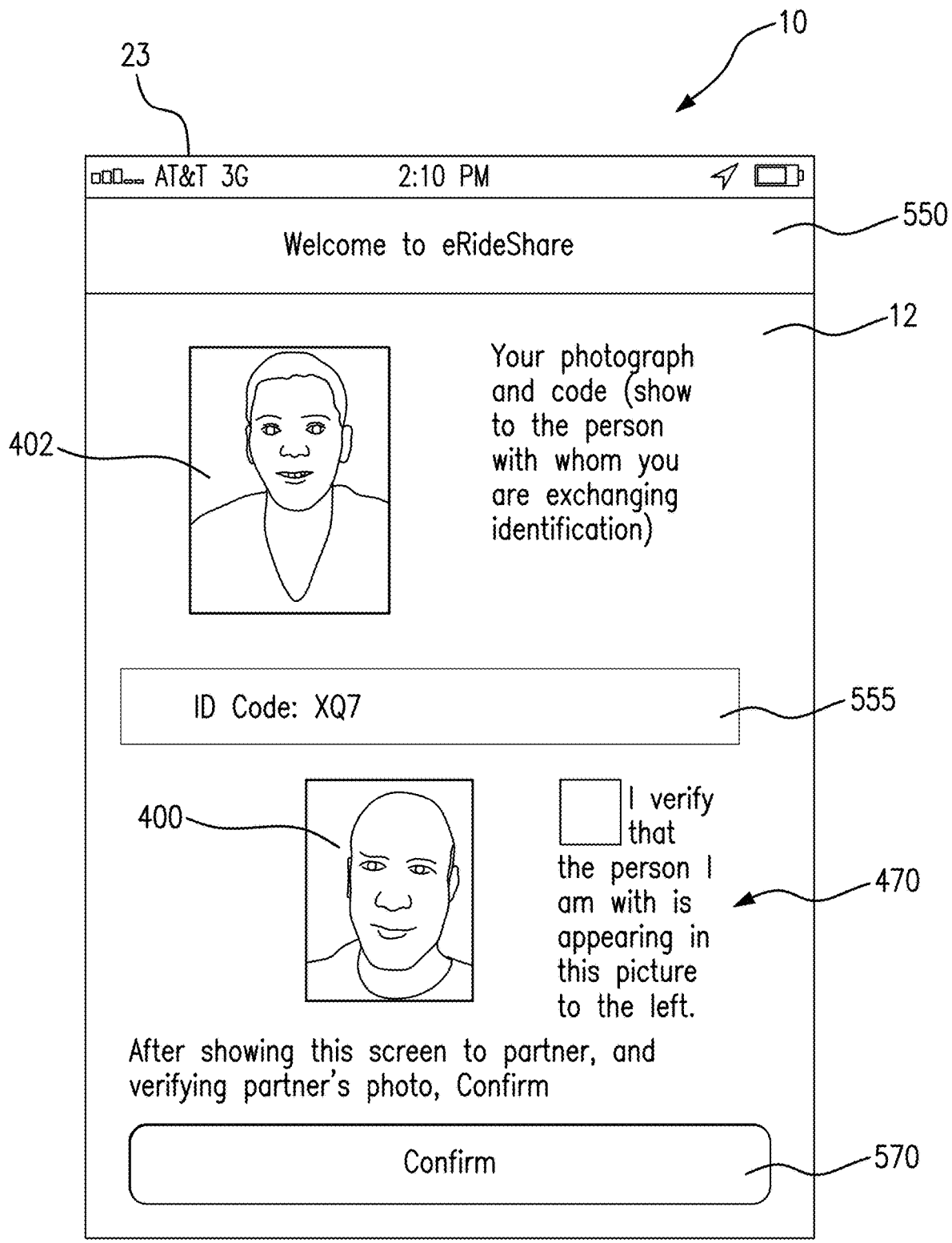
FIG. 31 is a depiction of a screenshot of a hybrid code exchange and photo confirmation screen.

FIG. 31 is a depiction of a screenshot of a hybrid code exchange and photo confirmation screen. In an example embodiment, FIG. 31 illustrates an example of a Hybrid code exchange/photo confirmation screen, for initiation of transaction between a User 1 with a smart mobile device, and a User 2 with a SMS-capable mobile device. FIG. 31 is an embodiment of an authentication sequence, as where only one party has a data-enabled mobile device, and where the second party has an SMS-enabled phone, showing use of the data-enabled device to display photos to both parties.

The embodiments herein can use any combination of types of devices regardless of manufacturer or platform. FIG. 31 is an example of the exchange of data between two users having different types of devices. For this example screen, the rider image 402 and a rider ID code 555 is provided to a user 400, who could be a driver and/or other passenger. A rider confirmation function 470 and confirmation button 570 can be provided.

Figure 32:
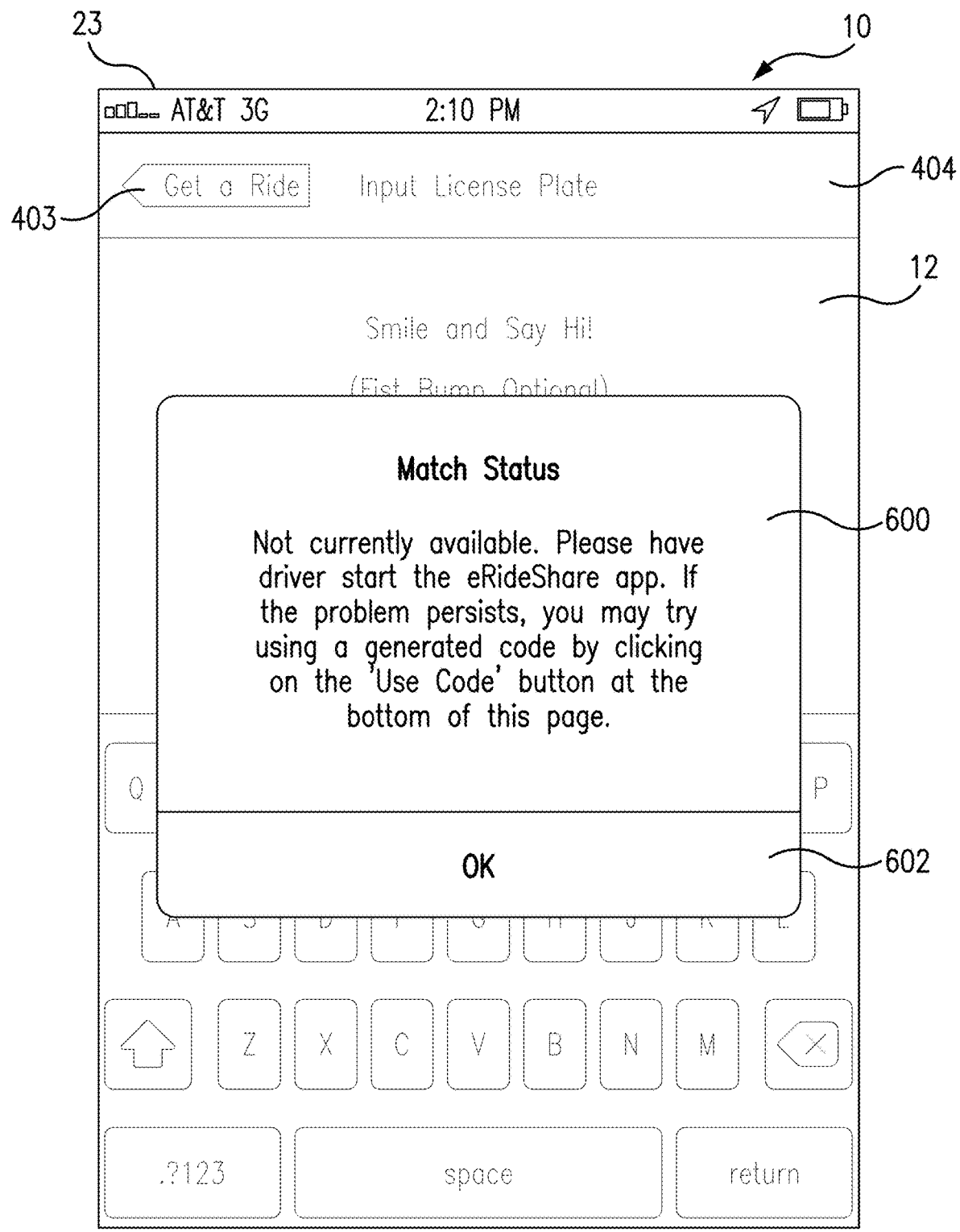
FIG. 32 is a depiction of a screenshot having a "Match Status" indicator.

FIG. 32 is a depiction of a screenshot having a "Match Status" indicator. The example of FIG. 32 has an "Input License Plate" screen label 404 and shows a "Match Status" indicator 600. The user in this example is requested to confirm the "Match Status" indicator 600 by activating the "OK" button 602.

Figure 33:
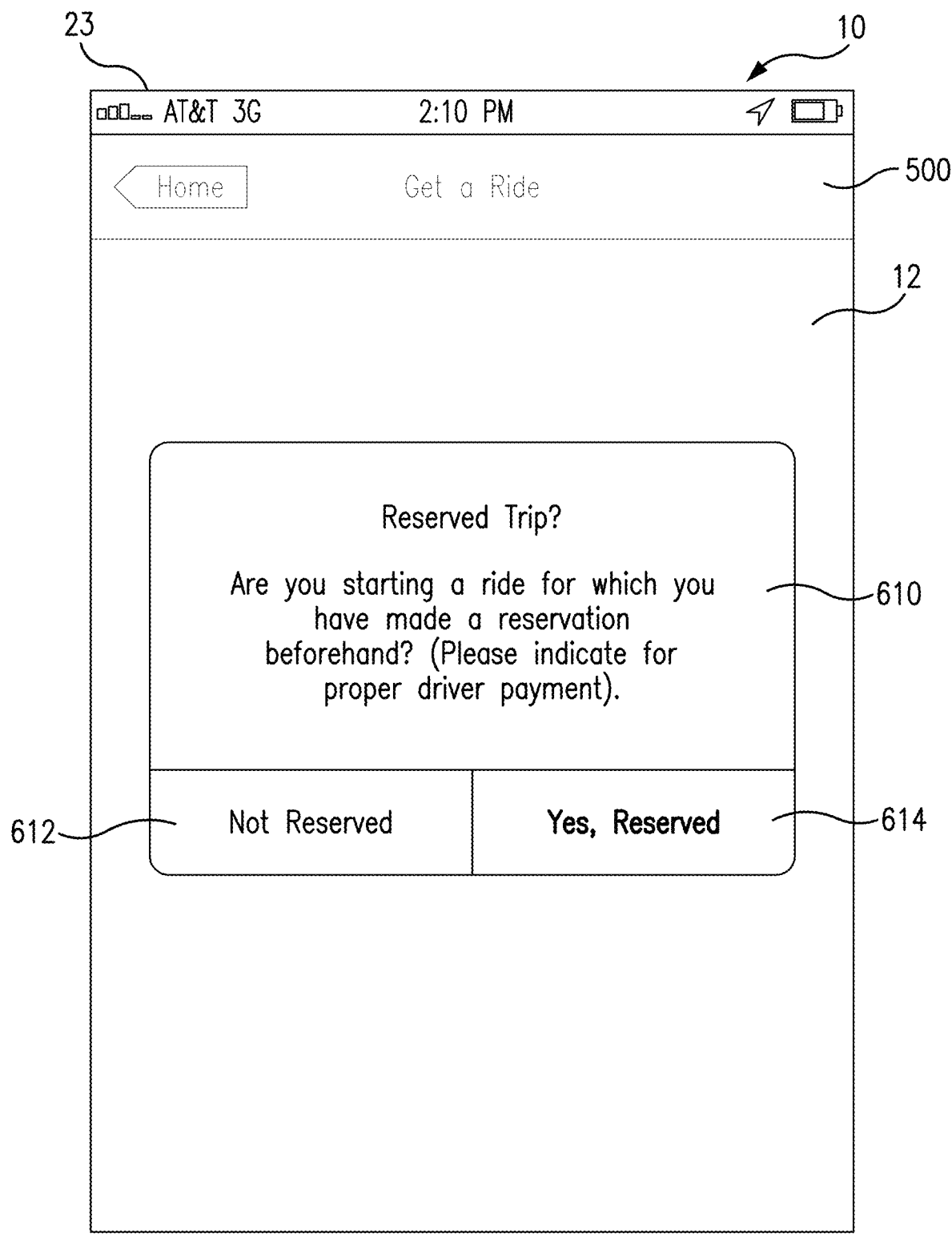
FIG. 33 is a depiction of a screenshot having a "Reserved Trip" inquiry.

FIG. 33 is a depiction of a screenshot having a "Reserved Trip" inquiry. The example of FIG. 33 has a "Get A Ride" screen label 500 and provides a "Reserved Trip" inquiry 610 to which a user can respond by activating a "Not Reserved" button 612 or "Yes. Reserved" button 614.

Figure 34:
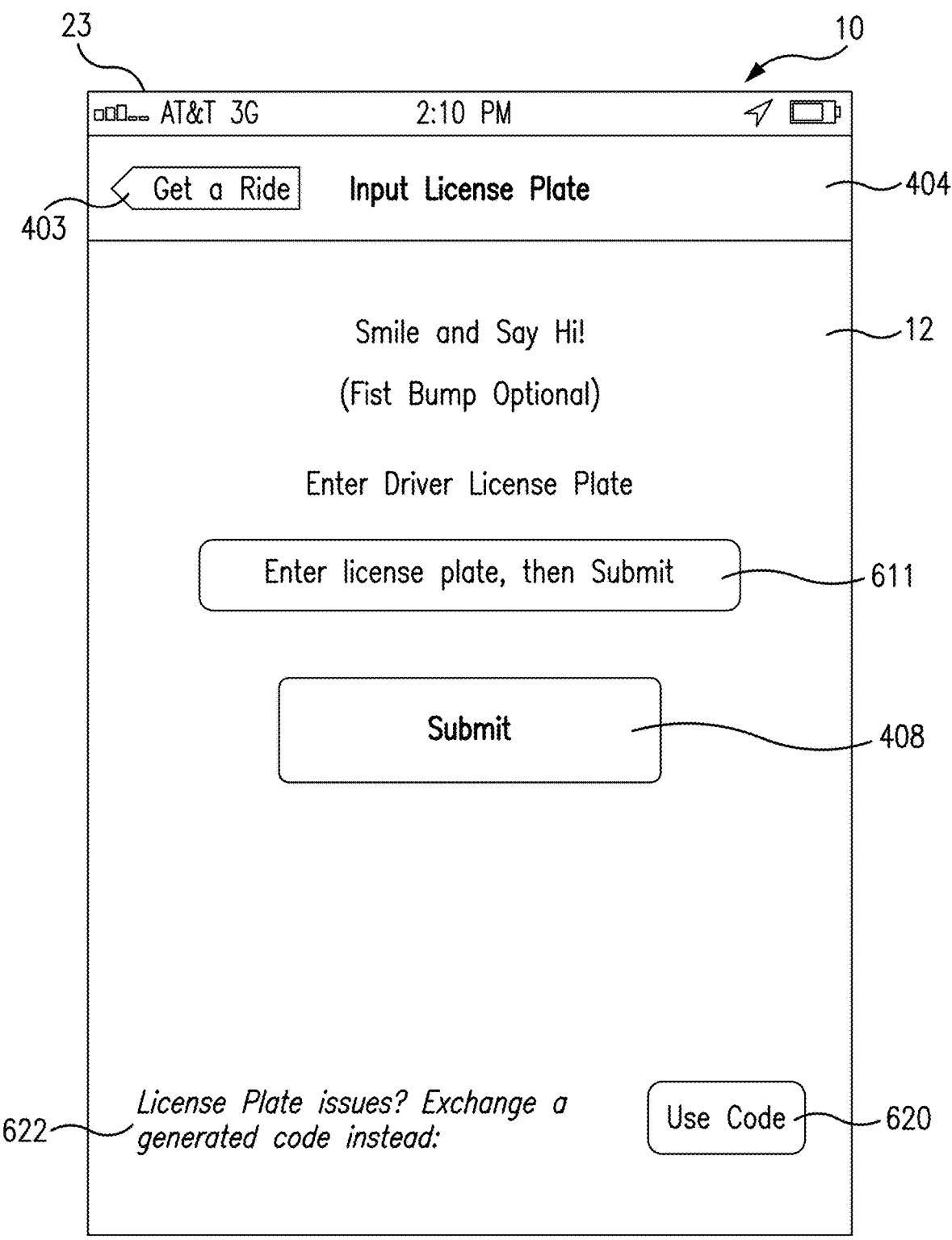
FIG. 34 is a depiction of a screenshot for license plate verification.

FIG. 34 is a depiction of a screenshot for license plate verification. The example of FIG. 34 has an "Input License Plate" screen label 404 and an input license plate field 611. Upon entry the license plate, the user can activate the submit button 408. As an alternative to license plate entry, the example of FIG. 34 provides a license plate issue inquiry 622 and offers the option to activate a "Use Code" button 620.

Figure 35:
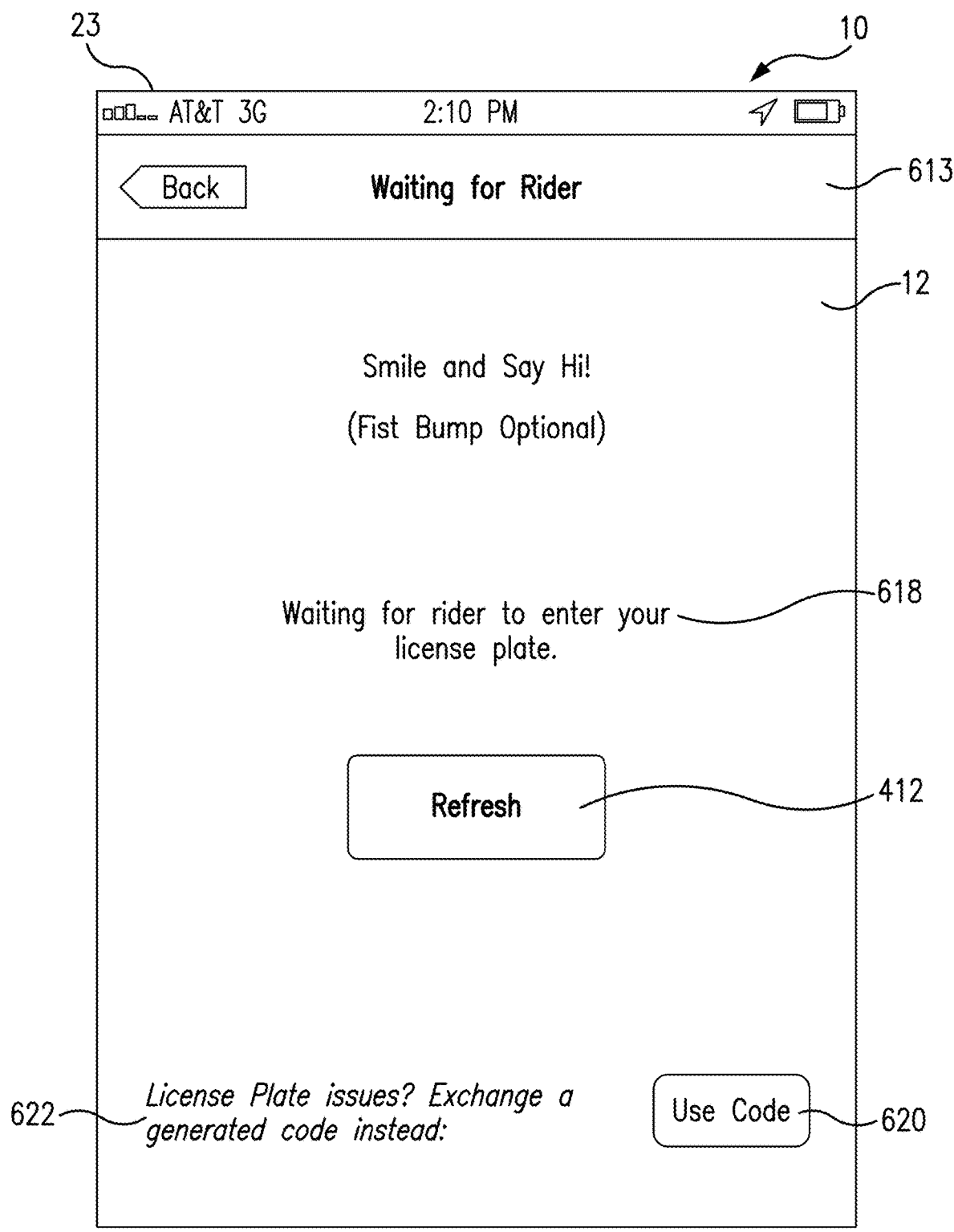
FIG. 35 is a depiction of a screenshot of a screen providing a waiting status.

FIG. 35 is a depiction of a screenshot of a screen providing a waiting status. The example of FIG. 35 provides a "Waiting For Rider" screen label 613 and show a waiting for rider status 618. As an alternative to license plate entry, the example of FIG. 34 provides a license plate issue inquiry 622 and offers the option to activate a "Use Code" button 620.

Figure 36:
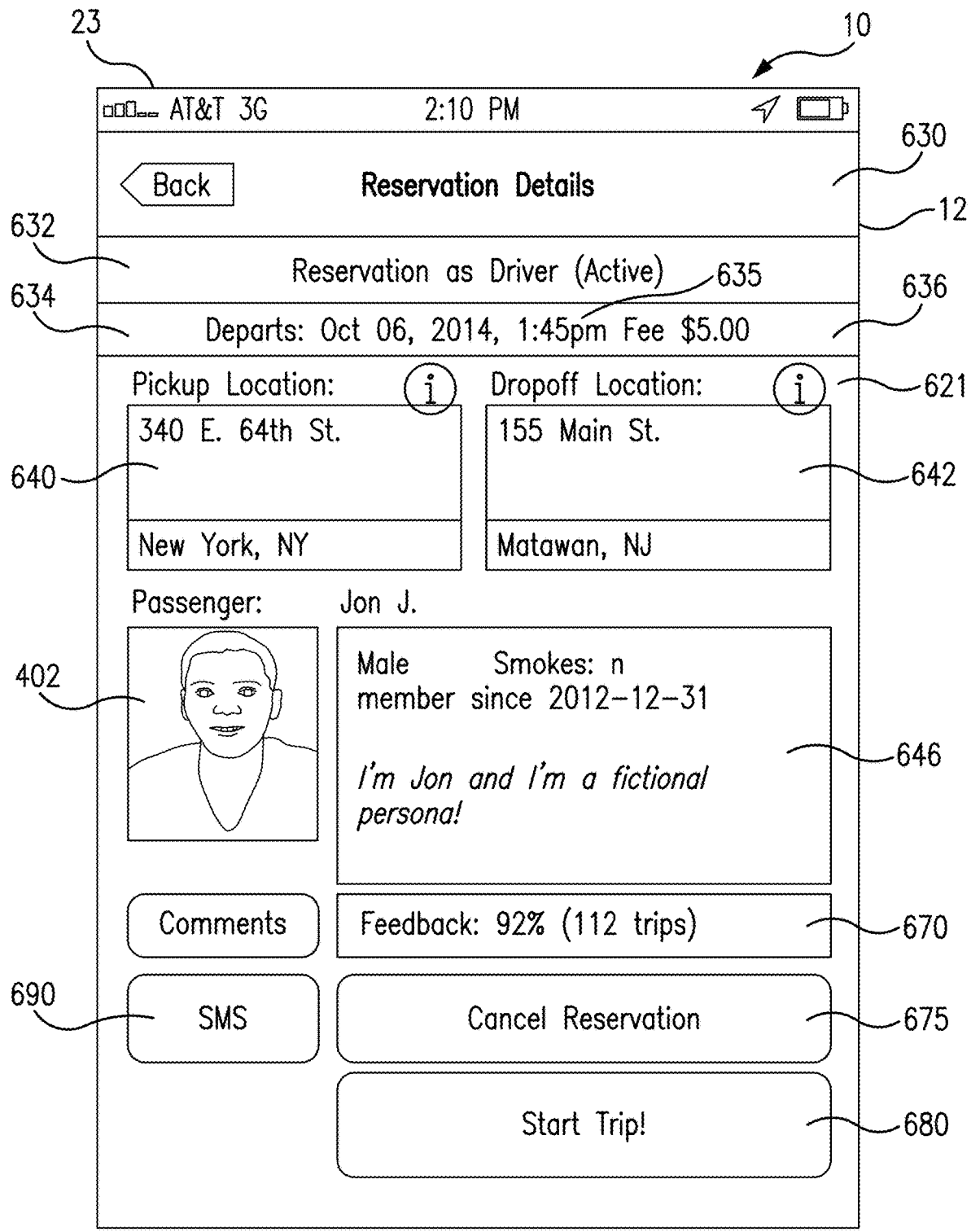
FIG. 36 is a depiction of a screenshot of reservation details.

FIG. 36 is a depiction of a screenshot of reservation details. There are no limitations to the reservation details which can be provided to a user. In the example of FIG. 36, a "Reservations Details" screen label 630 is provided, as well as a "Reservation As Driver" screen label 632. Departure date 634, departure time 635 and Fee Information 636 is provided. Pickup location 640 and dropoff location 642 are indicated. In this embodiment, a rider image 402 is provided, as well as rider information 646. A view comments button 440 is provided. The use can also select to activate a cancel reservation button 675 or activate a start trip button 680. One or more of an information button 621 can be provided.

Figure 37:
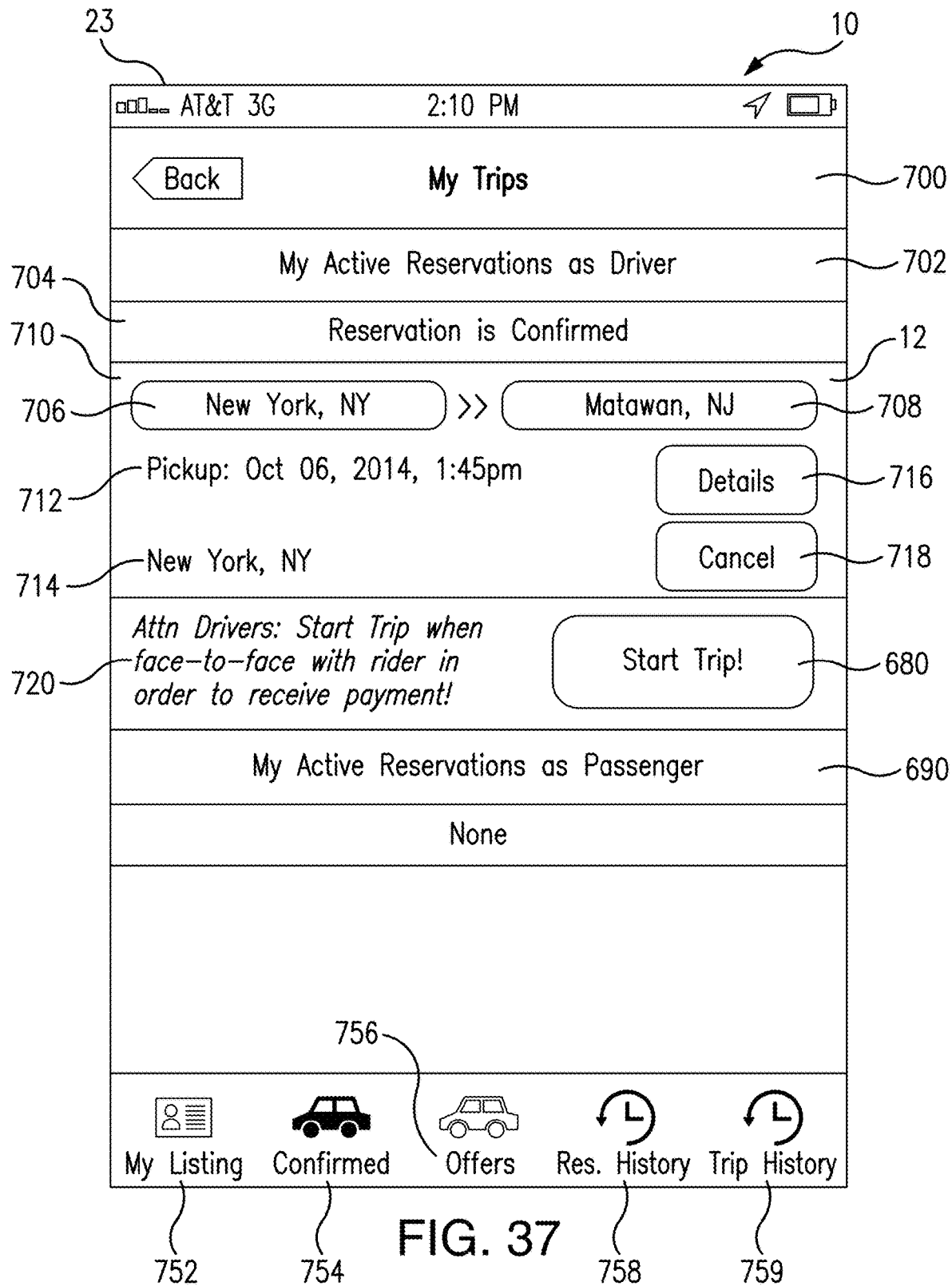
FIG. 37 is a depiction of a screenshot of a trip history screen.

FIG. 37 is a depiction of a screenshot of a trip history screen. The example of FIG. 37 provides a "My Trips" screen label 700 and details regarding a user's trips. FIG. 37 shows an "Active Reservations" screen label 702 and a "Reservation Status" screen label 704, in this example showing "Reservation Is Confirmed". Trip information 710 can include but is not limited to trip starting location 706 and trip ending location 708. Optionally, additional locations, stop locations, pickup locations and dropoff locations can be shown. Pickup information 712 and pickup location 704 are shown. The user can activate a details button 716 for additional details or activate a cancel button 718 to cancel the trip. A "Start Trip" screen label 720 is provided, as well as a start trip button 680 for a user to activate to start a trip. An active reservations as a "Passenger" screen label 690 is provided. Additional navigation buttons can be provided, such as in non-limiting example a "My Listing" button 752, a "Confirmed" button 754, an "Offers" button 756, a "Reservation History" button 758 and a "Trip History" Button 759.

Figure 38:
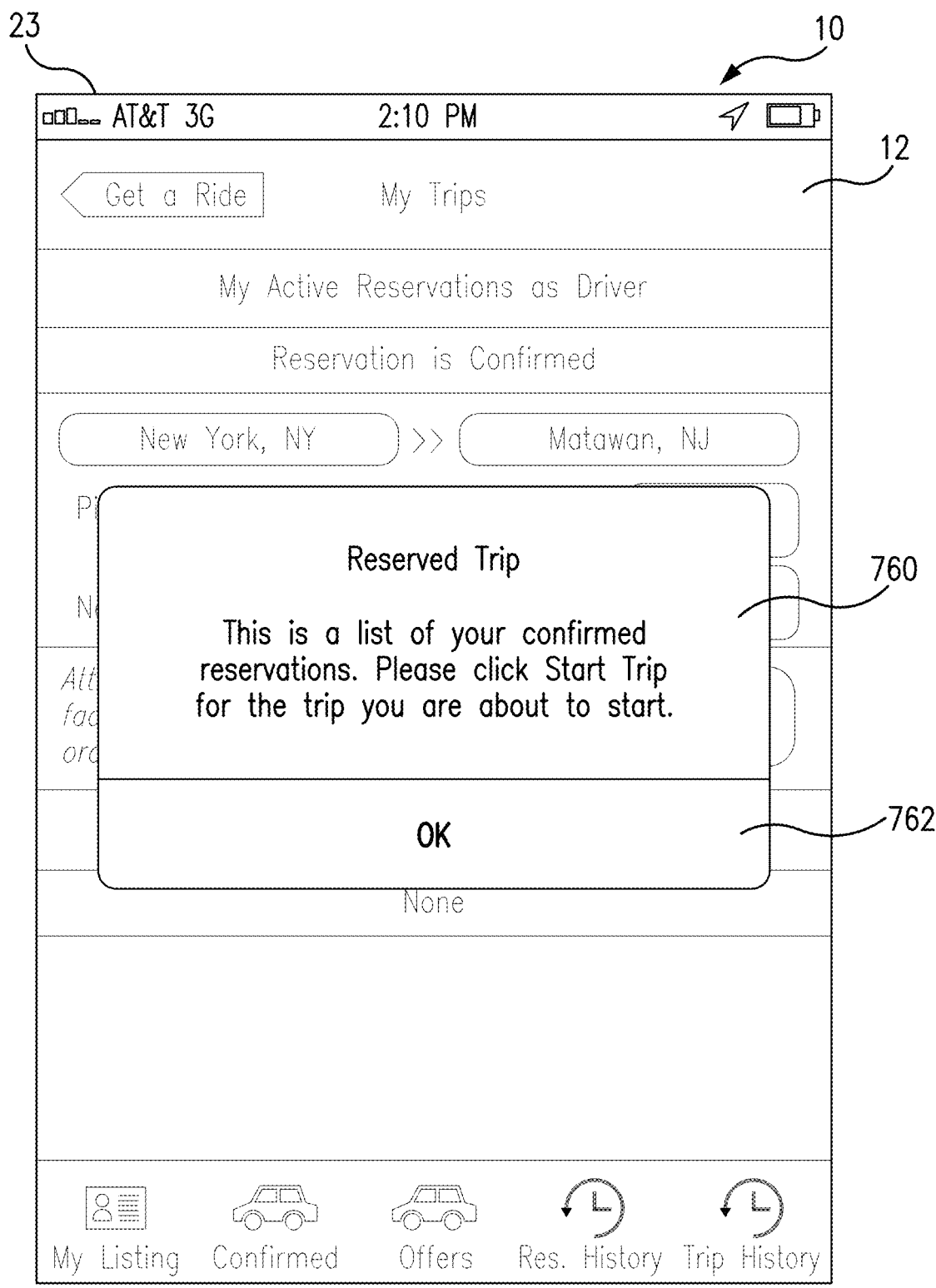
FIG. 38 is a depiction of a screenshot of a reserved trip activation screen.

FIG. 38 is a depiction of a screenshot of a reserved trip activation screen. The example of FIG. 38 shows a reserved trip notice 760 which can be acknowledged by the use by activating an "OK" button 762 or acknowledgement button.

Figure 39:
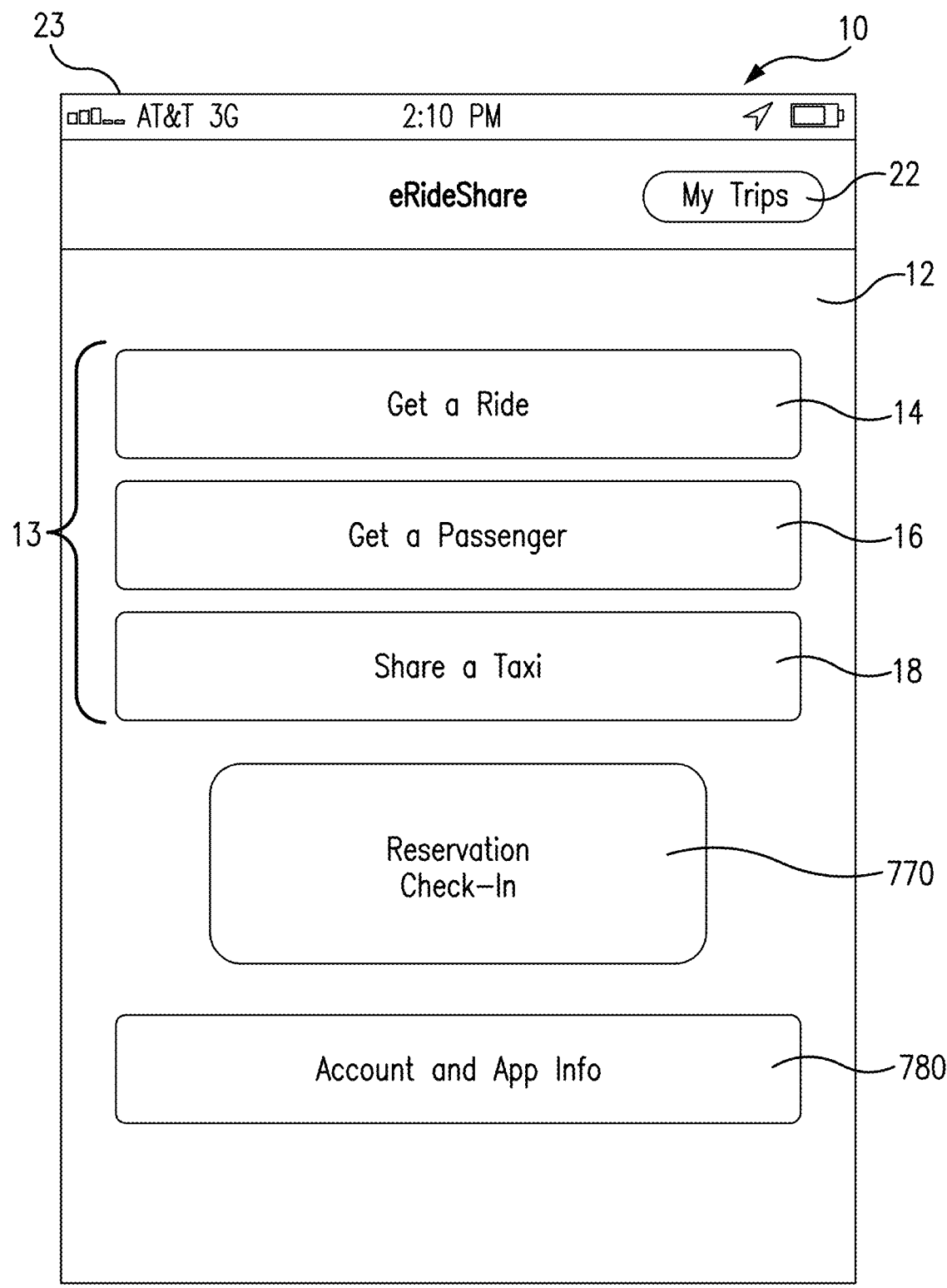
FIG. 39 is a depiction of a screenshot of a reservation check-in screen.

FIG. 39 is a depiction of a screenshot of a reservation check-in screen. The FIG. 39 example of a reservation check in screen provides a "Reservation Check-in" button 770 to activate a reservation check-in functionality of the identity authentication and verification system. The user is also provided an "Account and App Info" button 780 on this example screen.

In an embodiment, the identity authentication and verification system can process a list of users initiating one or more connections through proximity detection. A server can informs a user of nearby members also initiating, offering the option to choose one. Then users can validate the Location of SMS user by texting address information for this and for regular listings.

The identity authentication and verification system can connect users through various use of codes, identifiers, or license plate.

In an embodiment, a use of the identity authentication and verification system can connect to unregistered user by phone number, email, license plate, or other unique identifier, or GPS or other location information, providing unregistered user access to registered user's profile information. Registered user enters this information in the app or form and sends it to the server. This connects the two users at different levels of security, the license plate being a more secure identifier. Unregistered user receives a link by SMS or email in the case of phone number or email, otherwise goes to website directly, enters the corresponding information to the website, and is shown user1's profile, feedback, or by other means.

In an embodiment, a use of the identity authentication and verification system can interact and connect by use of a QR code or other scannable or computer readable code. This is just a method of transmitting an identifier or code as in part 1.

In an embodiment, a use of the identity authentication and verification system can process a user's or non-user's fingerprint. The method of connection by verification of the other party's fingerprint, taken as a photograph or with a fingerprint scanner.

In an embodiment, the identity authentication and verification system can also be used for fingerprint photo collection, sent to server, can be stored off server, or on write-only server, for better security, since the data is only for backup.

In an embodiment, the identity authentication and verification system processes verification and recordkeeping data. The identity authentication and verification system can generate such data, executes program logic based upon such data, as well as maintain and store such data. Required photo verification step is memorialized online. Photos can be two on one screen, to facilitate SMS or mobile voice device to smartphone verification.

In an embodiment the identity authentication and verification system can provide a list of users initiating connection through proximity detection. Server informs user of nearby members also initiating, offering the option to choose one. Then users can validate person(s) and/or data. Location of SMS user by texting address information for this and for regular listings. In another embodiment, users can pre arrange or schedule or register for check-in, and when they are in proximity, they automatically connect, verify, confirm or meet with one another.

Users connect, verify, confirm or meet with one another through various use of codes, identifiers, or license plate.

A user or non-user can connect, verify, confirm or meet with an unregistered user by phone number, email, license plate, or other unique identifier, or GPS or other location information, providing unregistered user access to registered user's profile information. A registered user enters this information in the app or form and sends it to the server. This can connect, verify, confirm or introduce the two users at different levels of security, the license plate being a more secure identifier. An unregistered user can receive a link by SMS or email in the case of phone number or email, otherwise goes to website directly, enters the corresponding information to the website, and is shown user1's profile, feedback, etc.

In an embodiment, a user can connect, verify, confirm or meet with one another person by means of a QR code or other scannable or computer readable code which provide information regarding the user and/or another person. In an embodiment, a method of transmitting an identifier or code can be used.

In an embodiment, a user can connect, verify, confirm or meet with one another person by verification of the other party's fingerprint, taken as a photograph or with a fingerprint scanner.

The identity authentication and verification system can be used for verification, confirmation, transaction and/or recordkeeping In an embodiment, a photo verification step can be memorialized online. Photos can be two on one screen, to facilitate SMS or mobile voice device ("dumbphone") smartphone verification.

In an embodiment, the identity authentication and verification system can use fingerprint photo collection, which data can optionally be sent to server, stored off server, or on a write-only server, for better security.

In an embodiment, if said device displaying said person image receives an input from a user verifying said person image, then said status of said person associated with said person image can be used, recorded or evalutated. Further, a data and/or content can be produced based upon user data.

The scope of this disclosure encompasses the methods and means to achieve the disclosed data analysis, as well as encompassing any article, product, means, and methods for producing and using any software, application, computer executable code, programming, logical sequences, or other form of electronic or automated means to achieve and/or use the methods herein or numerical analysis disclosed. Such products, articles and means include for example, but are not limited to, a software application product provided on a fixed media, such as a disk, or in a physical memory, or in a memory stick, or as a software application product, or as an application provided by digital download, or provided by other means. This application expressly encompasses installed, uninstalled, compiled and not compiled versions of any software product or equivalent product capable of being used, implemented, installed or otherwise made active to use, achieve and/or practice the methods disclosed herein. In addition to its normal and customary meanings, the recitation "computer readable program code means" is intended to be broadly construed to encompass any kind and type of computer readable program code, executable code, software as a service, web service, embedded application, software application product provided on a fixed media, such as a disk, or in a physical memory, or in flash memory, or in a memory stick, or as a software application product, or as an application provided by digital download, or encoded on programmable hardware, or provided by other means which can be employed to make, use, sell, practice, achieve, engage in, produce, function or operate the methods disclosed herein. The application is to be broadly construed in this regard and not limited to any means of delivery or to any product form for providing or using, achieving and/or practicing the computer readable program code products, means and/or methods disclosed herein. In embodiments, all of the methods herein can be produced and provided to a user as a software product(s), software application(s), computer readable program code means(s) or any other article(s) or device(s) which can be used to achieve any, some or all of the results, calculations and/or numerical methods disclosed herein.

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). Likewise, the claims are to be broadly construed in their recitations of numbers and ranges.

In an embodiment, a user base can be of sufficient number such that a network of users can have some assurance that they can form a match to their individual selection criteria.

In another embodiment, viral dissemination is employed to achieve a network of sufficient number so that users can have some assurance that they can form a match to their individual selection criteria.

In an embodiment, the system can display trip information. In an embodiment, the system can display trip information and trip destinations and transportation modes.

In an embodiment, the system provides method of using mobile devices to display travel information and coordinate transportation. The methods disclosed herein provides methods of contacting potential transportation providers and consumers, such as taxis or potential private drivers or riders.

In its several and varied embodiments, the technology disclosed herein solves the problem of communicating in a local area for transportation by providing an image and/or other visual and/or audio visual communication which facilitates communication between people. In an embodiment, such communication can occur concurrently with adding the transportation matching opportunity to a networked communication system such as the Internet, a localized network, or a controlled system.

In one embodiment, the app can cause a smart device, such as a mobile phone, to display on a video screen one or more travel indicators, including the following: a desired destination, a transportation mode (such as taxi, taxishare, need a ride, offering a ride). I can optionally disclose the brand and/or of the app. Optionally, the desired destination displayed can be a specific street address, or a simple general term such as "Downtown", "Airport", or "Grocery Store". The display can be generated by the app based on the user's responses to one or more queries, such as including the desired destination, the desired transportation mode, and any available additional details, such as time of departure. In an embodiment, the queries can be form queries.

In a further embodiment, in addition to causing the desired display, a user completing the app form will also cause the user-supplied information, and available geolocation data, to be transmitted using the Internet, SMS or another network option, to be incorporated on and made available to other users by a server, making the travel indicators available to other users interested in coordinating travel options. The information can be stored on the user's mobile device or a server awaiting a call for the information.

In an embodiment, a data-capable handheld devices utilized in this system can include smartphones, such as iPhone or Android-based mobile phone, a tablet, such as an iPad, iPod Touch or Android-based tablet device, or any similar portable data-capable device as can be capable of transmitting, receiving and displaying the data described.

In an embodiment, the information displays in this system can be created in response to a user request and can include additional data, such as identifying details (e.g., where a user is a driver, the profile can include the make, model and license plate number of the user's automobile), geolocation data, reviews and ratings of the displaying user by other users, or other statistical data.

In an embodiment, the communications system can have a system of displaying transportation information to people in the vicinity of a user's mobile device, having all of the features specified.

All of the disclosure regarding the embodiments herein is to be broadly construed and can be made, used, as software and hardware products implemented and executed by electronic means, computer means, as computer readable program code means (used herein synonymously with "program executable code", "computer code", "software code", or "code"), software, by electronic processing and electronic calculations. The methods disclosed herein are computer-based and/or telecommunications-based and/or software-based in nature and can be implemented for use and execution in an electronic computing environment, such as by use of processing unit, central processing unit, computer, distributed processing and/or computing system, wireless device, laptop, handheld device, cloud-based processing and any electronic architecture adapted to process the functions, software applications and methods disclosed herein.

All of the embodiments herein can be made, used, implemented and executed by computer readable program code and/or code means. There is no limitation as to the type and nature of computer readable program code and/or code means which can be used to achieve one or more of the methods, functions, communications, analysis and logic disclosed herein. The software products are not limited and can broadly be any software and or application product capable of achieving one or more of the methods, functions, communications, analysis and logic disclosed herein. The software products can be applications, subroutines, mobile applications, smartphone applications, wireless applications, cloud-based applications, cloud-based services, or any computer readable program code means adapted to achieve the one or more of the methods, functions, communications, analysis and logic disclosed herein. There is no limitation on the nature of the product whether the application is source code, compiled code, non-compiled code, downloaded code, compressed code, or executable code. This disclosure expressly encompasses any product which provides the method herein to a use and which can provide to, implement, execute, support or enable a user to practice, make or use any one or more of the methods, functions, communications, analysis and logic disclosed herein.

All of the embodiments herein are transformative in nature. The disclosed one or more of the methods, functions, communications, analysis and logic disclosed herein are to be executed by a computer to transform data by electronic and/or computer means to achieve an output which can be perceived and utilized by a user of the one or more of the methods, functions, communications, analysis and logic disclosed herein.

This scope disclosure is to be broadly construed. It is intended that this disclosure disclose equivalents, means, systems and methods to achieve the one or more of the methods, functions, communications, analysis, logic, software, functions, devices, activities, electronics, computers, systems and mechanical actions disclosed herein. For each functionality, software, method, communications, analysis, logic, computation, or executable program code disclosed, it is intended that this disclosure also encompasses in its disclosure and teaches equivalents, means, systems and methods for practicing the many aspects of the methods, means, apparatus and articles disclosed herein. Additionally, this disclosure regards one or more of the methods, functions, communications, analysis, software and products related thereto and its many aspects, features and elements. Such a technology can be dynamic in its use and operation, this disclosure is intended to encompass the equivalents, means, systems and methods of the use of the disclosed technology and its many aspects consistent with the description and spirit of the operations and functions disclosed herein. The claims of this application are likewise to be broadly construed.

The description of the embodiments is merely exemplary in nature and, thus, variations that do not depart from the gist of the embodiments are intended to be within the scope of this disclosure. Such variations are not to be regarded as a departure from the spirit and scope of the embodiments herein.

In embodiments, a user can enter information into a user's device which can be displayed on the user's device or displayed by other means. Additionally, the information entered by the user can be transmitted to a computer and/or other device. The transmission of the information by a user can be enhanced and/or changed and/or other information can be transmitted in addition to the information entered by the user. In non-limiting example, the transmission of such information can be to any intended recipient and/or recipients. Further, "broader dissemination" can be achieved for the transmission by a computer and/or other device transmitting the message by one or more means, such as but not limited to Twitter, email, SMS, web or app service, SMS notifications, one or more large informational display screen. These means of broader dissemination can have and/or display information from multiple sources, or other electronic means. Recipients of such transmissions can be any individual, group, member, membership, meeting, conference, gathering, assembly or target group desired, without limitation.

In an embodiment, the communications system can be used to achieve a dating, social or other purpose. In non-limiting example, in a public setting, such as a restaurant or other establishment or place, a user enters into a device an information such as a message or need. The information can be adapted to be displayed on the user's device, other device and/or projected on a wall or on the ceiling overhead with an available projector or laser device, with the information and other information such as GPS location simultaneously sent to the server for matching purposes.

In another example, in a restaurant or other establishment, a user enters a need and/or offering and/or information into a device such as "Seeking A Friend", "Need a Ride", "Ride Available". The information can be adapted to be displayed on the user's device, other device and/or projected on a wall, surface or a ceiling with an available projector or laser device, with the information and other information such as GPS location simultaneously sent to the server for matching purposes. This technology can be used for dating, meeting, group events, individual needs, sales, personal or public offerings, or any message the user desires to display.

In an embodiment, information can be adapted to be displayed on a user's device, another display or by other means. The user's device can also and/or simultaneously transmit the information, as well as optionally transmitting additional information (in non-limiting example a GPS location) to a computer for further transmission, dissemination or availability to individuals, or participants of a meeting, conference or a larger group who are using the application, or in non-limiting example by Twitter, email, SMS, web or app service, or SMS notifications. In an embodiment, a large informational display screen can be used, optionally with information from multiple sources, or other electronic means. The communications can be to one or more members of a website, or other group having members, participants or affiliates.

In an embodiment, the technology disclosed herein can be used to execute activities in an auction. In non-limiting example, when a user makes a bid for an item by entering the bid as input into the user's device, the user's device can in non-limiting example display a color (lights up in red), emit a perceptible signal or message, or project a signifier by an available projector or laser device, so people can see who made the bid, optionally indicating the amount.

The information can be displayed on the user's device or by other means, the user's device can also and/or simultaneously transmit a bid, or other information (e.g. GPS location) to a computer for further transmission or availability to members of the auction, or to others, or to a larger group who are using the application, or via Twitter, email, SMS, web or app service, SMS notifications, etc., optionally including a large informational display screen with information from multiple sources, or other electronic means.

In an embodiment, the communication system disclosed herein can be used for retail sales (e.g. store and/or a flea market), such as to advertise or request a good or service. In non-limiting example a seller can be offering an item (e.g., a good and/or service) and an information can be transmitted to a computer for matching or advertising purposes viewable by shoppers on a public information and/or using a shopper's device. In an embodiment, a shopper's device can be connected to an Internet-accessible data resource, and also displayed or announced on the device, projector, etc., to passersby.

In an embodiment, the seller's information can be displayed on the seller's device and/or on other means, said device also transmitting that information, optionally including other information such as GPS location, to a computer for further transmission or availability to members of the meeting or conference or a larger group who are using the application, or via Twitter, email, SMS, web or app service, SMS notifications, etc., optionally including a large informational display screen with information from multiple sources, or other electronic means.

In an embodiment, the communications system can be used for a game. In such a game, information can be provided to a server. In non-limiting example a player status or other information can be displayed on a players wireless device and/or projected. In non-limiting example, a user's device can use a color code to display a team affiliation and/or an icon to display a role (such as "archer" or "spy") and/or an action mode (such as "attack"). Other players, on the user's team or another team, can react according to the user's displayed status and actions, which can also be viewed with an app, web interface, SMS, etc. Similarly, a device can be used for a puzzle game or an investigation to get people to solve a puzzle by displaying for example a puzzle piece or other clue that the user finds so that people in the vicinity can try to combine puzzle pieces or clues, or an online user can try to analyze the clues. In a chess game or similar game a user's device can be used to display which piece and which side the user represents.

In such a game, the information can be displayed on the device or on other means, said device also transmitting that information, optionally including other information such as GPS location, to a computer for further transmission or availability to members of the meeting or conference or a larger group who are using the application, or via Twitter, email, SMS, web or app service, SMS notifications, etc., optionally including a large informational display screen with information from multiple sources, or other electronic means.

In an embodiment, the communications system can be used to find a lost child. In non-limiting example, a user's device can be adapted to display the photo and/or other information of a lost child with, for example, the word "LOST", said device also transmitting that information, optionally including other information such as GPS location, to a computer for further transmission or availability to park authorities, police, relatives, a message board, etc., via Twitter, email, SMS, web or app service, SMS notifications, etc., optionally including a large informational display screen with information from multiple sources, or other electronic means.

In an embodiment, the communications system can be used in an environment, such as a job fair, where a jobseeker displays the type of job sought and/or a prospective employer displays the type of position available. In non-limiting example, a jobseeker user can input into a device a jobseeking information optionally comprising the type of position sought, such as "Social Media" or "Chemical Engineer". The information can be adapted to be displayed on the device or on other means, said device also transmitting that information, optionally including other information such as GPS location, to a computer for further transmission or availability to members of the meeting or conference or a larger group who are using the application, or via Twitter, email, SMS, web or app service, SMS notifications, etc., optionally including a large informational display screen with information from multiple sources, or other electronic means.

In another job fair example, an employer user at the same job fair can input into a different device an employment information optionally comprising a job description or title; said information can be displayed on the employer user's device, said device also transmitting that information, optionally including other information such as GPS location, to a computer for further transmission or availability to members of the meeting or conference or a larger group who are using the application, or via Twitter, email, SMS, web or app service, SMS notifications, etc., optionally including a large informational display screen with information from multiple sources, or other electronic means.

In an embodiment, the communications system can be used to match investors with entrepreneurs seeking funds. In non-limiting example, a user's device at an investing event or venue can be adapted to display a business information optionally comprising the type of business of interest, optionally color coded by whether the user can be an investor or an entrepreneur. The information can be adapted to be displayed on the device and/or on other means, said device also transmitting that information, optionally including other information such as GPS location, to a computer for further transmission or availability to members of the meeting or conference or a larger group who are using the application, or via Twitter, email, SMS, web or app service, SMS notifications, etc., optionally including a large informational display screen with information from multiple sources, or other electronic means.

In an embodiment, the communications system can be used at an event, such as in non-limiting example a cocktail party, street fair, bar, or similar social event or venue where users post their fields of interest and/or status, for example "looking for employment in social media", or a personal information such as "Seeking [insert a person's name and/or group and/or type]". The information can be adapted to be displayed on the device and/or on other means, said device also transmitting that information, optionally including other information such as GPS location, to a computer for further transmission or availability to participants of the event or venue who are using the application, or via Twitter, email, SMS, web or app service, SMS notifications, etc., optionally including a large informational display screen with information from multiple sources, or other electronic means.

In an embodiment, the communications system can be used in a political or intellectual debate where one or more users can indicate their position(s) regarding one or more matter(s).

In non-limiting example, a user's device can be adapted to input a political or other opinion information for communication to passersby or members of a group in a meeting or conference, said device also transmitting that information, optionally including other information such as GPS location, to a computer for further transmission or availability to members of the meeting or conference or a larger group who are using the application, or via Twitter, email, SMS, web or app service, SMS notifications, etc., optionally including a large informational display screen with information from multiple sources, or other electronic means.

In an embodiment, the communications system can be used in a meeting or conference, where a user indicates that he/she wishes to speak or make a motion, possibly indicating the type of motion.

In non-limiting example, a user's device can be adapted to input a parliamentary procedure information such as a motion for communication to members of a group in a meeting or conference, said device also transmitting that information, optionally including other information such as GPS location, to a computer for further transmission or availability to members of the meeting or conference or a larger group who are using the application, or via Twitter, email, SMS, web or app service, SMS notifications, etc., optionally including a large informational display screen with information from multiple sources, or other electronic means. In non-limiting example, the device can be further adapted to suggest and allow the input only of motions that are currently in order under the current state of the parliamentary procedure.

In an embodiment, the communications system can be used in a line and/or queue. In non-limiting example, a portion of the device's screen can display a number indicating waiting time or position in a queue to speak or make a motion.

In non-limiting example, a user's device can be adapted to display a queue information for communication to passersby or members of a group in a meeting or conference, said device also transmitting that information, optionally including other information such as GPS location, to a computer for further transmission or availability to members of the meeting or conference or a larger group who are using the application, or via Twitter, email, SMS, web or app service, SMS notifications, etc., optionally including a large informational display screen with information from multiple sources, or other electronic means.

In an embodiment, the communications system can be used for a brainstorming event where users display ideas for evaluation.

In non-limiting example a user's device can be adapted to input an idea information for communication to members of a group in a meeting or conference, said device also transmitting that information, optionally including other information such as GPS location, to a computer for further transmission or availability to members of the meeting or conference or a larger group who are using the application, or via Twitter, email, SMS, web or app service, SMS notifications, etc., optionally including a large informational display screen with information from multiple sources, or other electronic means.

Any embodiment disclosed herein can use a Bluetooth communication device and/or functionality and/or other short range communication technology. Bluetooth can be used to transmit content can be delivered via a wireless, short range communication link, such as a Bluetooth link directly to other devices in the vicinity.

Any embodiment disclosed herein can use a peer to peer network device and/or functionality to transmit information and/or data.

Any embodiment disclosed herein can optionally provide that destination or other detailed specifying information can be not communicated, but just a status indicating that a contact can besought, for example a rideshare or taxishare, or more specifically a ride offered or requested, or in the case of a cocktail party or other social venue or event, just "looking for [insert a need and/or desire]" or "looking for [item and/or position and/or person]" or a user status.

For the embodiments disclosed herein, optionally the information and/or data can be adapted to be displayed on the device or on other means, said device also transmitting that information, optionally including other information such as GPS location, to a computer for further transmission or availability to persons at an event or venue or a larger group who are using the application, or via Twitter, email, SMS, web or app service, SMS notifications, etc., optionally including a large informational display screen with information from multiple sources, or other electronic means.

Optionally, for any embodiment disclosed herein information and/or data can be displayed on a screen on a person's clothing, hat, or other wearable device.

In any embodiment, the information can be input into the device and adapted to be displayed on the device or on other wearable display means, such as a person's clothing, hat, or other wearable device, said device also transmitting that information, optionally including other information such as GPS location, to a computer for further transmission or availability to persons at an event or venue or a larger group who are using the application, or via Twitter, email, SMS, web or app service, SMS notifications, etc., optionally including a large informational display screen with information from multiple sources, or other electronic means.

Optionally, for any embodiment disclosed herein information and/or data can be optionally projected onto a surface either by the user, so equipped, or by laser device, video projector, or other electronic equipment in the vicinity or in the vicinity where the provision of the information is desired.

In additional non-limiting example, information and/or data can be projected onto a surface. Such a projection of data can be by the user, equipped with a projector, or by equipment at the venue or in the vicinity. For example, at a movie theater, a user can enter a request for a date, and project the request on the ceiling of the theater, along with a logo signifying the app or website. Another patron of the theater would use the same website or app to contact the person and gain more information or make arrangements to meet, or simply walk to that person's location.

The information and/or data which is projected can also be input into the device and adapted to be displayed on the device or on other means, said device also transmitting that information, optionally including other information such as GPS location, to a computer for further transmission or availability to persons at an event or venue or a larger group who are using the application, or via Twitter, email, SMS, web or app service, SMS notifications, etc., optionally including a large informational display screen with information from multiple sources, or other electronic means.

In an embodiment, the communications system can be used where a plurality of users are traveling in the same direction, such as on a train or a road.

In non-limiting example, when users are traveling together at the same time and place, such as passengers on a train or vehicles moving the same way on a highway, the system updating the users' locations through electronic means can match the users based on their correlated movement, including such information as location, speed and direction. A user in a vehicle can offer an information to another user traveling the same way to stop, meet, and continue the journey using only one vehicle. Alternatively, a train passenger can request a ride to a final destination from another train passenger who can be disembarking at the same station. The device can also display the transportation need to other passengers or to nearby vehicles.

In an embodiment, the information of a transportation need, optionally comprising origin or destination, can be input into the device and adapted to be displayed on the device or on other means, said device also transmitting that information, together with electronically indicated location information, to a computer for further transmission or availability to persons, specifically including persons matching a criterion of correlated movement, who are using the application, or via Twitter, email, web or app service, SMS, etc., optionally including a large informational display screen with information from multiple sources, or other electronic means.

In an embodiment, the communication system can be used to identify someone who can be getting off the train at a riders stop, and can potentially drive a rider to a destination.

In an embodiment the transportation provider and riders devices can sync and lead one to another using GPS location data.

In an embodiment, the communications system can be used for verifying carpools based on cellphones traveling together.

The information can be input into the device and adapted to be displayed on the device or on other means, said device also transmitting that information, optionally including other information such as GPS location, to a computer for further transmission or availability to persons at an event or venue or a larger group who are using the application, or via Twitter, email, SMS, web or app service, SMS notifications, etc., optionally including a large informational display screen with information from multiple sources, or other electronic means.

In an embodiment, output data according to device: in-app notification, and/or link for SMS, push notification, or email to web page or app page. In an embodiment, details can be used as input for app., links to user profiles, feedback ratings, history, external links such as Twitter or Facebook, etc., and also to means of contact or transaction such as reserving a ride with a driver. In an embodiment, a telephonic delivery of alert also possible, based on user preferences. Email can contain more information than SMS or push notification. Optionally, links can be used to confirm or deny request.

In an embodiment, the transportation communication system where transportation preference for offering or requesting transportation can be not easily specified or can not be specified. The information of a transportation need, optionally comprising destination but without specifying whether a ride can be offered or requested, or alternatively indicating that either option can be requested, can be input into the device and adapted to be displayed on the device or on other means, said device also transmitting that information, optionally including other information such as GPS location, to a computer for further transmission or availability to persons at an event or venue or a larger group who are using the application, or via Twitter, email, web or app service, SMS, etc., optionally including a large informational display screen with information from multiple sources, or other electronic means.

In an embodiment, a user can be near a road and the indicated communication system can be used at a gas station, for example, to indicate a transportation need without specification of type or with indicating either offer or request can be acceptable, to inter alia a music festival or the post office, and simultaneously indicate a transportation need on the network without specification of type. Alternatively, only a request can be displayed on the device since people at a gas station or other location near a road can be expected to have transportation already, but an information that either a transportation request or offer can be acceptable can be sent to a computer for further processing. The information of a transportation need, optionally comprising destination but without specifying whether a ride can be offered or requested, or alternatively indicating that either option can be requested, can be input into the device and adapted to be displayed on the device or on other means, said device also transmitting that information, optionally including other information such as GPS location, to a computer for further transmission or availability to persons at an event or venue or a larger group who are using the application, or via Twitter, email, web or app service, SMS, etc., optionally including a large informational display screen with information from multiple sources, or other electronic means.

In an embodiment, a transportation origin can beat an airport, train station, or other multimodal transportation hub Upon arrival at an airport, a user can input a transportation information, said information adapted for display on the device and the network to both offer and request a ride. If a person accepts said offer, the user will rent a car. The information of a transportation need, optionally comprising destination but without specifying whether a ride can be offered or requested, or alternatively indicating that either option can be requested, can be input into the device and adapted to be displayed on the device or on other means, said device also transmitting that information, optionally including other information such as GPS location, to a computer for further transmission or availability to persons at an event or venue or a larger group who are using the application, or via Twitter, email, web or app service, SMS, etc., optionally including a large informational display screen with information from multiple sources, or other electronic means.

In an embodiment, a transportation origin can beat a Park and Ride facility. In non-limiting example commuters arrive at the Park and Ride at different times. If someone shares the user's transportation requirement, either of the two parties can drive. If either option can be acceptable to the user, then the user's transportation partner can decide. The information of a transportation need, optionally comprising destination but without specifying whether a ride can be offered or requested, or alternatively indicating that either option can be requested, can be input into the device and adapted to be displayed on the device or on other means, said device also transmitting that information, optionally including other information such as GPS location, to a computer for further transmission or availability to persons at an event or venue or a larger group who are using the application, or via Twitter, email, web or app service, SMS, etc., optionally including a large informational display screen with information from multiple sources, or other electronic means.

In an embodiment, a transportation origin can beat a residential location and/or area. In non-limiting example the transportation origin can be an apartment complex or other neighborhood. An offer to share a trip communicates availability for either a ride offered or a ride requested. The information of a transportation need, optionally comprising destination but without specifying whether a ride can be offered or requested, or alternatively indicating that either option can be requested, can be input into the device and adapted to be displayed on the device or on other means, said device also transmitting that information, optionally including other information such as GPS location, to a computer for further transmission or availability to persons at an event or venue or a larger group who are using the application, or via Twitter, email, web or app service, SMS, etc., optionally including a large informational display screen with information from multiple sources, or other electronic means.

In an embodiment, the system can include a safety button and/or functionality. The safety button can be a symbol on the graphical user interface which an individual can activate which will do one of more of the following: send out an electronic message relaying distress; activate the microphone and transmit sound data to a recipient; activate one or more cameras on the device and transmit video data; transmit the identity of the owner of the device; transmit rideshare date such as name of rider and/or driver, route data, destination data, pick up date, time, GPS location data, or other data. In an embodiment, data can be communicated to one or more authorities or responders such as 911, Onstar or others. In the case of a minor child, the system can also provide data and activate an Amber Alert or other protection and/or safety system.

Embodiment of all of the above, where the device additionally comprises a software "panic button", which, when tapped, performs some or all of the following actions in non-limiting example such as: turn on mic and record or transmit audio to a remote server, police, or another designated party; notify police or other party; flash red; turn on camera, and record or transmit video to a remote server, police, or another designated party; make a noise to attract attention; disable actions to turn off the device for some preset period of time. In an embodiment, a panic button and/or functionality can be used that turns on a mic, notifies police, geolocation, flashes, turns on a camera, makes a noise, and can refuse and/or be prevented from turning off on or more of these and/or other functionalities.

In an embodiment, the system can include a safety button. The safety button is a symbol on the graphical user interface which an individual can activate which will do one of more of the following: send out an electronic message relaying distress; activate the microphone and transmit sound data to a recipient; activate one or more cameras on the device and transmit video data; transmit the identity of the owner of the device; transmit rideshare date such as name of rider and/or driver, route data, destination data, pick up date, GPS data or other data. In an embodiment, data is communicated to one or more authorities or responders such as 911, on star or others. In the case of a minor child, the system can also provide data and activate an Amber Alert or other protection and/or safety system.

In an embodiment, after entering data as specified above, device displays a logo and/or only a logo and/or symbol, indicating to others in the vicinity that they are looking for a match as part of the service indicated by the logo and/or symbol.

In a non-limiting example, college students waiting at a bus stop can enter their destinations, and display the logo on their devices to show drivers that they participate in the security features of this system and/or a service. Sometimes they might wish to forego entering their destinations, and just show the logo.

In an embodiment, a user device can display a text with can have an adjustable and/or adjusted type size dynamically for text display such that viewers can read and/or interpret the content of the display at a distance from the device of 1 ft, 5 ft, 10 ft, 15 ft, 20 ft, 25 ft, 200 ft, or farther.

In an embodiment, output data can be adjusted according to device: in-app notification, and/or link for SMS, push notification, or email to web page or app page, for example such as providing more detail for app., as well as optionally links to user profiles, feedback ratings, history, external links such as Twitter or Facebook, etc., and also to means of contact or transaction such as reserving a ride with a driver can be included. In an embodiment, telephonic delivery of an alert is also possible, based on user preferences. Email can contain more information than SMS or push notification. In an embodiment links can be used to confirm or decline a request and/or offering.

In an embodiment, the transportation communication system can be used where transportation preference for offering or requesting transportation is not specified. The information of a transportation need, optionally comprising destination but without specifying whether a ride is offered or requested, or alternatively indicating that either option is requested, is input into the device and adapted to be displayed on the device or on other means, said device also transmitting that information, optionally including other information such as GPS location, to a computer for further transmission or availability to persons at an event or venue or a larger group who are using the application, or via Twitter, email, web or app service, SMS, etc., optionally including a large informational display screen with information from multiple sources, or other electronic means.

In an embodiment, the transportation can be used for a user who is near a road. In an embodiment, the indicated communication system can be used at a gas station, for example, to indicate a transportation need without specification of type or with indicating either offer or request is acceptable, to inter alia a music festival or the post office, and simultaneously indicate a transportation need on the network without specification of type. Alternatively, only a request is displayed on the device since people at a gas station or other location near a road can be expected to have transportation already, but an information that either a transportation request or offer is acceptable can be sent to a computer for further processing. The information of a transportation need, optionally comprising destination but without specifying whether a ride is offered or requested, or alternatively indicating that either option is requested, is input into the device and adapted to be displayed on the device or on other means, said device also transmitting that information, optionally including other information such as GPS location, to a computer for further transmission or availability to persons at an event or venue or a larger group who are using the application, or via Twitter, email, web or app service, SMS, etc., optionally including a large informational display screen with information from multiple sources, or other electronic means.

In another embodiment, the communication system can be used for a transportation origin which is at an airport, train station, or other multimodal transportation hub Upon arrival at an airport, a user can input a transportation information, said information adapted for display on the device and the network to both offer and request a ride. If a person accepts said offer, the user will rent a car. The information of a transportation need, optionally comprising destination but without specifying whether a ride is offered or requested, or alternatively indicating that either option is requested, is input into the device and adapted to be displayed on the device or on other means, said device also transmitting that information, optionally including other information such as GPS location, to a computer for further transmission or availability to persons at an event or venue or a larger group who are using the application, or via Twitter, email, web or app service, SMS, etc., optionally including a large informational display screen with information from multiple sources, or other electronic means.

In an embodiment, the transportation system can be used for a transportation origin which is at a Park and Ride facility. In non-limiting example, commuters can arrive at the Park and Ride at different times. If someone shares the user's transportation requirement, either of the two parties can drive. If either option is acceptable to the user, then the user's transportation partner can decide which option to choose. The information of a transportation need, optionally comprising destination but without specifying whether a ride is offered or requested, or alternatively indicating that either option is requested, is input into the device and adapted to be displayed on the device or on other means, said device also transmitting that information, optionally including other information such as GPS location, to a computer for further transmission or availability to persons at an event or venue or a larger group who are using the application, or via Twitter, email, web or app service, SMS, etc., optionally including a large informational display screen with information from multiple sources, or other electronic means.

In an embodiment, the communication system can be used for a transportation origin which is at a residential area. In non-limiting example, in an apartment complex or other neighborhood, an offer to share a trip communicates availability for either a ride offered or a ride requested. The information of a transportation need, optionally comprising destination but without specifying whether a ride is offered or requested, or alternatively indicating that either option is requested, is input into the device and adapted to be displayed on the device or on other means, said device also transmitting that information, optionally including other information such as GPS location, to a computer for further transmission or availability to persons at an event or venue or a larger group who are using the application, or via Twitter, email, web or app service, SMS, etc., optionally including a large informational display screen with information from multiple sources, or other electronic means.

In an embodiment, the communications system achieve a method of crowdsourcing which can have a computer running a program executable code of a rule based logic to determine whether said member data matches a notice criteria, said computer adapted to run a program executable code identifying one or more members having a member data which satisfies a notice criteria as target members; electronically transmitting a notice and/or communication to said one or more members having a member data which satisfies said notice criteria as target members.

The method of rideshare crowdsourcing, further have the steps of: said computer running a program executable code of a rule based logic to determine whether said member location data matches said geographical notice criteria, said computer adapted to run a program executable code identifying one or more members having a member location which satisfies said geographical notice criteria as target members, and electronically transmitting said rider need data to said one or more members having a member location which satisfies said geographical notice criteria as target members.

Example 1

The following is a non-limiting example of a logical sequence of an embodiment of a portion of a rideshare system:

```
1000 HOME SCREEN: SELECT TRANSPORTATION TYPE
1100 Button: Get a Ride
    1110 Button: Post Your Trip
    1120 Post Ride Request
        1121 Destination?
            Text Input Field: ("Airport", "Supermarket",
                "25th St.", etc.)
        1122 When are you leaving?
            Input: Select Now or Date & Time Picker
        1123 Button: Post Ride Request: Data from form, plus user
            identifier, sent to server
            1124 Alert (popup): Trip Posted. Your trip was
                successfully posted, and will be visible
                by other users.
            1125 Under the alert: Display:
                Need Ride to
                JFK
                (logo) eRideShare
            ==> THE USER SHOWS THIS DISPLAY TO PEOPLE
                IN THE AREA, FOR THE PURPOSE OF FINDING
                A TRANSPORTATION PARTNER, IN THIS
                CASE A DRIVER
            1126 Button: Post Ride Request (Go to previous screen,
                line 1120)
            1127 Button: Home (Go to 1000)
        1128 Button: Private Group
            1129 ***
1130 Button: Find Drivers
    1140 Button: On the Street Now
    1150 Button: Upcoming Travel
    1160 Button: Commuters
```

The above three buttons can be associated with calling one or more maps. The server can be sent a request indicating which type of map is requested. In an embodiment, the user's GPS location can be used so that local results can be displayed.

The app can displays a map of an appropriate level of zoom (different for each of the three types). Pins or icons in the map can indicate the location of a user offering a ride of the type requested. The pins or icons can be tapped to show additional information on a "callout". The callout can then be tapped to move to a screen with additional information or contact options.

A navigation bar can be used with an option to display the information available through the map view, but in a list view. The list view can have sorting options and can also be tappable to move to the screen with additional information or contact options.

```
1170 Button: Private Group
1129 ***
1140 Button: ID Your Driver Identification functionality.
1200 Get a Passenger
1160 Post Your Trip
1170 Find Riders
1180 ID Your Rider
1300 Share a Taxi
1200 Post Your Trip
1210 Find Taxisharers
1220 ID Your Partner
```

Example 2

The following is a non-limiting example of a use of an embodiment of a portion of a rideshare system:

```
1000 USER NEEDS A RIDE FROM CURRENT LOCA-
    TION (TRAIN STATION, FOR EXAMPLE) TO DESTI-
    NATION (DOWNTOWN, FOR EXAMPLE)
    1100 PREPARATION WITH WIRELESS DEVICE
        1110 User loads app, having previously registered, pro-
            vided a photograph, verified email, phone number, and
            credit card, and completed profile information, all of
            which have been uploaded to the server and saved in
            the database
        1120 User selects "Get a Ride"
        1130 User selects "Post My Ride"
        1140 User enters destination text and departure time
        1150 User optionally enters amount offered, comment, a
            different origin, a more detailed destination, etc.
        1160 User selects "Post Ride Request"
        1170 App sends information from 1130, 1140, and 1150
            to server, along with GPS location and user identifier
    1200 DISPLAY OF TRIP REQUIREMENTS AS A SIGN
        ON THE SCREEN OF THE WIRELESS DEVICE
        1210 CHARACTERISTICS OF SIGN
            1211 Trip type, in this case "Need Ride To"
            1212 Destination
            1213 (logo) and Brand Name
            1214 Formatting can include text blinking or other
                embellishment or decoration
            1215 Navigation buttons can include "Home", "View
                Listing", "ID Driver", for example
            1216 An instructive image or text can be displayed as
                a popup indicating how the sign is to be used
        1220 USAGE OF THE SIGN
            1221 User holds the device with the message and/or
                logo up for public view
```

1300 DISPLAY OF TRIP REQUIREMENTS ON NETWORK ENABLED DISPLAY
- 1301 Information from 1170, optionally combined with other user information such as profiles, together with mapping information, is sent to an enabled a monitor, billboard, etc., available to this system or to the general public. Information displayed can be selected to be appropriate to location and departure time.
  - 1320 Optionally can indicate some or all of the following elements, inter alia: origin, destination, departure time, payment offered, name or nickname, photograph of user, feedback rating, profile elements including gender and smoking preference, map or origin and/or destination.
  - 1330 Optionally can indicate a meeting place
  - 1330 Optionally can include requests and offers from multiple users 1400 DISPLAY OF TRIP REQUIREMENTS WITH VIDEO PROJECTOR
- 1301 Information from 1170, optionally combined with other user information such as profiles, together with mapping information, is sent to an enabled projector available to this system or to the general public, or connected to the user's wireless device, and an image is projected onto a surface. Information displayed can be selected to be appropriate to location and departure time.
  - 1420 Optionally, can show substantially the same image as displayed on the user's wireless device
  - 1430 Optionally can indicate a meeting place
  - 1450 Optionally can indicate some or all of the following elements, inter alia: origin, destination, departure time, payment offered, name or nickname, photograph of user, feedback rating, profile elements including gender and smoking preference, map or origin and/or destination.
  - 1460 Optionally can include requests and offers from multiple users 1500 DISPLAY OF TRIP REQUIREMENTS ON WEARABLE DISPLAY
- 1510 On a display on the user's clothing, wristband, or other device available connected to the user's wireless device or accessible to the system.
  - 1520 Optionally can display a logo indicating use of the service, and/or a color indicating the type of travel requested, such as green to indicate a ride wanted
  - 1530 Optionally can indicate some or all of the following elements, inter alia: origin, destination, departure time, payment offered, name or nickname, photograph of user, feedback rating, profile elements including gender and smoking preference.
  - 1540 Optionally can indicate a meeting place 1600 PEER TO PEER BROADCAST OF TRIP REQUIREMENTS VIA BLUETOOTH OR OTHER WIRELESS, SHORT RANGE COMMUNICATION LINK
- 1610 Enabled devices of nearby users receive messages indicating the communication of the first user
- 1620 Second user's device can indicate the message with a text display similar to an SMS display
- 1630 If the second user's device is configured appropriately, the device can show the details of the first user's request within the app 1700 NOTIFICATION OF OTHER SYSTEM USERS
- 1710 Notification of the first user's request can be made to a second user's networked wireless device or other network enabled device such as a web-enabled computer. Provision of information can be selected to be appropriate to location and departure time, and other criteria.
- 1720 Notifications can be sent by email, SMS, telephonic message, device push notification, or alerts within the app.

1800 INCLUSION OF INFORMATION IN SEARCH RESULTS
- 1810 Results returned based upon compatible search results. Results can be displayed graphically, such as with points on a map, or in a list format. Additional information can be obtained about the results, including user profiles, and links to ticketing or messaging functionality. Results can be provisioned through an app, website, or SMS interaction.

2000 INITIATING CONTACT TO SHARE A RIDE
- 2100 Upon seeing the message and/or logo and/or trip information, first user can be approached by second user if first user is visible.
- 2200 If first user is not visible, second user can go to first user's location and approach first user.
- 2300 Alternatively, second user can contact first user via the app (lines 1700, 1800).
- 2400 In the three scenarios above, second user communicates with first user to arrange transportation.
- 2500 Alternatively, second user can use the app to confirm the proposed rideshare and (optional) payment.
- 2600 Alternatively, second user can propose a counteroffer of location, time, fee, etc. for the acceptance of first user. Further negotiation can be enabled.

3000 IDENTIFICATION
- 3100 In most cases the two parties to the transaction will want to have some mutual identification. This can be accomplished with the assistance of features in the app, or by exchange of identification, etc.

4000 RIDESHARE
- 4100 Rider enters the driver's vehicle. Driver takes rider to agreed destination. Payment can be made before, during or after the trip. Additional passengers can share the ride.

Example 3

The following is a non-limiting example of a logical sequence of an embodiment of a portion of a rideshare system.

1000 HOME SCREEN: SELECT TRANSPORTATION TYPE OR RESERVATION CHECK-IN
- 1100 Button: Get a Ride
- 1110 Button: ID Your Driver
- 1120 Popup: Reserved Trip? "Are you starting a ride for which you have made a reservation beforehand? (Please indicate for proper driver payment)." Display this popup if there is a pending reservation for this user.
- 1130 Popup Selector: Yes, Reserved
- 1131 My Trips: Active Reservations Screen
  Post to server: sessionID.
  Data from server: Info and reservationIDs for active reservations for trips.
  Active reservations for trips are listed.
- 1132 Popup: Reserved Trip. "This is a list of your confirmed reservations. Please click Start Trip for the trip you are about to start."
- 1133 Popup Selector: OK
- 1134 Details Button with each trip summary
  Post to server: sessionID, reservationID.

1135 Reservation Details Screen (Fig. XXX)
1136 Cancel Reservation Button
  Post to cancelreservation.php: sessionID, reservationID
1137 Start Trip Button: Go To 1400
1138 Start Trip Button: Go To 1400
1139 Cancel Reservation Button
  Post to cancelreservation.php: sessionID, reservationID
1140 Popup Selector: Not Reserved
Verification Process ##
  1200 Waiting for Rider Screen
  1300 Proximity List
  1310 Partner is a smartphone user: location by GPS
  1320 Partner is not a smartphone user: location by GPS/SMS or voice entry
  1330 Neither user has smartphone: location by SMS or voice entry
  1340 If Location List does not show the person intended to be matched, Go to Unique Identifier
  1350 Unique Identifier
  1360 Partner is a registered user
    1361 Enter license plate or code
  1370 Partner is not a registered user
    1371 Enter/scan license plate
    1372 Enter phone number
    1373 Send SMS to partner with link to user's registered profile
  1400 Photo verification
  1410 Partner is a smartphone user: straight photo verification: each party verifies match of image with person to verification system
  1420 Partner is not a smartphone user: two-on-one screen: each party verifies match of image with person to verification system
  1430 Neither user has smartphone: each party prints photo of partner before meeting, and verifies match of image with person to verification system by SMS or voice.

The methods and systems disclosed herein can be used with mobile devices and fixed devices in any combination, cell phones, smartphones, SMS devices, voice devices, computers, personal data assistants, laptops, tablets, and other devices can be used with one another by the methods and systems disclosed herein. For example, smartphones can be used with (mobile devices enabled with SMS and/or voice communication capability; dumb phones) with the methods and systems disclosed herein.

The embodiments herein are highly transformative and are technological methods and means which advance computer and software technology and which are robust and transform input, parameters, criteria, knowledge and/or data into useful and value added information upon which a user can base a decision, or which is transformed through technology into information which in itself is a decision, a solution, a result, a product, an output and/or outcome. The transformation of input and/or data by the computer and software embodiments herein achieves decision support and/or decision results previously not possible. The embodiments herein are transformation technologies and are also computer integral technologies to achieve the transformations (e.g. computer processing, calculations, values, results, choices, solutions and outcomes) disclosed and achieved herein.

This scope disclosure is to be broadly construed. It is intended that this disclosure disclose equivalents, means, systems and methods to achieve the devices, activities and mechanical actions disclosed herein. For each software functionality, application, subroutine, method step, logical step, mechanical element or mechanism disclosed, it is intended that this disclosure also encompasses in its disclosure and teaches equivalents, means, systems and methods for practicing the many aspects, mechanisms and devices disclosed herein. Additionally, this disclosure regards a communications system and its many aspects, features and elements. Such a communications system can be dynamic in its use and operation. this disclosure is intended to encompass the equivalents, means, systems and methods of the use of the tool and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

The particular embodiments disclosed above are illustrative only, as the invention can be modified and practiced in different but equivalent manners apparent to those skilled in the art having the benefit of the teachings herein. Furthermore, no limitations are intended to the details of construction or design herein shown, other than as described in the claims below. The particular embodiments disclosed herein can be altered or modified and all such variations are considered within the scope and spirit of the invention.

Insofar as the description above and the accompanying drawing disclose any additional subject matter that is not within the scope of the claims below, the inventions are not dedicated to the public and the right to file one or more applications to claim such additional inventions is reserved.

I claim:

1. A method executed on a computer, comprising the steps of:
   providing a computer having a memory and a processing unit adapted to execute a program executable code;
   providing said computer a profile data of a first person, said profile data having a first person image;
   storing said profile data in the memory of said computer;
   providing a first person device associated by said computer with said first person;
   said first person device configured to receive an input of a unique identifier;
   said first person device configured to communicate said unique identifier to said computer;
   said processing unit processes said unique identifier and executes program executable code to determine whether said unique identifier is associated with a second person;
   said processing unit determining that said unique identifier is associated with a second person;
   said computer configured to communicate said first person image to said first person device and configured to communicate a second person image of said second person to said first person device; and
   said first person device executes program executable code displaying said first person image and said second person image simultaneously on said first person device.

2. The method of claim 1, further comprising the step of:
   providing a second person device associated by said computer with said second person.

3. The method of claim 1, further comprising the steps of:
providing a second person device which is an SMS device.

4. The method of claim 1, further comprising the step of:
providing a second person device,
wherein at least one of said first person device and said second person device is a voice mobile device.

5. The method of claim 1, further comprising the step of:
providing a second person device,
wherein at least one of said first person device and said second person device is a data capable handheld device.

6. The method of claim 1, further comprising the step of:
providing a second person device,
wherein at least one of said first person device and said second person device is a tablet.

7. The method of claim 1, further comprising the step of:
providing a second person device,
wherein at least one of said first person device and said second person device is a laptop.

8. The method of claim 1, further comprising the step of:
providing a second person device,
wherein at least one of said first person device and said second person device is a computer.

9. The method of claim 1, further comprising the step of:
providing a second person device,
wherein at least one of said first person device and said second person device is a wearable wireless computing device.

10. The method of claim 1, further comprising the step of:
providing a second person device,
wherein at least one of said first person device and said second person device is a smartphone.

11. The method of claim 1, further comprising the steps of:
providing a second person device associated by said verification system with said second person; and
said computer communicating an image of said first person to said second person device, said second person device running program executable code displaying said image of said first person.

12. A method, comprising the steps of:
providing a computer having a memory and a processing unit adapted to execute program executable code, said computer adapted to run a program executable code of a verification system;
providing a first person device associated by said verification system with a first person;
providing a second person device associated by said verification system with said second person;
communicating a first data by said first person device to a computer indicating that said first person seeks to initiate a first person transaction with a second person;
said second person device communicating a second data to said computer indicating that said second person seeks to initiate a second person transaction with said first person;
said computer records a record of said first person having a state of seeking to initiate said first person transaction;
said computer records a record of said second person having a state of seeking to initiate said second person transaction;
wherein said first person selects said second person transaction, or
wherein said second person selects said first person transaction, or
wherein said first person selects said second person transaction and said second person selects said first person transaction;
said verification system communicating a first person image of said first person to said first person device;
said verification system communicating a second person image of a second person to said first person device; and
said first person device running program executable code displaying said first person image and said second person image simultaneously on said first person device.

13. The method of claim 12, further comprising the step of:
said computer providing a list of one or more persons to said first person device, said list comprising said data of said second person.

14. The method of claim 12, further comprising the step of:
said computer communicating to said second device a first person identifying data.

15. The method of claim 12, further comprising the steps of:
said computer provides to said second person device a list of one or more persons;
said list having an identifying data of said first person.

16. A method executed on a computer, comprising the steps of:
providing a computer having a memory and a processing unit adapted to execute a program executable code;
providing said computer a profile data of a first person, said profile data having a first person image;
storing said profile data in the memory of said computer;
providing a first person device associated with said first person;
said first person device is configured to receive an input to initiate an authentication of a second person;
said first person device configured to communicate said input to initiate an authentication to said computer;
said computer configured to execute program executable code to identify a second person satisfying a matching criterion upon receiving said input to initiate an authentication;
if said computer identifies said second person, said computer configured to execute program executable code communicating said first person image to said first person device and communicating a second person image of said second person to said first person device; and
said first person device executes program executable code displaying said first person image and said second person image simultaneously on said first person device.

17. The method executed on a computer of claim 16, further comprising the steps of:
said computer generating a list of one or more of a second person satisfying said matching criterion;
said computer provides said list to said first person device;
said first person device configured to receive a selecting input choosing said second person from said list and to communicate said selection input to said computer.

18. The method executed on a computer of claim 16, wherein
said input to initiate an authentication is a verification of a prearranged match.

19. A verification system, comprising:
- a computer having a memory and a processing unit adapted to execute program executable code, said computer adapted to run a program executable code of said verification system;
- a first mobile device having a display screen adapted to display a digital image, said first mobile device adapted to exchange a data with said computer and configured to display a digital image to a first person;
- said verification system configured such that the computer runs program executable code to communicate said digital image to said first mobile device, said first mobile device adapted to process and display said digital image in which said digital image is of a second person, said first mobile device adapted to run program executable code displaying said digital image of said second person to said first person;
- a program executable code adapted to display said first person image and said second person image simultaneously on said first mobile device; and
- said first mobile device adapted to accept an input from said first person of a data to said verification system that the image of said second person is a visual match to said second person.

* * * * *